United States Patent
Dorner et al.

(10) Patent No.: US 11,691,125 B2
(45) Date of Patent: Jul. 4, 2023

(54) CATALYST FOR THE OXIDATION OF NO, THE OXIDATION OF A HYDROCARBON, THE OXIDATION OF NH$_3$ AND THE SELECTIVE CATALYTIC REDUCTION OF NOX

(71) Applicant: BASF Corporation, Florham Park, NJ (US)

(72) Inventors: Robert Dorner, Hannover (DE); Ansgar Wille, Hannover (DE); Kevin David Beard, Hannover (DE)

(73) Assignee: BASF Corporation, Florham Park, NJ (US)

( * ) Notice: Subject to any disclaimer, the term of this patent is extended or adjusted under 35 U.S.C. 154(b) by 0 days.

(21) Appl. No.: 17/045,925

(22) PCT Filed: Apr. 30, 2019

(86) PCT No.: PCT/EP2019/061058
§ 371 (c)(1),
(2) Date: Oct. 7, 2020

(87) PCT Pub. No.: WO2019/211277
PCT Pub. Date: Nov. 7, 2019

(65) Prior Publication Data
US 2021/0170366 A1    Jun. 10, 2021

(30) Foreign Application Priority Data
Apr. 30, 2018 (EP) .................................... 18170088

(51) Int. Cl.
| | |
|---|---|
| *B01J 23/22* | (2006.01) |
| *B01J 23/72* | (2006.01) |
| *B01J 23/745* | (2006.01) |
| *B01J 29/76* | (2006.01) |
| *B01J 37/02* | (2006.01) |
| *F01N 3/20* | (2006.01) |

(52) U.S. Cl.
CPC ............... *B01J 23/22* (2013.01); *B01J 23/72* (2013.01); *B01J 23/745* (2013.01); *B01J 29/763* (2013.01); *B01J 37/0228* (2013.01); *F01N 3/2066* (2013.01)

(58) Field of Classification Search
None
See application file for complete search history.

(56) References Cited

U.S. PATENT DOCUMENTS

| | | | |
|---|---|---|---|
| 8,293,199 B2 | 10/2012 | Beutel et al. | |
| 2010/0111796 A1* | 5/2010 | Caudle ............... | B01D 53/9468 502/262 |
| 2011/0212008 A1* | 9/2011 | Punke ..................... | F01N 3/035 423/213.5 |
| 2015/0037233 A1 | 2/2015 | Fedeyko et al. | |
| 2015/0224486 A1* | 8/2015 | Bauer ..................... | B01J 23/22 423/213.5 |
| 2016/0347974 A1 | 12/2016 | Nolan et al. | |
| 2016/0367973 A1 | 12/2016 | Larsson et al. | |
| 2016/0367974 A1 | 12/2016 | Larsson | |
| 2016/0367975 A1 | 12/2016 | Lu et al. | |
| 2018/0280937 A1* | 10/2018 | Bauer .................... | B01J 37/343 |

FOREIGN PATENT DOCUMENTS

| | | | |
|---|---|---|---|
| WO | WO 2015/189680 A1 | | 12/2015 |
| WO | 2016138418 | * | 9/2016 |
| WO | 2016160988 | * | 10/2016 |
| WO | WO 2016/205509 A1 | | 12/2016 |
| WO | WO 2018/104310 A1 | | 6/2018 |
| WO | WO 2018/167055 A1 | | 9/2018 |

OTHER PUBLICATIONS

International Search Report dated Jun. 13, 2019 in PCT/EP2019/061058 filed Apr. 30, 2019.

* cited by examiner

*Primary Examiner* — Sheng H Davis
(74) *Attorney, Agent, or Firm* — DLA Piper LLP (US)

(57) ABSTRACT

The present invention relates to a catalyst for the oxidation of NO, for the oxidation of ammonia, for the oxidation of HC and for the selective catalytic reduction of NOx, comprising a flow through substrate comprising an inlet end, an outlet end, a substrate axial length extending from the inlet end to the outlet end and a plurality of passages defined by internal walls of the flow through substrate extending therethrough; a first coating comprising one or more of a vanadium oxide and a zeolitic material comprising one or more of copper and iron; a second coating comprising a first platinum group metal component supported on a non-zeolitic first oxidic material and further comprising one or more of a vanadium oxide and a zeolitic material comprising one or more of copper and iron; optionally a third coating comprising a second platinum group metal component supported on a second oxidic material; wherein the third coating is disposed on the surface of the internal walls and under the second coating over z % of the axial length of the substrate from the outlet end to the inlet end, with z being in the range of from 0 to 100; wherein the second coating extends over y % of the axial length of the substrate from the inlet end to the outlet end and is disposed either on the surface of the internal walls, or on the surface of the internal walls and the third coating, or on the third coating, with y being in the range of from 95 to 100; wherein the first coating extends over x % of the axial length of the substrate from the inlet end to the outlet end and is disposed on the second coating, with x being in the range of from 20 to y.

22 Claims, 7 Drawing Sheets

CATALYST FOR THE OXIDATION OF NO, THE OXIDATION OF A HYDROCARBON, THE OXIDATION OF NH₃ AND THE SELECTIVE CATALYTIC REDUCTION OF NOX

The present invention relates to a catalyst for the oxidation of NO, for the oxidation of ammonia, for the oxidation of HC and for the selective catalytic reduction of NOx comprising a first and a second coating. The present invention further relates to an exhaust gas treatment system for treating an exhaust gas stream exiting a diesel engine comprising said catalyst and to a method for preparing said catalyst. Further, the present invention relates to the use of the aforementioned catalyst as well as a method for the simultaneous selective catalytic reduction of NOx, the oxidation of ammonia, the oxidation of nitrogen monoxide and the oxidation of hydrocarbon using said catalyst.

Presently, many original equipment manufactures (OEMs) are looking at increasing engine out NOx emissions being a side effect of OEMs trying to reduce their $CO_2$ emissions/increase while increasing fuel economy due to impending regulations. These higher engine-out NOx emissions can be too much of a burden for a standard EU VI/EPA13 system, while maintaining emission regulations. Thus, new layouts are needed to meet the new stringent regulations. A close coupled catalyst for selective catalytic reduction (SCR), which can aid the increased burden of NOx reduction, especially at high engine out NOx would be one of these possible new layouts. However, for any new after-treatment system, the need for a closed diesel particulate filter is still given. The collected soot in the filter must be converted via a suitable processes into gaseous substances (usually $CO_2$), so that the filter does not get clogged. For this reason, diesel oxidation catalysts (DOC) are usually installed upstream of the filter containing relatively high amounts of expensive platinum group metal (PGM). The DOC can be used to catalytically burn diesel fuel. A temperature is hereby produced, at which the filter regeneration starts, or is sped-up and made more efficient. However, during the intervals where no fuel is injected to generate a temperature over the catalyzed soot filter (CSF), $NO_2$ usually functions as oxidant for oxidizing the soot on the CSF.

During tests ran on an engine, it turned out that Vanadium-SCR catalysts have relatively good properties in the catalytic combustion of diesel fuel as disclosed in WO2015/189680 A1. This alternative solution would be able to act as a fuel burn DOC as well as an up-stream SCR. Furthermore, this approach could be combined with the material's DeNOx activity, by reacting the engine out NOx with ammonia over this component. However, one major disadvantage of such an approach is the loss of $NO_2$-make upstream of the filter for passive soot regeneration and the selectivity towards $N_2O$ can increase. Thus, there is a need to provide catalysts capable of meeting the impeding regulations, in particular by decreasing the nitrous oxide formation.

US2016/0367973 discloses catalyst articles having a first zone containing a first SCR catalyst and a second zone containing an ammonia slip catalyst and US2016/0367974 discloses catalyst articles having an ammonia slip catalyst and a second catalyst, such as a diesel oxidation catalyst, a selective catalytic reduction/passive NOx adsorber or a three-way conversion catalyst for example. However, the catalyst stated in US2016/0367973, is not optimized in regard to NO oxidation to increase the $NO_2$ portion of the exhaust gas, entering the CSF. Furthermore, where the SCR and the oxidation functionality are mixed, the catalyst can yield high $N_2O$ levels via unselective DeNOx. Having a diesel oxidation catalyst, a selective catalytic reduction/passive NOx adsorber or a three-way conversion catalyst as is stated in US2016/0367974 for example would also result in high $N_2O$ selectivity due to unselective oxidation of $NH_3$, which can slip from the upstream SCR.

Therefore, it was an object of the present invention to provide catalysts for the oxidation of NO, for the oxidation of ammonia, for the oxidation of HC and for the selective catalytic reduction of NOx which exhibits great catalytic activity ($NH_3$ oxidation, NO oxidation, HC oxidation and NOx conversion) while reducing the nitrous oxide ($N_2O$) formation. Surprisingly, it was found that the catalysts for the oxidation of NO, for the oxidation of ammonia, for the oxidation of HC and for the selective catalytic reduction of NOx according to the present invention permits to obtain great catalytic activity ($NH_3$ oxidation, NO oxidation, HC oxidation and NOx conversion) while reducing the nitrous oxide ($N_2O$) formation.

I. A First Catalyst for the Oxidation of NO, for the Oxidation of Ammonia, for the Oxidation of HC and for the Selective Catalytic Reduction of NOx Therefore, the present invention relates to a catalyst for the oxidation of NO, for the oxidation of ammonia, for the oxidation of HC and for the selective catalytic reduction of NOx, comprising (i) a flow through substrate comprising an inlet end, an outlet end, a substrate axial length extending from the inlet end to the outlet end and a plurality of passages defined by internal walls of the flow through substrate extending therethrough;

(ii) a first coating comprising one or more of a vanadium oxide and a zeolitic material comprising one or more of copper and iron;

(iii) a second coating comprising a first platinum group metal component supported on a non-zeolitic first oxidic material and further comprising one or more of a vanadium oxide and a zeolitic material comprising one or more of copper and iron;

(iv) optionally a third coating comprising a second platinum group metal component supported on a second oxidic material;

wherein the third coating is disposed on the surface of the internal walls and under the second coating over z % of the axial length of the substrate from the outlet end to the inlet end, with z being in the range of from 0 to 100;

wherein the second coating extends over y % of the axial length of the substrate from the inlet end to the outlet end and is disposed either on the surface of the internal walls, or on the surface of the internal walls and the third coating, or on the third coating, with y being in the range of from 95 to 100;

wherein the first coating extends over x % of the axial length of the substrate from the inlet end to the outlet end and is disposed on the second coating, with x being in the range of from 20 to y.

Preferably x is y. Alternatively, x is preferably in the range of from 20 to 60, more preferably in the range of from 40 to 60, more preferably in the range of from 45 to 55, more preferably in the range of from 48 to 52.

Preferably y is in the range of from 95 to 100, more preferably in the range of from 98 to 100, more preferably in the range of from 99 to 100, and x is y. Alternatively, preferably, y is in the range of from 95 to 100, more preferably in the range of from 98 to 100, more preferably in the range of from 99 to 100, and x is in the range of from 20 to 60, more preferably in the range of from 40 to 60, more preferably in the range of from 45 to 55, more preferably in the range of from 48 to 52.

It is preferred that z is in the range of from 0 to 65, more preferably in the range of from 0 to 60, more preferably in the range of from 0 to 55, or that z is in the range of from 80 to 100, more preferably in the range of from 95 to 100, more preferably in the range of from 98 to 100.

Preferably, the first coating comprises a zeolitic material comprising one or more of copper and iron.

Preferably, the zeolitic material comprised in the first coating has a framework type selected from the group consisting of ABW, ACO, AEI, AEL, AEN, AET, AFG, AFI, AFN, AFO, AFR, AFS, AFT, AFV, AFX, AFY, AHT, ANA, APC, APD, AST, ASV, ATN, ATO, ATS, ATT, ATV, AVL, AWO, AWW, BCT, BEA, BEC, BIK, BOF, BOG, BOZ, BPH, BRE, BSV, CAN, CAS, CDO, CFI, CGF, CGS, CHA, -CHI, -CLO, CON, CSV, CZP, DAC, DDR, DFO, DFT, DOH, DON, EAB, EDI, EEI, EMT, EON, EPI, ERI, ESV, ETR, EUO, *-EWT, EZT, FAR, FAU, FER, FRA, GIS, GIU, GME, GON, GOO, HEU, IFO, IFR, -IFU, IFW, IFY, IHW, IMF, IRN, IRR, -IRY, ISV, ITE, ITG, ITH, *-ITN, ITR, ITT, -ITV, ITW, IWR, IWS, IWV, IWW, JBW, JNT, JOZ, JRY, JSN, JSR, JST, JSW, KFI, LAU, LEV, LIO, -LIT, LOS, LOV, LTA, LTF, LTJ, LTL, LTN, MAR, MAZ, MEI, MEL, MEP, MER, MFI, MFS, MON, MOR, MOZ, *MRE, MSE, MSO, MTF, MTN, MTT, MTW, MVY, MWF, MWW, NAB, NAT, NES, NON, NPO, NPT, NSI, OBW, OFF, OKO, OSI, OSO, OWE, -PAR, PAU, PCR, PHI, PON, POS, PSI, PUN, RHO, -RON, RRO, RSN, RTE, RTH, RUT, RWR, RWY, SAF, SAO, SAS, SAT, SAV, SBE, SBN, SBS, SBT, SEW, SFE, SFF, SFG, SFH, SFN, SFO, SFS, *SFV, SFW, SGT, SIV, SOD, SOF, SOS, SSF, *-SSO, SSY, STF, STI, *STO, STT, STW, -SVR, SVV, SZR, TER, THO, TOL, TON, TSC, TUN, UEI, UFI, UOS, UOV, UOZ, USI, UTL, UWY, VET, VFI, VNI, VSV, WEI, -WEN, YUG, ZON, a mixture of two or more thereof, and a mixed type of two or more thereof, more preferably selected from the group consisting of AEI, GME, CHA, MFI, BEA, FAU, MOR, a mixture of two or more thereof and a mixed type of two or more thereof, more preferably selected from the group consisting of AEI, GME, CHA, BEA, FAU, MOR, a mixture of two or more thereof and a mixed type of two or more thereof, more preferably selected from the group consisting of AEI, CHA, BEA, a mixture of two or more thereof and a mixed type of two or more thereof, wherein the zeolitic material comprised in the first coating has more preferably a framework type CHA or AEI, more preferably CHA.

Preferably from 95 to 100 weight-%, more preferably from 98 to 100 weight-%, more preferably from 99 to 100 weight-% of the framework structure of the zeolitic material consist to Si, Al, O, and optionally one or more of H and P, wherein in the framework structure, the molar ratio of Si to Al, calculated as molar $SiO_2:Al_2O_3$, is more preferably in the range of from 2:1 to 50:1, more preferably in the range of from 4:1 to 40:1, more preferably in the range of from 10:1 to 40:1, more preferably in the range of from 15:1 to 40:1, more preferably in the range of from 15:1 to 25:1 or more preferably from 30:1 to 40:1.

Preferably the zeolitic material comprised in the first coating comprises copper, wherein the amount of copper comprised in the zeolitic material, calculated as CuO, is more preferably in the range of 1 to 10 weight-%, more preferably in the range of from 2 to 8 weight-%, more preferably in the range of from 3 to 6 weight-% based on the total weight of the zeolitic material. More preferably the amount of iron, calculated as $Fe_2O_3$, comprised in the zeolitic material of the first coating, is in the range of from 0 to 0.01 weight-%, more preferably in the range of from 0 to 0.001 weight-%, more preferably in the range of from 0 to 0.0001 weight-%, based on the total weight of the zeolitic material.

Further, in the context of the present invention, it is conceivable that in addition to Cu-containing zeolitic material, preferably Cu-CHA, a certain amount of zeolitic material, preferably having a framework type CHA, in the H-form is present.

Preferably the zeolitic material comprised in the first coating comprises iron, wherein the amount of iron comprised in the zeolitic material, calculated as $Fe_2O_3$, is more preferably in the range of from 0.1 to 10.0 weight-%, more preferably in the range of from 1.0 to 7.0 weight-%, more preferably in the range of from 2.5 to 5.5 weight-%, based on the total weight of the zeolitic material, and more preferably from 95 to 100 weight-%, more preferably from 98 to 100 weight-%, more preferably from 99 to 100 weight-% of the framework structure of the zeolitic material consist to Si, Al, O, and optionally one or more of H and P, wherein in the framework structure, the molar ratio of Si to Al, calculated as $SiO_2:Al_2O_3$, is more preferably in the range of from 2:1 to 50:1, more preferably in the range of from 4:1 to 40:1, more preferably in the range of from 10:1 to 40:1, more preferably in the range of from 15:1 to 40:1, more preferably in the range of from 15:1 to 25:1 or more preferably from 30:1 to 40:1.

Preferably in the catalyst, the first coating comprises the zeolitic material at a loading in the range of from 30.51 to 183.07 g/l (0.5 to 3 $g/in^3$), more preferably in the range of from 45.77 to 122.05 g/l (0.75 to 2 $g/in^3$), more preferably in the range of from 48.82 to 97.64 g/l (0.8 to 1.6 $g/in^3$), more preferably in the range of from 48.82 to 67.13 g/l (0.8 to 1.1 $g/in^3$) or more preferably in the range of from 73.23 to 97.64 g/l (1.2 to 1.6 $g/in^3$).

In the context of the present invention, it is preferred that the zeolitic material comprised in the first coating, more preferably which has a framework type CHA, has a mean crystallite size of at least 0.5 micrometer, preferably in the range of from 0.5 to 1.5 micrometers, more preferably in the range of from 0.6 to 1.0 micrometer, more preferably in the range of from 0.6 to 0.8 micrometer determined via scanning electron microscopy.

It is preferred that the first coating further comprises a metal oxide binder, wherein the metal oxide binder more preferably comprises one or more of zirconia, alumina, titania, silica, and a mixed oxide comprising two or more of Zr, Al, Ti, and Si, more preferably comprises one or more of alumina and zirconia, more preferably comprises zirconia.

Preferably in the catalyst, the first coating comprises the metal oxide binder at a loading in the range of from 0.61 to 12.20 g/l (0.01 to 0.2 $g/in^3$), more preferably in the range of from 1.22 to 9.15 g/l (0.02 to 0.15 $g/in^3$), more preferably in the range of from 3.66 to 7.32 g/l (0.06 to 0.12 $g/in^3$).

Preferably from 95 to 100 weight-%, more preferably from 98 to 100 weight-%, more preferably from 99 to 100 weight-% of the first coating consist of a zeolitic material comprising one or more of copper and iron, and preferably the metal oxide binder as described in the foregoing.

Therefore, the present invention preferably relates to a catalyst for the oxidation of NO, for the oxidation of ammonia, for the oxidation of HC and for the selective catalytic reduction of NOx, comprising (i) a flow through substrate comprising an inlet end, an outlet end, a substrate axial length extending from the inlet end to the outlet end and a plurality of passages defined by internal walls of the flow through substrate extending therethrough;

(ii) a first coating comprising a zeolitic material comprising copper, wherein the zeolitic material comprised in the first coating has a framework type selected from the group consisting of AEI, CHA, BEA, a mixture of two or more thereof and a mixed type of two or more thereof, wherein the zeolitic material comprised in the first coating has more preferably a framework type CHA or AEI, more preferably CHA;

(iii) a second coating comprising a first platinum group metal component supported on a non-zeolitic first oxidic material and further comprising one or more of a vanadium oxide and a zeolitic material comprising one or more of copper and iron;

(iv) optionally a third coating comprising a second platinum group metal component supported on a second oxidic material;

wherein the third coating is disposed on the surface of the internal walls and under the second coating over z % of the axial length of the substrate from the outlet end to the inlet end, with z being in the range of from 0 to 100;

wherein the second coating extends over y % of the axial length of the substrate from the inlet end to the outlet end and is disposed either on the surface of the internal walls, or on the surface of the internal walls and the third coating, or on the third coating, with y being in the range of from 95 to 100;

wherein the first coating extends over x % of the axial length of the substrate from the inlet end to the outlet end and is disposed on the second coating, with x being in the range of from 20 to y.

In the context of the present invention, it may also be preferred that the first coating comprises a vanadium oxide, wherein the vanadium oxide is more preferably one or more of vanadium (V) oxide and a vanadium (IV) oxide, wherein the vanadium oxide optionally comprises one or more of tungsten, iron and antimony. More preferably the vanadium oxide is supported on an oxidic material comprising one or more of titanium, silicon and zirconium, more preferably comprising one or more of titanium and silicon, wherein more preferably, the oxidic material is one or more of titania and silica, more preferably titania, wherein the titania optionally comprises one or more of tungsten and silicon, preferably silicon.

Preferably in the catalyst, the first coating comprises the vanadium oxide, calculated as $V_2O_5$, at a loading in the range of from 30.51 to 244.09 g/l (0.5 to 4 g/in$^3$), more preferably in the range of from 61.02 to 183.07 g/l (1 to 3 g/in$^3$), more preferably in the range of from 91.53 to 152.56 g/l (1.5 to 2.5 g/in$^3$).

Preferably from 95 to 100 weight-%, more preferably from 98 to 100 weight-%, more preferably from 99 to 100 weight-% of the second coating consist of the vanadium oxide.

Therefore, the present invention preferably relates to a catalyst for the oxidation of NO, for the oxidation of ammonia, for the oxidation of HC and for the selective catalytic reduction of NOx, comprising (i) a flow through substrate comprising an inlet end, an outlet end, a substrate axial length extending from the inlet end to the outlet end and a plurality of passages defined by internal walls of the flow through substrate extending therethrough;

(ii) a first coating comprising a vanadium oxide, wherein the vanadium oxide is more preferably one or more of vanadium (V) oxide and a vanadium (IV) oxide, wherein the vanadium oxide optionally comprises one or more of tungsten, iron and antimony;

(iii) a second coating comprising a first platinum group metal component supported on a non-zeolitic first oxidic material and further comprising one or more of a vanadium oxide and a zeolitic material comprising one or more of copper and iron;

(iv) optionally a third coating comprising a second platinum group metal component supported on a second oxidic material;

wherein the third coating is disposed on the surface of the internal walls and under the second coating over z % of the axial length of the substrate from the outlet end to the inlet end, with z being in the range of from 0 to 100;

wherein the second coating extends over y % of the axial length of the substrate from the inlet end to the outlet end and is disposed either on the surface of the internal walls, or on the surface of the internal walls and the third coating, or on the third coating, with y being in the range of from 95 to 100;

wherein the first coating extends over x % of the axial length of the substrate from the inlet end to the outlet end and is disposed on the second coating, with x being in the range of from 20 to y.

In the context of the present invention, it is preferred that from 0 to 0.0001 weight-%, more preferably from 0 to 0.00001 weight-% of the first coating consist of palladium, preferably of palladium, platinum and rhodium, more preferably of palladium, platinum, rhodium, osmium and iridium.

It is preferred that the first platinum group metal component comprised in the second coating is one or more of platinum, palladium and rhodium, more preferably one or more of platinum and palladium, wherein more preferably, the first platinum group metal component is platinum or the first platinum group metal is palladium and platinum.

Preferably the non-zeolitic first oxidic material on which the first platinum group metal component comprised in the second coating is supported comprises, more preferably consists of, one or more of alumina, zirconia, titania, silica, ceria, and a mixed oxide comprising two or more of Al, Zr, Ti, Si, and Ce, preferably one or more of alumina, zirconia, titania and silica.

More preferably from 90 to 100 weight-%, more preferably from 95 to 100 weight-%, more preferably from 99 to 100 weight-% of the non-zeolitic first oxidic material consist of alumina and optionally zirconia, wherein from 60 to 100 weight-%, more preferably from 70 to 90 weight-%, more preferably from 75 to 85 weight-% of the non-zeolitic first oxidic material consist of alumina and from 0 to 40 weight-%, more preferably 10 to 30 weight-%, more preferably from 15 to 25 weight-% of the non-zeolitic first oxidic material consist of zirconia. Alternatively, more preferably from 90 to 100 weight-%, more preferably from 95 to 100 weight-%, more preferably from 99 to 100 weight-% of the non-zeolitic first oxidic material consist of titania and optionally silica, wherein from 60 to 100 weight-%, more preferably from 80 to 100 weight-%, more preferably from 85 to 95 weight-%, of the non-zeolitic first oxidic material consists of titania and from 0 to 40 weight-%, more preferably 0 to 20 weight-%, more preferably 5 to 15 weight-% of the non-zeolitic first oxidic material consist of silica.

Preferably the second coating comprises a zeolitic material comprising one or more of copper and iron.

Preferably the zeolitic material comprised in the second coating has a framework type selected from the group consisting of ABW, ACO, AEI, AEL, AEN, AET, AFG, AFI, AFN, AFO, AFR, AFS, AFT, AFV, AFX, AFY, AHT, ANA, APC, APD, AST, ASV, ATN, ATO, ATS, ATT, ATV, AVL, AWO, AWW, BCT, BEA, BEC, BIK, BOF, BOG, BOZ, BPH, BRE, BSV, CAN, CAS, CDO, CFI, CGF, CGS, CHA, -CHI, -CLO, CON, CSV, CZP, DAC, DDR, DFO, DFT, DOH, DON, EAB, EDI, EEI, EMT, EON, EPI, ERI, ESV, ETR, EUO, *-EWT, EZT, FAR, FAU, FER, FRA, GIS, GIU, GME, GON, GOO, HEU, IFO, IFR, -IFU, IFW, IFY, IHW, IMF, IRN, IRR, -IRY, ISV, ITE, ITG, ITH, *-ITN, ITR, ITT, -ITV, ITW, IWR, IWS, IWV, IWW, JBW, JNT, JOZ, JRY, JSN, JSR, JST, JSW, KFI, LAU, LEV, LIO, -LIT, LOS, LOV, LTA, LTF, LTJ, LTL, LTN, MAR, MAZ, MEI, MEL, MEP, MER, MFI, MFS, MON, MOR, MOZ, *MRE, MSE, MSO, MTF, MTN, MTT, MTW, MVY, MWF, MWW, NAB, NAT, NES, NON, NPO, NPT, NSI, OBW, OFF, OKO, OSI, OSO, OWE, -PAR, PAU, PCR, PHI, PON, POS, PSI, PUN, RHO, -RON, RRO, RSN, RTE, RTH, RUT, RWR, RWY, SAF, SAO, SAS, SAT, SAV, SBE, SBN, SBS, SBT, SEW, SFE, SFF, SFG, SFH, SFN, SFO, SFS, *SFV, SFW, SGT, SIV, SOD, SOF, SOS, SSF, *-SSO, SSY, STF, STI, *STO, STT, STW, -SVR, SVV, SZR, TER, THO, TOL, TON, TSC, TUN, UEI, UFI, UOS, UOV, UOZ, USI, UTL, UWY, VET, VFI, VNI, VSV, WEI, -WEN, YUG, ZON, a mixture of two or more thereof, and a mixed type of two or more thereof, more preferably selected from the group consisting of AEI, GME, CHA, MFI, BEA, FAU, MOR, a mixture of two or more thereof and a mixed type of two or more thereof, more preferably selected from the group consisting of AEI, GME, CHA, BEA, FAU, MOR, a mixture of two or more thereof and a mixed type of two or more thereof, more preferably selected from the group consisting of AEI, CHA, BEA, a mixture of two or more thereof and a mixed type of two or more thereof, wherein the zeolitic material comprised in the second coating has more preferably a framework type CHA or AEI, more preferably CHA.

Preferably the zeolitic material comprised in the second coating comprises copper, wherein the amount of copper comprised in the zeolitic material, calculated as CuO, is more preferably in the range of 1 to 10 weight-%, more preferably in the range of from 2 to 8 weight-%, more preferably in the range of from 3 to 6 weight-% based on the total weight of the zeolitic material. More preferably the amount of iron comprised in the zeolitic material of the second coating, calculated as $Fe_2O_3$, is in the range of from 0 to 0.01 weight-%, more preferably in the range of from 0 to 0.001 weight-%, more preferably in the range of from 0 to 0.0001 weight-%, based on the total weight of the zeolitic material.

Preferably from 95 to 100 weight-%, more preferably from 98 to 100 weight-%, more preferably from 99 to 100 weight-% of the framework structure of the zeolitic material consist to Si, Al, O, and optionally one or more of H and P, wherein in the framework structure, the molar ratio of Si to Al, calculated as $SiO_2:Al_2O_3$, is more preferably in the range of from 2:1 to 50:1, more preferably in the range of from 4:1 to 40:1, more preferably in the range of from 10:1 to 40:1, more preferably in the range of from 15: to 40:1, more preferably in the range of from 15:1 to 25:1 or more preferably from 30:1 to 40:1.

Further, in the context of the present invention, it is conceivable that in addition to Cu-containing zeolitic material, preferably Cu-CHA, a certain amount of zeolitic material, preferably having a framework type CHA, in the H-form is present.

Preferably the zeolitic material comprised in the second coating comprises iron, wherein the amount of iron comprised in the zeolitic material, calculated as $Fe_2O_3$, is more preferably in the range of from 0.1 to 10.0 weight-%, more preferably in the range of from 1.0 to 7.0 weight-%, more preferably in the range of from 2.5 to 5.5 weight-%, based on the total weight of the zeolitic material, and more preferably from 95 to 100 weight-%, more preferably from 98 to 100 weight-%, more preferably from 99 to 100 weight-% of the framework structure of the zeolitic material consist to Si, Al, O, and optionally one or more of H and P, wherein in the framework structure, the molar ratio of Si to Al, calculated as $SiO_2:Al_2O_3$, is more preferably in the range of from 2:1 to 50:1, more preferably in the range of from 4:1 to 40:1, more preferably in the range of from 10:1 to 40:1, more preferably in the range of from 15:1 to 40:1, more preferably in the range of from 15:1 to 25:1 or more preferably from 30:1 to 40:1.

Preferably in the catalyst, the second coating comprises the zeolitic material at a loading in the range of from 45.77 to 305.12 g/l (0.75 to 5 g/in$^3$), more preferably in the range of from 61.02 to 183.07 g/l (1 to 3 g/in$^3$), more preferably in the range of from 97.64 to 158.66 g/l (1.6 to 2.6 g/in$^3$).

In the context of the present invention, it is preferred that the zeolitic material comprised in the second coating, more preferably which has a framework type CHA, has a mean crystallite size of at least 0.5 micrometer, more preferably in the range of from 0.5 to 1.5 micrometers, more preferably in the range of from 0.6 to 1.0 micrometer, more preferably in the range of from 0.6 to 0.8 micrometer determined via scanning electron microscopy.

It is preferred that the second coating further comprises a metal oxide binder, wherein the metal oxide binder more preferably comprises one or more of zirconia, alumina, titania, silica, and a mixed oxide comprising two or more of Zr, Al, Ti and Si, more preferably one or more of alumina and zirconia, more preferably zirconia.

Preferably in the catalyst, the second coating comprises the metal oxide binder at a loading in the range of from 1.22 to 12.20 g/l (0.02 to 0.2 g/in$^3$), more preferably in the range of from 3.05 to 9.15 g/l (0.05 to 0.15 g/in$^3$), more preferably in the range of from 4.88 to 7.32 g/l (0.08 to 0.12 g/in$^3$).

Preferably from 90 to 100 weight-%, more preferably from 95 to 100 weight-%, more preferably from 98 to 100 weight-% of the second coating consist of the first platinum group metal component supported on the non-zeolitic first oxidic material and the zeolitic material comprising one or more of copper and iron, and preferably a metal oxide binder as defined in the foregoing.

Therefore, the present invention preferably relates to a catalyst for the oxidation of NO, for the oxidation of ammonia, for the oxidation of HC and for the selective catalytic reduction of NOx, comprising (i) a flow through substrate comprising an inlet end, an outlet end, a substrate axial length extending from the inlet end to the outlet end and a plurality of passages defined by internal walls of the flow through substrate extending therethrough;

(ii) a first coating comprising a zeolitic material comprising copper, wherein the zeolitic material comprised in the first coating has a framework type selected from the group consisting of AEI, CHA, BEA, a mixture of two or more thereof and a mixed type of two or more thereof, more preferably a framework type CHA or AEI, more preferably CHA; or a first coating comprising a vanadium oxide, wherein the vanadium oxide is more preferably one or more of vanadium (V) oxide and a vanadium (IV) oxide, wherein the vanadium oxide optionally comprises one or more of tungsten, iron and antimony;

(iii) a second coating comprising a first platinum group metal component supported on a non-zeolitic first oxidic material, wherein the first platinum group metal component is platinum or palladium and platinum and wherein the non-zeolitic first oxidic material comprises, more preferably consists of, one or more of alumina, zirconia, titania, silica, ceria, and a mixed oxide comprising two or more of Al, Zr, Ti, Si, and Ce, more preferably one or more of alumina, zirconia, titania and silica, and further comprising a zeolitic material comprising copper, wherein the zeolitic material comprised in the second coating has a framework type selected from the group consisting of AEI, CHA, BEA, a mixture of two or more thereof and a mixed type of two or more thereof, more preferably a framework type CHA or AEI, more preferably CHA;

(iv) optionally a third coating comprising a second platinum group metal component supported on a second oxidic material;

wherein the third coating is disposed on the surface of the internal walls and under the second coating over z % of the axial length of the substrate from the outlet end to the inlet end, with z being in the range of from 0 to 100;

wherein the second coating extends over y % of the axial length of the substrate from the inlet end to the outlet end and is disposed either on the surface of the internal walls, or on the surface of the internal walls and the third coating, or on the third coating, with y being in the range of from 95 to 100;

wherein the first coating extends over x % of the axial length of the substrate from the inlet end to the outlet end and is disposed on the second coating, with x being in the range of from 20 to y.

In the context of the present invention, it may also be preferred that the second coating comprises a vanadium oxide, wherein the vanadium oxide is more preferably one or more of vanadium (V) oxide and a vanadium (IV) oxide, wherein the vanadium oxide optionally comprises one or more of tungsten, iron and antimony. More preferably the vanadium oxide is supported on an oxidic material comprising one or more of titanium, silicon and zirconium, more preferably an oxidic material comprising one or more of titanium and silicon, more preferably titania and silica, more preferably on titania, wherein titania optionally contains one or more of tungsten and silicon, preferably silicon.

Preferably from 90 to 100 weight-%, more preferably from 95 to 100 weight-%, more preferably from 98 to 100 weight-%, more preferably from 99 to 100 weight-%, of the second coating consist of the first platinum group metal component supported on the non-zeolitic first oxidic material and vanadium oxide supported on an oxidic material.

Preferably in the catalyst, the second coating comprises the vanadium oxide, calculated as $V_2O_5$, at a loading in the range of from 30.51 to 244.09 g/l (0.5 to 4 g/in$^3$), more preferably in the range of from 61.02 to 183.07 g/l (1 to 3 g/in$^3$), more preferably in the range of from 91.53 to 152.56 g/l (1.5 to 2.5 g/in$^3$).

Therefore, the present invention preferably relates to a catalyst for the oxidation of NO, for the oxidation of ammonia, for the oxidation of HC and for the selective catalytic reduction of NOx, comprising (i) a flow through substrate comprising an inlet end, an outlet end, a substrate axial length extending from the inlet end to the outlet end and a plurality of passages defined by internal walls of the flow through substrate extending therethrough;

(ii) a first coating comprising a zeolitic material comprising copper, wherein the zeolitic material comprised in the first coating has a framework type selected from the group consisting of AEI, CHA, BEA, a mixture of two or more thereof and a mixed type of two or more thereof, more preferably a framework type CHA or AEI, more preferably CHA; or a first coating comprising a vanadium oxide, wherein the vanadium oxide is more preferably one or more of vanadium (V) oxide and a vanadium (IV) oxide, wherein the vanadium oxide optionally comprises one or more of tungsten, iron and antimony;

(iii) a second coating comprising a first platinum group metal component supported on a non-zeolitic first oxidic material, wherein the first platinum group metal component is platinum or palladium and platinum and wherein the non-zeolitic first oxidic material comprises, more preferably consists of, one or more of alumina, zirconia, titania, silica, ceria, and a mixed oxide comprising two or more of Al, Zr, Ti, Si, and Ce, more preferably one or more of alumina, zirconia, titania and silica, and further comprising a vanadium oxide, wherein the vanadium oxide is more preferably one or more of vanadium (V) oxide and a vanadium (IV) oxide, wherein the vanadium oxide optionally comprises one or more of tungsten, iron and antimony;

(iv) optionally a third coating comprising a second platinum group metal component supported on a second oxidic material;

wherein the third coating is disposed on the surface of the internal walls and under the second coating over z % of the axial length of the substrate from the outlet end to the inlet end, with z being in the range of from 0 to 100;

wherein the second coating extends over y % of the axial length of the substrate from the inlet end to the outlet end and is disposed either on the surface of the internal walls, or on the surface of the internal walls and the third coating, or on the third coating, with y being in the range of from 95 to 100; wherein the first coating extends over x % of the axial length of the substrate from the inlet end to the outlet end and is disposed on the second coating, with x being in the range of from 20 to y.

In the context of the present invention, it is preferred that in the catalyst, the second coating and the optional third coating together have a platinum group metal component loading, calculated as elemental platinum group metal, in the range of from 0.035 to 1.41 g/l (1 to 40 g/ft$^3$), more preferably in the range of from 0.071 to 0.53 g/l (2 to 15 g/ft$^3$), preferably in the range of from 0.11 to 0.35 g/l (3 to 10 g/ft$^3$), more preferably in the range of from 0.16 to 0.32 g/l (4.5 to 9.0 g/ft$^3$), more preferably in the range of from 0.26 to 0.30 g/l (7.5 to 8.5 g/ft$^3$).

Preferably the catalyst has a loading of the first non-zeolitic oxidic material together with the optional second oxidic material in the range of from 6.10 to 183.07 g/l (0.1 to 3 g/in$^3$), preferably in the range of from 12.20 to 122.05 g/l (0.2 to 2 g/in$^3$), more preferably in the range of from 24.41 to 91.53 g/l (0.4 to 1.5 g/in$^3$), more preferably in the range of from 36.61 to 73.23 g/l (0.6 to 1.2 g/in$^3$).

In the context of the present invention, it is preferred that the catalyst according to present invention does not comprise a third coating according to (iv).

Preferably the catalyst consists of the flow through substrate, the first coating and the second coating, wherein the first coating is disposed on the second coating and the second coating is disposed on the surface of the internal walls.

More preferably, the present invention relates to a catalyst for the oxidation of NO, for the oxidation of ammonia, for the oxidation of HC and for the selective catalytic reduction of NOx, comprising (i) a flow through substrate comprising an inlet end, an outlet end, a substrate axial length extending from the inlet end to the outlet end and a plurality of passages defined by internal walls of the flow through substrate extending therethrough;

(ii) a first coating comprising a zeolitic material comprising copper, wherein the zeolitic material comprised in the first coating has a framework type selected from the group consisting of AEI, CHA, BEA, a mixture of two or more thereof and a mixed type of two or more thereof, more preferably a framework type CHA or AEI, more preferably CHA;

(iii) a second coating comprising a first platinum group metal component supported on a non-zeolitic first oxidic material, wherein the first platinum group metal component is platinum or palladium and platinum and wherein the non-zeolitic first oxidic material comprises, more preferably consists of, one or more of alumina, zirconia, titania, silica, ceria, and a mixed oxide comprising two or more of Al, Zr, Ti, Si, and Ce, more preferably one or more of alumina, zirconia, titania and silica, and further comprising a zeolitic material comprising copper, wherein the zeolitic material comprised in the second coating has a framework type selected from the group consisting of AEI, CHA, BEA, a mixture of two or more thereof and a mixed type of two or more thereof, more preferably a framework type CHA or AEI, more preferably CHA;

wherein the second coating extends over y % of the axial length of the substrate from the inlet end to the outlet end and is disposed on the surface of the internal walls, with y being in the range of from 95 to 100, more preferably in the range of from 95 to 100, more preferably in the range of from 98 to 100, more preferably in the range of from 99 to 100;

wherein the first coating extends over x % of the axial length of the substrate from the inlet end to the outlet end and is disposed on the second coating, with x being in the range of from 20 to y, more preferably x being y or x being in the range of from 20 to 60.

In the context of the present invention, it is preferred that the second coating comprises, more preferably consists of, (A) an inlet coating comprising a platinum group metal component supported on a non-zeolitic oxidic material and further comprises one or more of a vanadium oxide and a zeolitic material comprising one or more of copper and iron; and (B) an outlet coating comprising a platinum group metal component supported on a non-zeolitic oxidic material and further comprises one or more of a vanadium oxide and a zeolitic material comprising one or more of copper and iron;

wherein the inlet coating extends over y1% of the axial length of the substrate from the inlet end to the outlet end and is disposed either on the surface of the internal walls, or on the surface of the internal walls and the third coating, or on the third coating;

wherein the outlet coating extends over y2% of the axial length of the substrate from the outlet end to the inlet end and is disposed either on the surface of the internal walls, or on the surface of the internal walls and the third coating, or on the third coating;

wherein y1 is in the range of from 45 to 55, preferably in the range of from 48 to 50, and y2 is in the range of from 45 to 55, preferably in the range of from 48 to 50;

wherein the inlet coating comprises the platinum group metal component at a loading (I1) and the outlet coating comprises the platinum group metal component at a loading (I2), wherein the ratio of (I1):(I2) is in the range of from 0.2:1 to 0.75:1, preferably in the range of from 0.3:1 to 0.6:1, more preferably in the range of from 0.4:1 to 0.5:1;

wherein the first platinum group metal component comprises, preferably consists of, the platinum group metal component of the inlet coating and the platinum group metal component of the outlet coating;

wherein the non-zeolitic first oxidic material comprises, preferably consists of, the non-zeolitic oxidic material of the inlet coating and the non-zeolitic oxidic material of the outlet coating.

As to the inlet coating of the second coating, it is preferred that the platinum group metal component comprised therein is one or more of platinum, palladium and rhodium, more preferably one or more of platinum and palladium, more preferably platinum, or palladium and platinum.

As to the inlet coating of the second coating, it is preferred that the non-zeolitic oxidic material supporting the platinum group metal component comprises, more preferably consists of, one or more of alumina, zirconia, titania, silica, ceria, and a mixed oxide comprising two or more of Al, Zr, Ti, Si, and Ce, more preferably one or more of alumina, zirconia, titania and silica. More preferably from 90 to 100 weight-%, more preferably from 95 to 100 weight-%, more preferably from 99 to 100 weight-% of the non-zeolitic oxidic material consist of alumina and optionally zirconia, wherein 60 to 100 weight-%, more preferably from 70 to 90 weight-%, more preferably from 75 to 85 weight-%, of the non-zeolitic oxidic material consist of alumina and from 0 to 40 weight-%, more preferably 10 to 30 weight-%, more preferably from 15 to 25 weight-% of the non-zeolitic oxidic material consist of zirconia. Alternatively, more preferably from 90 to 100 weight-%, more preferably from 95 to 100 weight-%, more preferably from 99 to 100 weight-% of the non-zeolitic oxidic material consist of titania and optionally silica, wherein 60 to 100 weight-%, more preferably from 80 to 100 weight-%, more preferably from 85 to 95 weight-%, of the non-zeolitic oxidic material consists of titania and from 0 to 40 weight-%, more preferably 0 to 20 weight-%, more preferably 5 to 15 weight-% of the non-zeolitic oxidic material consist of silica.

Preferably, the inlet coating of the second coating comprises a zeolitic material comprising one or more of copper and iron.

Preferably, the zeolitic material comprised in the inlet coating of the second coating has a framework type selected from the group consisting of ABW, ACO, AEI, AEL, AEN, AET, AFG, AFI, AFN, AFO, AFR, AFS, AFT, AFV, AFX, AFY, AHT, ANA, APC, APD, AST, ASV, ATN, ATO, ATS, ATT, ATV, AVL, AWO, AWW, BCT, BEA, BEC, BIK, BOF, BOG, BOZ, BPH, BRE, BSV, CAN, CAS, CDO, CFI, CGF, CGS, CHA, -CHI, -CLO, CON, CSV, CZP, DAC, DDR, DFO, DFT, DOH, DON, EAB, EDI, EEI, EMT, EON, EPI, ERI, ESV, ETR, EUO, -EWT, EZT, FAR, FAU, FER, FRA, GIS, GIU, GME, GON, GOO, HEU, IFO, IFR, -IFU, IFW, IFY, IHW, IMF, IRN, IRR, -IRY, ISV, ITE, ITG, ITH, *-ITN, ITR, ITT, -ITV, ITW, IWR, IWS, IWV, IWW, JBW, JNT, JOZ, JRY, JSN, JSR, JST, JSW, KFI, LAU, LEV, LIO, -LIT, LOS, LOV, LTA, LTF, LTJ, LTL, LTN, MAR, MAZ, MEI, MEL, MEP, MER, MFI, MFS, MON, MOR, MOZ, *MRE, MSE, MSO, MTF, MTN, MTT, MTW, MW, MWF, MWW, NAB, NAT, NES, NON, NPO, NPT, NSI, OBW, OFF, OKO, OSI, OSO, OWE, -PAR, PAU, PCR, PHI, PON, POS, PSI, PUN, RHO, -RON, RRO, RSN, RTE, RTH, RUT, RWR, RWY, SAF, SAO, SAS, SAT, SAV, SBE, SBN, SBS, SBT, SEW, SFE, SFF, SFG, SFH, SFN, SFO, SFS, *SFV, SFW, SGT, SIV, SOD, SOF, SOS, SSF, *-SSO, SSY, STF, STI, *STO, STT, STW, -SVR, SW, SZR, TER, THO, TOL, TON, TSC, TUN, UEI, UFI, UOS, UOV, UOZ, USI, UTL, UWY, VET, VFI, VNI, VSV, WEI, -WEN, YUG, ZON, a mixture of two or more thereof, and a mixed type of two or more thereof, more preferably selected from the group consisting of AEI, GME, CHA, MFI, BEA, FAU, MOR, a mixture of two or more thereof and a mixed type of two or more thereof, more preferably selected from the group consisting of AEI, GME, CHA, BEA, FAU, MOR, a mixture of two or more thereof and a mixed type of two or more thereof, more preferably selected from the group consisting of AEI, CHA, BEA, a mixture of two or more thereof and a mixed type of two or more thereof, wherein the zeolitic material comprised in the inlet coating has more preferably a framework type CHA or AEI, more preferably CHA.

Preferably the zeolitic material comprised in the inlet coating of the second coating comprises copper, wherein the amount of copper comprised in the zeolitic material, calculated as CuO, is more preferably in the range of 1 to 10 weight-%, more preferably in the range of from 2 to 8 weight-%, more preferably in the range of from 3 to 6 weight-% based on the total weight of the zeolitic material. More preferably the amount of iron comprised in the zeolitic material of the inlet coating, calculated as $Fe_2O_3$, is in the range of from 0 to 0.01 weight-%, more preferably in the range of from 0 to 0.001 weight-%, more preferably in the range of from 0 to 0.0001 weight-%, based on the total weight of the zeolitic material.

Preferably from 95 to 100 weight-%, more preferably from 98 to 100 weight-%, more preferably from 99 to 100 weight-% of the framework structure of the zeolitic material of the inlet coating consist to Si, Al, O, and optionally one or more of H and P, wherein in the framework structure, the molar ratio of Si to Al, calculated as $SiO_2:Al_2O_3$, is more preferably in the range of from 2:1 to 50:1, more preferably in the range of from 4:1 to 40:1, more preferably in the range of from 10:1 to 40:1, more preferably in the range of from 15:1 to 40:1, more preferably in the range of from 15:1 to 25:1 or more preferably from 30:1 to 40:1.

Further, in the context of the present invention, it is conceivable that in addition to Cu-containing zeolitic material, preferably Cu-CHA, a certain amount of zeolitic material, preferably having a framework type CHA, in the H-form is present.

Preferably the zeolitic material comprised in the inlet coating of the second coating comprises iron, wherein the amount of iron comprised in the zeolitic material, calculated as $Fe_2O_3$, is more preferably in the range of from 0.1 to 10.0 weight-%, more preferably in the range of from 1.0 to 7.0 weight-%, more preferably in the range of from 2.5 to 5.5 weight-%, based on the total weight of the zeolitic material, and more preferably from 95 to 100 weight-%, more preferably from 98 to 100 weight-%, more preferably from 99 to 100 weight-% of the framework structure of the zeolitic material consist to Si, Al, O, and optionally one or more of H and P, wherein in the framework structure, the molar ratio of Si to Al, calculated as $SiO_2:Al_2O_3$, is more preferably in the range of from 2:1 to 50:1, more preferably in the range of from 4:1 to 40:1, more preferably in the range of from 10:1 to 40:1, more preferably in the range of from 15:1 to 40:1, more preferably in the range of from 15:1 to 25:1 or more preferably from 30:1 to 40:1.

It is preferred that in the catalyst, the inlet coating of the second coating comprises the zeolitic material at a loading in the range of from 45.77 to 305.12 g/l (0.75 to 5 $g/in^3$), more preferably in the range of from 61.02 to 183.07 g/l (1 to 3 $g/in^3$), more preferably in the range of from 97.64 to 158.66 g/l (1.6 to 2.6 $g/in^3$).

In the context of the present invention, it is preferred that the zeolitic material comprised in the inlet coating of the second coating, more preferably which has a framework type CHA, has a mean crystallite of at least 0.5 micrometer, more preferably in the range of from 0.5 to 1.5 micrometers, more preferably in the range of from 0.6 to 1.0 micrometer, more preferably in the range of from 0.6 to 0.8 micrometer determined via scanning electron microscopy.

Preferably the inlet coating of the second coating further comprises a metal oxide binder, wherein the metal oxide binder more preferably comprises one or more of zirconia, alumina, titania, silica, and a mixed oxide comprising two or more of Zr, Al, Ti, and Si, more preferably one or more of alumina and zirconia, more preferably zirconia.

Preferably in the catalyst, the inlet coating of the second coating comprises the metal oxide binder at a loading in the range of from 1.22 to 12.20 g/l (0.02 to 0.2 $g/in^3$), more preferably in the range of from 3.05 to 9.15 g/l (0.05 to 0.15 $g/in^3$), more preferably in the range of from 4.88 to 7.32 g/l (0.08 to 0.12 $g/in^3$).

Preferably from 90 to 100 weight-%, more preferably from 95 to 100 weight-%, more preferably from 98 to 100 weight-% of the inlet coating of the second coating consist of the platinum group metal component supported on the non-zeolitic oxidic material and a zeolitic material comprising one or more of copper and iron, and more preferably the metal oxide binder as defined in the foregoing.

It may also be preferred that the inlet coating of the second coating comprises a vanadium oxide, wherein the vanadium oxide is preferably one or more of vanadium (V) oxide and a vanadium (IV) oxide, wherein the vanadium oxide optionally contains tungsten, iron and antimony.

More preferably the vanadium oxide is supported on an oxidic material comprising one or more of titanium, silicon and zirconium, more preferably an oxidic material comprising one or more of titanium and silicon, more preferably titania and silica, more preferably on titania, wherein titania optionally contains one or more of tungsten and silicon, preferably silicon.

Preferably from 90 to 100 weight-%, more preferably from 95 to 100 weight-%, more preferably from 98 to 100 weight-%, more preferably from 99 to 100 weight-%, of the inlet coating of the second coating consist of the platinum group metal component supported on the non-zeolitic oxidic material and the vanadium oxide.

Preferably in the catalyst, the inlet coating of the second coating comprises the vanadium oxide, calculated as $V_2O_5$, at a loading in the range of from 30.51 to 305.12 g/l (0.5 to 5 $g/in^3$), more preferably in the range of from 61.02 to 244.09 g/l (1 to 4 $g/in^3$), more preferably in the range of from 122.05 to 213.58 g/l (2 to 3.5 $g/in^3$).

In the context of the present invention, it is preferred that in the catalyst, the inlet coating comprises the platinum group metal component, calculated as elemental platinum group metal, at a loading in the range of from 0.035 to 0.28 $g/l$ (1 to 8 $g/ft^3$), preferably in the range of 0.11 to 0.25 g/l (3 to 7 $g/ft^3$), more preferably in the range of from 0.14 to 0.21 g/l (4 to 6 $g/ft^3$).

As to the outlet coating of the second coating, it is preferred that the platinum group metal component comprised therein is one or more of platinum, palladium and rhodium, more preferably one or more of platinum and palladium, more preferably platinum or more preferably palladium and platinum.

Preferably the non-zeolitic oxidic material supporting the platinum group metal component comprised in the outlet coating of the second coating comprises, more preferably consists of, one or more of alumina, zirconia, titania, silica, ceria, and a mixed oxide comprising one or more of Ai, Zr, Ti, Si and Ce, more preferably one or more of alumina, zirconia, titania and silica. More preferably from 90 to 100 weight-%, more preferably from 95 to 100 weight-%, more preferably from 99 to 100 weight-% of the non-zeolitic oxidic material consist of alumina and optionally zirconia, wherein 60 to 100 weight-%, more preferably from 70 to 90 weight-%, more preferably from 75 to 85 weight-%, of the non-zeolitic oxidic material consist of alumina and from 0 to 40 weight-%, more preferably 10 to 30 weight-%, more preferably from 15 to 25 weight-% of the non-zeolitic oxidic material consist of zirconia. Alternatively, more preferably from 90 to 100 weight-%, more preferably from 95 to 100 weight-%, more preferably from 99 to 100 weight-% of the non-zeolitic oxidic material consist of titania and optionally silica, wherein 60 to 100 weight-%, more preferably from 80 to 100 weight-%, more preferably from 85 to 95 weight-%, of the non-zeolitic oxidic material consists of titania and from 0 to 40 weight-%, more preferably 0 to 20 weight-%, more preferably 5 to 15 weight-% of the non-zeolitic oxidic material consist of silica.

It is preferred that the outlet coating of the second coating comprises a zeolitic material comprising one or more of copper and iron.

Preferably the zeolitic material comprised in the outlet coating of the second coating has a framework type selected from the group consisting of ABW, ACO, AEI, AEL, AEN, AET, AFG, AFI, AFN, AFO, AFR, AFS, AFT, AFV, AFX, AFY, AHT, ANA, APC, APD, AST, ASV, ATN, ATO, ATS, ATT, ATV, AVL, AWO, AWW, BCT, BEA, BEC, BIK, BOF, BOG, BOZ, BPH, BRE, BSV, CAN, CAS, CDO, CFI, CGF, CGS, CHA, -CHI, -CLO, CON, CSV, CZP, DAC, DDR, DFO, DFT, DOH, DON, EAB, EDI, EEI, EMT, EON, EPI, ERI, ESV, ETR, EUO, -EWT, EZT, FAR, FAU, FER, FRA, GIS, GIU, GME, GON, GOO, HEU, IFO, IFR, -IFU, IFW, IFY, IHW, IMF, IRN, IRR, -IRY, ISV, ITE, ITG, ITH, *-ITN, ITR, ITT, -ITV, ITW, IWR, IWS, IWV, IWW, JBW, JNT, JOZ, JRY, JSN, JSR, JST, JSW, KFI, LAU, LEV, LIO, -LIT, LOS, LOV, LTA, LTF, LTJ, LTL, LTN, MAR, MAZ, MEI, MEL, MEP, MER, MFI, MFS, MON, MOR, MOZ, *MRE, MSE, MSO, MTF, MTN, MTT, MTW, MW, MWF, MWW, NAB, NAT, NES, NON, NPO, NPT, NSI, OBW, OFF, OKO, OSI, OSO, OWE, -PAR, PAU, PCR, PHI, PON, POS, PSI, PUN, RHO, -RON, RRO, RSN, RTE, RTH, RUT, RWR, RWY, SAF, SAO, SAS, SAT, SAV, SBE, SBN, SBS, SBT, SEW, SFE, SFF, SFG, SFH, SFN, SFO, SFS, *SFV, SFW, SGT, SIV, SOD, SOF, SOS, SSF, *-SSO, SSY, STF, STI, *STO, STT, STW, -SVR, SW, SZR, TER, THO, TOL, TON, TSC, TUN, UEI, UFI, UOS, UOV, UOZ, USI, UTL, UWY, VET, VFI, VNI, VSV, WEI, -WEN, YUG, ZON, a mixture of two or more thereof, and a mixed type of two or more thereof, more preferably selected from the group consisting of AEI, GME, CHA, MFI, BEA, FAU, MOR, a mixture of two or more thereof and a mixed type of two or more thereof. More preferably the zeolitic material comprised in the outlet coating of the second coating has a framework type selected from the group consisting of AEI, GME, CHA, BEA, FAU, MOR, a mixture of two or more thereof and a mixed type of two or more thereof, more preferably selected from the group consisting of AEI, CHA, BEA, a mixture of two or more thereof and a mixed type of two or more thereof, wherein the zeolitic material comprised in the outlet coating has more preferably a framework type CHA or AEI. More preferably the zeolitic material comprised in the outlet coating of the second coating has a framework type CHA.

Preferably from 95 to 100 weight-%, more preferably from 98 to 100 weight-%, more preferably from 99 to 100 weight-% of the framework structure of the zeolitic material of the outlet coating consist to Si, Al, O, and optionally one or more of H and P, wherein in the framework structure, the molar ratio of Si to Al, calculated as $SiO_2:Al_2O_3$, is more preferably in the range of from 2:1 to 50:1, more preferably in the range of from 4:1 to 40:1, more preferably in the range of from 10:1 to 40:1, more preferably in the range of from 15:1 to 40:1. More preferably in the framework structure, the molar ratio of Si to Al, calculated as $SiO_2:Al_2O_3$, is in the range of from 15:1 to 25:1. Alternatively, more preferably in the framework structure, the molar ratio of Si to Al, calculated as $SiO_2:Al_2O_3$, is in the range of from 30:1 to 40:1.

Preferably the zeolitic material comprised in the outlet coating of the second coating comprises copper, wherein the amount of copper comprised in the zeolitic material, calculated as CuO, is more preferably in the range of 1 to 10 weight-%, more preferably in the range of from 2 to 8 weight-%, more preferably in the range of from 3 to 6 weight-% based on the total weight of the zeolitic material. More preferably the amount of iron comprised in the zeolitic material of the outlet coating is in the range of from 0 to 0.01 weight-%, more preferably in the range of from 0 to 0.001 weight-%, more preferably in the range of from 0 to 0.0001 weight-%, based on the total weight of the zeolitic material.

Further, in the context of the present invention, it is conceivable that in addition to Cu-containing zeolitic material, preferably Cu-CHA, a certain amount of zeolitic material, preferably having a framework type CHA, in the H-form is present.

Preferably the zeolitic material comprised in the outlet coating of the second coating comprises iron, wherein the amount of iron comprised in the zeolitic material, calculated as $Fe_2O_3$, is more preferably in the range of from 0.1 to 10.0 weight-%, more preferably in the range of from 1.0 to 7.0 weight-%, more preferably in the range of from 2.5 to 5.5 weight-%, based on the total weight of the zeolitic material, and more preferably from 95 to 100 weight-%, more preferably from 98 to 100 weight-%, more preferably from 99 to 100 weight-% of the framework structure of the zeolitic material consist to Si, Al, O, and optionally one or more of H and P, wherein in the framework structure, the molar ratio of Si to Al, calculated as $SiO_2:Al_2O_3$, is more preferably in the range of from 2:1 to 50:1, more preferably in the range of from 4:1 to 40:1, more preferably in the range of from 10:1 to 40:1, more preferably in the range of from 15:1 to 40:1, more preferably in the range of from 15:1 to 25:1 or more preferably from 30:1 to 40:1.

Preferably in the catalyst, the outlet coating of the second coating comprises the zeolitic material at a loading in the range of from 45.77 to 305.12 g/l (0.75 to 5 g/in$^3$), more preferably in the range of from 61.02 to 183.07 g/l (1 to 3 g/in$^3$), more preferably in the range of from 97.64 to 158.66 g/l (1.6 to 2.6 g/in$^3$).

In the context of the present invention, it is preferred that the zeolitic material comprised in the outlet coating of the second coating, more preferably which has a framework type CHA, has a mean crystallite size of at least 0.5 micrometer, more preferably in the range of from 0.5 to 1.5 micrometers, more preferably in the range of from 0.6 to 1.0 micrometer, more preferably in the range of from 0.6 to 0.8 micrometer determined via scanning electron microscopy.

Preferably the outlet coating of the second coating further comprises a metal oxide binder, wherein the metal oxide binder more preferably comprises one or more of zirconia, alumina, titania, silica, and a mixed oxide comprising two or more of Zr, Al, Ti and Si, more preferably one or more of alumina and zirconia, more preferably zirconia.

Preferably in the catalyst, the outlet coating of the second coating comprises the metal oxide binder at a loading in the range of 1.22 to 12.20 g/l (0.02 to 0.2 g/in$^3$), more preferably in the range of from 3.05 to 9.15 g/l (0.05 to 0.15 g/in$^3$), more preferably in the range of from 4.88 to 7.32 g/l (0.08 to 0.12 g/in$^3$).

Preferably from 90 to 100 weight-%, more preferably from 95 to 100 weight-%, more preferably from 98 to 100 weight-% of the outlet coating of the second coating consist of the platinum group metal component supported on the non-zeolitic oxidic material and a zeolitic material comprising one or more of copper and iron, and more preferably the metal oxide binder as defined in the foregoing.

It may also be preferred that the outlet coating of the second coating comprises a vanadium oxide, wherein the vanadium oxide is more preferably one or more of vanadium (V) oxide and a vanadium (IV) oxide, wherein the vanadium oxide optionally contains one or more of tungsten, iron and antimony. More preferably the vanadium oxide is supported on an oxidic material comprising one or more of titanium, silicon and zirconium, more preferably an oxidic material comprising one or more of titanium and silicon, more preferably titania and silica, more preferably on titania, wherein titania optionally contains one or more of tungsten and silicon, preferably silicon.

Preferably from 90 to 100 weight-%, more preferably from 95 to 100 weight-%, more preferably from 98 to 100 weight-%, more preferably from 99 to 100 weight-%, of the outlet coating of the second coating consist of the platinum group metal component supported on the non-zeolitic oxidic material and a vanadium oxide, wherein the vanadium oxide is more preferably one or more of vanadium (V) oxide and a vanadium (IV) oxide, wherein the vanadium oxide optionally contains tungsten, iron and antimony.

Preferably in the catalyst, the outlet coating of the second coating comprises the vanadium oxide, calculated as $V_2O_5$, at a loading in the range of from 30.51 to 305.12 g/l (0.5 to 5 g/in$^3$), more preferably in the range of from 61.02 to 244.09 g/l (1 to 4 g/in$^3$), more preferably in the range of from 122.05 to 213.58 g/l (2 to 3.5 g/in$^3$).

Preferably in the catalyst, the outlet coating comprises the platinum group metal component, calculated as elemental platinum group metal, at a loading in the range of from 0.07 to 1.41 g/l (2 to 40 g/ft$^3$), more preferably in the range of from 0.11 to 0.71 g/l (3 to 20 g/ft$^3$), more preferably in the range of from 0.21 to 0.53 g/l (6 to 15 g/ft$^3$), more preferably in the range of from 0.32 to 0.42 g/l (9 to 12 g/ft$^3$).

Therefore, the present invention preferably relates to a catalyst for the oxidation of NO, for the oxidation of ammonia, for the oxidation of HC and for the selective catalytic reduction of NOx, comprising (i) a flow through substrate comprising an inlet end, an outlet end, a substrate axial length extending from the inlet end to the outlet end and a plurality of passages defined by internal walls of the flow through substrate extending therethrough;

(ii) a first coating comprising a zeolitic material comprising copper, wherein the zeolitic material comprised in the first coating has a framework type selected from the group consisting of AEI, CHA, BEA, a mixture of two or more thereof and a mixed type of two or more thereof, more preferably a framework type CHA or AEI, more preferably CHA;

(iii) a second coating comprising, more preferably consisting of,
  (A) an inlet coating comprising a platinum group metal component supported on a non-zeolitic oxidic material and further comprises a zeolitic material comprising one or more of copper and iron; and
  (B) an outlet coating comprising a platinum group metal component supported on a non-zeolitic oxidic material and further comprises a zeolitic material comprising one or more of copper and iron;

wherein the inlet coating extends over y1% of the axial length of the substrate from the inlet end to the outlet end and is disposed either on the surface of the internal walls, or on the surface of the internal walls and the third coating, or on the third coating;

wherein the outlet coating extends over y2% of the axial length of the substrate from the outlet end to the inlet end and is disposed either on the surface of the internal walls, or on the surface of the internal walls and the third coating, or on the third coating;

wherein y1 is in the range of from 45 to 55, preferably in the range of from 48 to 50, and y2 is in the range of from 45 to 55, preferably in the range of from 48 to 50;

wherein the inlet coating comprises the platinum group metal component at a loading (I1) and the outlet coating comprises the platinum group metal component at a loading (I2), wherein the ratio of (I1):(I2) is in the range of from 0.2:1 to 0.75:1, preferably in the range of from 0.3:1 to 0.6:1, more preferably in the range of from 0.4:1 to 0.5:1;

wherein the first platinum group metal component comprises, preferably consists of, the platinum group metal component of the inlet coating and the platinum group metal component of the outlet coating;

wherein the non-zeolitic first oxidic material comprises, preferably consists of, the non-zeolitic oxidic material of the inlet coating and the non-zeolitic oxidic material of the outlet coating (iv) optionally a third coating comprising a second platinum group metal component supported on a second oxidic material;

wherein the third coating is disposed on the surface of the internal walls and under the second coating over z % of the axial length of the substrate from the outlet end to the inlet end, with z being in the range of from 0 to 100;

wherein the second coating extends over y % of the axial length of the substrate from the inlet end to the outlet end and is disposed either on the surface of the internal walls, or on the surface of the internal walls and the third coating, or on the third coating, with y being in the range of from 95 to 100, more preferably in the range of from 95 to 100, more preferably in the range of from 98 to 100, more preferably in the range of from 99 to 100;

wherein the first coating extends over x % of the axial length of the substrate from the inlet end to the outlet end and is disposed on the second coating, with x being in the range of from 20 to y, more preferably with x being y.

It is more preferred that the catalyst does not comprise a third coating according to (iv).

In the context of the present invention, it is also preferred that the catalyst comprises, more preferably consists of, the flow-through substrate, the first coating, the second coating and the third coating,
wherein z is in the range of from 20 to 65, more preferably in the range of from 30 to 60, more preferably in the range of from 40 to 55; or
wherein z is in the range of from 80 to 100, more preferably in the range of from 95 to 100, more preferably in the range of from 98 to 100. More preferably, z is in the range of from 20 to 65, more preferably in the range of from 30 to 60, more preferably in the range of from 40 to 55.

Therefore, the present invention preferably relates to a catalyst for the oxidation of NO, for the oxidation of ammonia, for the oxidation of HC and for the selective catalytic reduction of NOx, comprising
(i) a flow through substrate comprising an inlet end, an outlet end, a substrate axial length extending from the inlet end to the outlet end and a plurality of passages defined by internal walls of the flow through substrate extending therethrough;
(ii) a first coating comprising one or more of a vanadium oxide and a zeolitic material comprising one or more of copper and iron;
(iii) a second coating comprising a first platinum group metal component supported on a non-zeolitic first oxidic material and further comprising one or more of a vanadium oxide and a zeolitic material comprising one or more of copper and iron;
(iv) a third coating comprising a second platinum group metal component supported on a second oxidic material; wherein the third coating is disposed on the surface of the internal walls and under the second coating over z % of the axial length of the substrate from the outlet end to the inlet end, with z being in the range of from 20 to 65, more preferably in the range of from 30 to 60, more preferably in the range of from 40 to 55 or z being in the range of from 80 to 100, more preferably in the range of from 95 to 100, more preferably in the range of from 98 to 100;
wherein the second coating extends over y % of the axial length of the substrate from the inlet end to the outlet end and is disposed either on the surface of the internal walls and the third coating, or on the third coating, with y being in the range of from 95 to 100;
wherein the first coating extends over x % of the axial length of the substrate from the inlet end to the outlet end and is disposed on the second coating, with x being in the range of from 20 to y, more preferably x being y or x being in the range of from 20 to 60.

In the context of the present invention, it is preferred that the second platinum group metal component comprised in the third coating is one or more of platinum, palladium and rhodium, more preferably one or more of platinum and palladium, more preferably platinum.

Preferably the second oxidic material supporting the second platinum group metal component comprised in the third coating comprises, more preferably consists of, one or more of alumina, zirconia, titania, silica, ceria, and a mixed oxide comprising two or more of Al, Zr, Ti, Si and Ce, preferably one or more of alumina, zirconia, titania and silica. More preferably from 90 to 100 weight-%, more preferably from 95 to 100 weight-%, more preferably from 99 to 100 weight-% of the second oxidic material consist of alumina and optionally zirconia, wherein from 60 to 100 weight-%, more preferably from 70 to 90 weight-%, more preferably from 75 to 85 weight-%, of the second oxidic material consist of alumina and from 0 to 40 weight-%, more preferably from 10 to 30 weight-%, more preferably from 15 to 25 weight-% of the second oxidic material consist of zirconia. Alternatively, more preferably from 90 to 100 weight-%, more preferably from 95 to 100 weight-%, more preferably from 99 to 100 weight-% of the second oxidic material consist of titania and optionally silica, wherein from 60 to 100 weight-%, more preferably from 80 to 100 weight-%, more preferably from 85 to 95 weight-%, of the second oxidic material consists of titania and from 0 to 40 weight-%, more preferably from 0 to 20 weight-%, more preferably from 5 to 15 weight-% of the second oxidic material consist of silica.

It is preferred that from 90 to 100 weight-%, more preferably from 95 to 100 weight-%, more preferably from 99 to 100 weight-% of the third coating consist of the second platinum group metal component supported on the second oxidic material.

Preferably in the catalyst, the second coating comprises the first platinum group metal component, calculated as elemental platinum group metal, at a loading in the range of from 0.018 to 0.21 g/l (0.5 to 6 g/ft$^3$), more preferably in the range of from 0.026 to 0.14 g/l (0.75 to 4 g/ft$^3$), more preferably in the range of from 0.035 to 0.123 g/l (1 to 3.5 g/ft$^3$), more preferably in the range of from 0.035 to 0.07 g/l (1 to 2 g/ft$^3$), or more preferably in the range of from 0.088 to 0.123 g/l (2.5 to 3.5 g/ft$^3$).

It is preferred that in the catalyst, the third coating comprises the second platinum group metal component, calculated as elemental platinum group metal, at a loading in the range of from 0.18 to 0.71 g/l (5 to 20 g/ft$^3$), more preferably in the range of from 0.28 to 0.53 g/l (8 to 15 g/ft$^3$), more preferably in the range of from 0.32 to 0.49 g/l (9 to 14 g/ft$^3$), more preferably in the range of from 0.32 to 0.39 g/l (9 to 11 g/ft$^3$), or more preferably in the range of from 0.42 to 0.49 g/l (12 to 14 g/ft$^3$).

Preferably in the catalyst, the second coating comprises the non-zeolitic first oxidic material supporting the first platinum group metal component at a loading in the range of from 3.05 to 91.54 g/l (0.05 to 1.5 g/in$^3$), more preferably in the range of from 6.10 to 61.02 g/l (0.1 to 1.0 g/in$^3$), more preferably in the range of from 12.20 to 36.61 g/l (0.2 to 0.6 g/in$^3$).

Preferably in the catalyst, the third coating comprises the second oxidic material supporting the second platinum group metal component at a loading in the range of from 3.05 to 91.54 g/l (0.05 to 1.5 g/in$^3$), more preferably in the range of from 6.10 to 61.02 g/l (0.1 to 1.0 g/in$^3$), more preferably in the range of from 12.20 to 36.61 g/l (0.2 to 0.6 g/in$^3$), more preferably in the range of from 24.41 to 36.61 g/l (0.4 to 0.6 g/in$^3$).

It is preferred that from 0 to 0.001 weight-%, more preferably from 0 to 0.0001 weight-%, more preferably from 0.00001 weight-% of the third coating consist of a zeolitic material. More preferably, the third coating is free of a zeolitic material, wherein the zeolitic material more preferably comprises one or more of copper and iron.

It is preferred that from 0 to 0.001 weight-%, more preferably from 0 to 0.0001 weight-%, more preferably from 0.00001 weight-% of the third coating consist of one or more vanadium oxides, wherein more preferably. More preferably the third coating is free of vanadium oxides.

More preferably, the present invention relates to a catalyst for the oxidation of NO, for the oxidation of ammonia, for the oxidation of HC and for the selective catalytic reduction of NOx, comprising
(i) a flow through substrate comprising an inlet end, an outlet end, a substrate axial length extending from the inlet end to the outlet end and a plurality of passages defined by internal walls of the flow through substrate extending therethrough;
(ii) a first coating comprising a zeolitic material comprising copper, wherein the zeolitic material comprised in the first coating has a framework type selected from the group consisting of AEI, CHA, BEA, a mixture of two or more thereof and a mixed type of two or more thereof, more preferably a framework type CHA or AEI, more preferably CHA;
(iii) a second coating comprising a first platinum group metal component supported on a non-zeolitic first oxidic material, wherein the first platinum group metal component is platinum or palladium and platinum and wherein the non-zeolitic first oxidic material comprises, more preferably consists of, one or more of alumina, zirconia, titania, silica, ceria, and a mixed oxide comprising two or more of Al, Zr, Ti, Si, and Ce, more preferably one or more of alumina, zirconia, titania and silica, and further comprising a zeolitic material comprising copper, wherein the zeolitic material comprised in the second coating has a framework type selected from the group consisting of AEI, CHA, BEA, a mixture of two or more thereof and a mixed type of two or more thereof, more preferably a framework type CHA or AEI, more preferably CHA;
(iv) a third coating comprising a second platinum group metal component supported on a second oxidic material, wherein the second platinum group metal component comprised in the third coating is one or more of platinum, palladium and rhodium, more preferably one or more of platinum and palladium, more preferably platinum and the second oxidic material supporting the second platinum group metal component comprised in the third coating comprises, more preferably consists of, one or more of alumina, zirconia, titania, silica, ceria, and a mixed oxide comprising two or more of Al, Zr, Ti, Si and Ce, preferably one or more of alumina, zirconia, titania and silica;
wherein the third coating is disposed on the surface of the internal walls and under the second coating over z % of the axial length of the substrate from the outlet end to the inlet end, with z being in the range of from 20 to 65, more preferably in the range of from 30 to 60, more preferably in the range of from 40 to 55;
wherein the second coating extends over y % of the axial length of the substrate from the inlet end to the outlet end and is disposed on the surface of the internal walls and the third coating, with y being in the range of from 95 to 100;
wherein the first coating extends over x % of the axial length of the substrate from the inlet end to the outlet end and is disposed on the second coating, with x being in the range of from 20 to y, more preferably x being y or x being in the range of from 20 to 60.

Preferably the third coating comprises, more preferably consists of, a diesel oxidation catalyst component.

It is preferred that the second coating comprises, more preferably consists of, one or more nitrogen oxide (NOx) reduction components and one or more ammonia oxidation (AMOx) components.

It is preferred that the first coating comprises, more preferably consists of, a nitrogen oxide (NOx) reduction component.

As to the flow-through substrate of the catalyst, it is preferred that said substrate comprises a ceramic or metallic substance. More preferably the flow-through substrate of the catalyst comprises, more preferably consists of, a ceramic substance, wherein the ceramic substance more preferably comprises, more preferably consists of, one or more of an alumina, a silica, a silicate, an aluminosilicate, more preferably a cordierite or a mullite, an aluminotitanate, a silicon carbide, a zirconia, a magnesia, more preferably a spinel, and a titania, more preferably one or more of a silicon carbide and a cordierite, more preferably a cordierite. Alternatively, more preferably the flow-through substrate of the catalyst comprises, more preferably consists of a metallic substance, wherein the metallic substance preferably comprises, more preferably consists of, oxygen and one or more of iron, chromium, and aluminum.

The present invention further relates to an exhaust gas treatment system for treating an exhaust gas stream exiting a diesel engine, said exhaust gas treatment system having an upstream end for introducing said exhaust gas stream into said exhaust gas treatment system, wherein said exhaust gas treatment system comprises the catalyst according to the present invention and one or more of a diesel oxidation catalyst, a selective catalytic reduction catalyst, and a particulate filter.

According to a first aspect, it is preferred that the exhaust gas treatment system comprises a diesel oxidation catalyst comprising a coating disposed on a substrate, a selective catalytic reduction catalyst comprising a coating disposed on a substrate and the catalyst according to the present invention, wherein the diesel oxidation catalyst is located downstream of the upstream end of the exhaust gas treatment system, wherein the selective catalytic reduction catalyst is located downstream of the diesel oxidation catalyst, wherein the catalyst according to the present invention is located downstream of the selective catalytic reduction catalyst.

According to a second aspect, it is preferred that the exhaust gas treatment system comprises a selective catalytic reduction catalyst comprising a coating disposed on a substrate and the catalyst according to the present invention, wherein the selective catalytic reduction catalyst is located downstream of the upstream end of the exhaust gas treatment system and wherein the catalyst according to the present invention is located downstream of the selective catalytic reduction catalyst.

According to a third aspect, it is preferred that the exhaust gas treatment system comprises a selective catalytic reduction catalyst comprising a coating disposed on a substrate and the catalyst according to the present invention, wherein the selective catalytic reduction catalyst is located downstream of the upstream end of the exhaust gas treatment system, wherein the catalyst according to the present invention is located downstream of the selective catalytic reduction catalyst. According to said aspect, it is conceivable that the substrate of the selective catalytic reduction catalyst and the substrate of the catalyst according to the present invention is a single substrate, such that the coating of the selective catalytic reduction catalyst forms the upstream zone on the single substrate and the coatings of the catalyst according to the present invention form the downstream zone on said single substrate.

According to any of the aspects, it is preferred that the exhaust gas treatment system further comprises a filter, more preferably a particulate filter, more preferably a catalyzed particulate filter, wherein said filter is located downstream of the catalyst according to the present invention.

As to the diesel oxidation catalyst comprised in the system, it is preferred that it comprises a platinum group metal supported on an oxidic material.

As to the selective catalytic reduction catalyst comprised in the system, it is preferred that it comprises one or more of a vanadium oxide and a zeolitic material comprising one or more of copper and iron.

According to a fourth aspect, it is preferred that the exhaust gas treatment system comprises the catalyst according to the present invention and a filter, more preferably a particulate filter, more preferably a catalyzed particulate filter, wherein the catalyst according to the present invention is located downstream of the upstream end of the exhaust gas treatment system, wherein the filter is located downstream of the catalyst according to the present invention, optionally the exhaust gas treatment system further comprises a diesel oxidation catalyst which is located downstream of the catalyst according to the present invention and upstream of the filter.

According to any of the aspects, it is preferred that the exhaust gas treatment system further comprises an injector for injecting a fluid into the exhaust gas stream exiting the diesel engine, said injector being located upstream of the diesel oxidation catalyst according to the first aspect, or of the selective catalytic reduction catalyst according to the second aspect, or of the catalyst according to the third aspect, and downstream of the upstream end of the exhaust gas treatment system, wherein the fluid is more preferably an aqueous urea solution.

The present invention further relates to a method for preparing a catalyst for the oxidation of NO, for the oxidation of ammonia, for the oxidation of HC and for the selective catalytic reduction of NOx, preferably the catalyst according to the present invention, comprising (a) providing an uncoated flow-through substrate, the substrate comprising an inlet end, an outlet end, a substrate axial length extending from the inlet end to the outlet end and a plurality of passages defined by internal walls of the substrate extending therethrough;

(b) optionally providing a slurry comprising a second platinum group metal component and a second oxidic material, disposing said slurry on the surface of the internal walls of the substrate, over z % of the substrate axial length from the outlet end to the inlet end, with z being in the range of from 0 to 100, calcining the slurry disposed on the substrate, obtaining a third coating disposed on the substrate;

(c) providing one or more slurries comprising a first platinum group metal component, a non-zeolitic first oxidic material and water and one or more of a vanadium oxide and a zeolitic material comprising one or more of copper and iron, and a solvent, disposing said one or more slurries either on the surface of the internal walls, or on the surface of the internal walls and the third coating, or on the third coating, over y % of the substrate axial length, with y being in the range of from 95 to 100, calcining the one or more slurries disposed on the substrate, obtaining a second coating disposed on the substrate;

(d) providing a slurry comprising one or more of a vanadium oxide and a zeolitic material comprising one or more of copper and iron, and a solvent, disposing said slurry over x % of the substrate axial length on the second coating from the inlet end to the outlet end, with x being in the range of from 20 to y, calcining the slurry disposed on the substrate, obtaining the catalyst for the oxidation of NO, for the oxidation of ammonia, for the oxidation of HC and for the selective catalytic reduction of NOx.

Preferably, (c) comprises (c.1) forming a slurry with an aqueous mixture of a first platinum group metal precursor, more preferably of a platinum precursor, with a non-zeolitic first oxidic material, and a mixture of zirconyl acetate with a zeolitic material, more preferably having a framework type CHA, and comprising one or more of copper and iron, or a solution of vanadium oxalate, more preferably adding an oxidic material, more preferably with a dispersant;

(c.2) disposing the slurry obtained in (c.1) either on the surface of the internal walls, or on the surface of the internal walls and the third coating, or on the third coating, over y % of the substrate axial length from the inlet end to the outlet end;

(c.3) optionally, drying the slurry disposed on the substrate obtained in (c.2), obtaining a dried slurry-treated substrate;

(c.4) calcining the slurry disposed on the substrate obtained in (c.2), or the dried slurry-treated substrate obtained in (c.3), in a gas atmosphere, more preferably having a temperature in the range of from 400 to 800° C., more preferably in the range of from 450 to 700° C.

Alternatively, (c) preferably comprises (c.1') forming two slurries by mixing an aqueous mixture of a first platinum group metal precursor, preferably of a platinum precursor, with a non-zeolitic first oxidic material, and a mixture of zirconyl acetate with a zeolitic material, more preferably having a framework type CHA, and comprising one or more of copper and iron or a solution of vanadium oxalate, more preferably adding an oxidic material, more preferably with a dispersant, obtaining a first slurry with a platinum group metal component loading (I1) and a second slurry with a platinum group metal component loading (I2);

(c.2') disposing the first slurry obtained in (c.1') either on the surface of the internal walls, or on the surface of the internal walls and the third coating, or on the third coating, over y1% of the substrate axial length from the inlet end to the outlet end, with y1 being in the range of from 48 to 50;

(c.3') disposing the second slurry obtained in (c.1') either on the surface of the internal walls, or on the surface of the internal walls and the third coating, or on the third coating, over y2% of the substrate axial length from the outlet end to the inlet end, with y2 being is in the range of from 48 to 50;

(c.4') optionally, drying the slurries disposed on the substrate obtained in (c.2') and (c.3'), obtaining a dried slurry-treated substrate;

(c.5') calcining the slurries disposed on the substrate obtained in (c.2') and (c.3'), or the dried slurry-treated substrate obtained in (c.4'), in a gas atmosphere, more preferably having a temperature in the range of from 400 to 800° C., more preferably in the range of from 450 to 700° C.

According to (c.3) and (c.4'), it is preferred that drying is performed in gas atmosphere having a temperature in the range of from 90 to 200° C., more preferably in the range of from 100 to 190° C. More preferably, according to (c.3) and (c.4'), drying is performed in gas atmosphere having a temperature in the range of from 110 to 180° C.

As to (c.3) and (c.4'), it is preferred that the gas atmosphere comprises, more preferably is, one or more of air, lean air, and oxygen, more preferably air.

According to (c.4) and (c.5'), it is preferred that calcining is performed in gas atmosphere having a temperature in the range of from 550 to 650° C.

According to (c.4) and (c.5'), it is preferred that the gas atmosphere comprises, more preferably is, one or more of air, lean air, and oxygen, more preferably air.

Preferably, (d) comprises (d.1) forming a slurry by mixing a zirconyl acetate mixture with a zeolitic material, more preferably having a framework type CHA, and comprising one or more of copper and iron or with a solution of vanadium oxalate, more preferably adding an oxidic material, more preferably with a dispersant;

(d.2) disposing said slurry over x % of the substrate axial length on the second coating from the inlet end to the outlet end, with x being y, or with x being in the range of from 20 to 60, more preferably in the range of from 40 to 60, more preferably in the range of from 45 to 55, more preferably in the range of from 48 to 52;

(d.3) optionally drying the slurry disposed on the substrate obtained in (d.2), obtaining a dried slurry-treated substrate;

(d.4) calcining the slurry disposed on the substrate obtained in (d.2), or the dried slurry-treated substrate obtained in (d.3), in a gas atmosphere, more preferably having a temperature in the range of from 300 to 600° C., more preferably in the range of from 350 to 550° C.

According to (d.3), it is preferred that drying is performed in gas atmosphere having a temperature in the range of from 90 to 200° C., more preferably in the range of from 100 to 190° C. More preferably, according to (d.3), drying is performed in gas atmosphere having a temperature in the range of from 110 to 180° C.

According to (d.3), it is preferred that the gas atmosphere comprises, more preferably is, one or more of air, lean air, and oxygen, more preferably air.

According to (d.4), it is preferred that calcining is performed in gas atmosphere having a temperature in the range of from 400 to 500° C.

According to (d.4), it is preferred that the gas atmosphere comprises, preferably is, one or more of air, lean air, and oxygen, more preferably air.

Preferably, (b) comprises (b.1) forming a slurry with an aqueous mixture of a second platinum group metal precursor, more preferably of a platinum precursor, with a second oxidic material;

(b.2) disposing the slurry obtained in (b.1) on the surface of the internal walls of the substrate, over z % of the substrate axial length from the outlet end to the inlet end;

(b.3) optionally, drying the slurry disposed on the substrate obtained in (b.2), obtaining a dried slurry-treated substrate;

(b.4) calcining the slurry disposed on the substrate obtained in (b.2), or the dried slurry-treated substrate obtained in (b.3), in a gas atmosphere, preferably having a temperature in the range of from 400 to 800° C., more preferably in the range of from 450 to 700° C., wherein z is in the range of from 20 to 65, more preferably in the range of from 30 to 60, more preferably in the range of from 40 to 55; or
wherein z is in the range of from 80 to 100, more preferably in the range of from 95 to 100, more preferably in the range of from 98 to 100.

According to (b.3), it is preferred that drying is performed in gas atmosphere having a temperature in the range of from 90 to 200° C., more preferably in the range of from 100 to 190° C. More preferably, according to (b.3), drying is performed in gas atmosphere having a temperature in the range of from 110 to 180° C.

According to (b.3), it is preferred that the gas atmosphere comprises, more preferably is, one or more of air, lean air, and oxygen, more preferably air.

According to (b.4), it is preferred that calcining is performed in gas atmosphere having a temperature in the range of from 550 to 650° C.

According to (b.4), it is preferred that the gas atmosphere comprises, more preferably is, one or more of air, lean air, and oxygen, more preferably air.

Preferably, y is in the range of from 98 to 100, more preferably in the range of from 99 to 100.

Preferably, disposing in one or more of (b), (c) and (d) is performed by wet impregnation or incipient wetness impregnation.

It is preferred that the solvent used in the process of the present invention is one or more of an alcohol and water, preferably water.

In the context of the present invention, it is conceivable that in addition to Cu-containing zeolitic material, preferably Cu-CHA, a certain amount of zeolitic material, preferably having a framework type CHA, in the H-form is added in one or more of (c.1), (c.1') and (d.1).

The present invention further relates to a catalyst for the oxidation of NO, for the oxidation of ammonia, for the oxidation of HC and for the selective catalytic reduction of NOx, preferably the catalyst for the oxidation of NO, for the oxidation of ammonia, for the oxidation of HC and for the selective catalytic reduction of NOx of the present invention, obtainable or obtained by the process according to the present invention.

The present invention further relates to a use of the catalyst for the oxidation of NO, for the oxidation of ammonia, for the oxidation of HC and for the selective catalytic reduction of NOx according to the present invention for the simultaneous selective catalytic reduction of NOx, the oxidation of ammonia, the oxidation of nitrogen monoxide and the oxidation of hydrocarbon.

Further, the present invention further relates to a method for the simultaneous selective catalytic reduction of NOx, the oxidation of ammonia, the oxidation of nitrogen monoxide and the oxidation of hydrocarbon, comprising (1) providing a gas stream comprising one or more of NOx, ammonia, nitrogen monoxide and a hydrocarbon;

(2) contacting the gas stream provided in (1) with the catalyst for the oxidation of NO, for the oxidation of ammonia, for the oxidation of HC and for the selective catalytic reduction of NOx according to the present invention.

II. A Second Catalyst for the Oxidation of NO, for the Oxidation of Ammonia, for the Oxidation of HC and for the Selective Catalytic Reduction of NOx The present invention further relates to a catalyst for the oxidation of NO, for the oxidation of ammonia, for the oxidation of HC and for the selective catalytic reduction of NOx, comprising (i) a flow through substrate comprising an inlet end, an outlet end, a substrate axial length extending from the inlet end to the outlet end and a plurality of passages defined by internal walls of the flow through substrate extending therethrough;

(ii) a first coating comprising one or more of a vanadium oxide and a zeolitic material comprising one or more of copper and iron;

(iii) a second coating comprising a first platinum group metal component supported on a non-zeolitic first oxidic material and further comprising one or more of a vanadium oxide and a zeolitic material comprising one or more of copper and iron;

(iv) a third coating comprising a second platinum group metal component supported on a second oxidic material;

wherein the third coating is disposed on the surface of the internal walls and under the second coating over z % of the axial length of the substrate from the outlet end to the inlet end, with z being in the range of from 10 to 80;
wherein the second coating extends over y % of the axial length of the substrate from the outlet end to the inlet end and is disposed on the third coating and on the surface of the internal walls, or on the third coating, with y being in the range of from 10 to 80;
wherein the first coating extends over x % of the axial length of the substrate from the inlet end to the outlet end and is disposed on the surface of the internal walls and on the second coating, with x being in the range of from 95 to 100.

It is preferred that x is in the range of from 98 to 100, more preferably in the range of from 99 to 100.

It is preferred that the second coating is disposed on the third coating and on the surface of the internal walls. It is more preferred that y is in the range of from 30 to 70, more preferably in the range of from 40 to 60, more preferably in the range of from 45 to 55.

It is preferred that z is in the range of from 10 to 60, more preferably in the range of from 15 to 40, more preferably in the range of from 20 to 30.

It is preferred that x is in the range of from 98 to 100, more preferably in the range of from 99 to 100, that the second coating is disposed on the third coating and on the surface of the internal walls, that y is in the range of from 30 to 70, more preferably in the range of from 40 to 60, more preferably in the range of from 45 to 55, and that z is in the range of from 10 to 60, more preferably in the range of from 15 to 40, more preferably in the range of from 20 to 30.

It is preferred that the first coating has the chemical composition of the first coating of the catalyst of the present invention according to I. as defined in the foregoing.

As to the first coating, it is preferred that it comprises a zeolitic material comprising one or more of copper and iron, wherein the zeolitic material comprised in the first coating has a framework type selected from the group consisting of AEI, CHA, BEA, a mixture of two or more thereof and a mixed type of two or more thereof. It is more preferred that the zeolitic material comprised in the first coating has a framework type CHA or AEI, more preferably CHA.

It is preferred that from 95 to 100 weight-%, more preferably from 98 to 100 weight-%, more preferably from 99 to 100 weight-% of the framework structure of the zeolitic material in the first coating consist to Si, Al, O, and optionally one or more of H and P, wherein in the framework structure, the molar ratio of Si to Al, calculated as molar $SiO_2:Al_2O_3$, is more preferably in the range of from 2:1 to 50:1, more preferably in the range of from 4:1 to 40:1, more preferably in the range of from 10:1 to 40:1, more preferably in the range of from 15:1 to 40:1, more preferably in the range of from 15:1 to 25:1 or more preferably from 30:1 to 40:1.

It is preferred that the zeolitic material comprised in the first coating comprises copper, wherein the amount of copper comprised in the zeolitic material, calculated as CuO, is more preferably in the range of 1 to 10 weight-%, more preferably in the range of from 2 to 8 weight-%, more preferably in the range of from 3 to 6 weight-% based on the total weight of the zeolitic material. It is more preferred that the amount of iron, calculated as $Fe_2O_3$, comprised in the zeolitic material of the first coating, is in the range of from 0 to 0.01 weight-%, more preferably in the range of from 0 to 0.001 weight-%, more preferably in the range of from 0 to 0.0001 weight-%, based on the total weight of the zeolitic material.

It is preferred that the first coating further comprises a metal oxide binder, wherein the metal oxide binder more preferably comprises one or more of zirconia, alumina, titania, silica, and a mixed oxide comprising two or more of Zr, Al, Ti, and Si, more preferably comprises one or more of alumina and zirconia, more preferably comprises zirconia. It is more preferred that the first coating comprises the metal oxide binder at an amount in the range of from 0.1 to 7 weight %, more preferably in the range of from 2 to 6 weight-%, based on the weight of the zeolitic material of the first coating.

It is preferred that from 95 to 100 weight-%, more preferably from 98 to 100 weight-%, more preferably from 99 to 100 weight-%, of the first coating consist of the zeolitic material comprising one or more of copper and iron, and preferably a metal oxide binder as defined in the foregoing.

It is preferred that the first coating comprises the zeolitic material at a loading in the range of from 0.5 to 3.5 Win', preferably in the range of from 2 to 3 $g/in^3$.

It is preferred that the catalyst comprises the first coating at a loading in the range of from 1 to 4 $g/in^3$, preferably in the range of from 2.5 to 3.5 $g/in^3$.

It is preferred that the second coating has the chemical composition of the second coating of the catalyst of the present invention according to I. as defined in the foregoing.

As to the second coating, it is preferred that the first platinum group metal component comprised in the second coating is one or more of platinum, palladium and rhodium, more preferably one or more of platinum and palladium.

It is preferred that the non-zeolitic first oxidic material on which the first platinum group metal component comprised in the second coating is supported comprises, more preferably consists of, one or more of alumina, zirconia, titania, silica, ceria, and a mixed oxide comprising two or more of Al, Zr, Ti, Si, and Ce, more preferably one or more of alumina, zirconia, titania and silica.

It is preferred that the second coating comprises a zeolitic material comprising one or more of copper and iron, wherein the zeolitic material comprised in the second coating has a framework type selected from the group consisting of AEI, CHA, BEA, a mixture of two or more thereof and a mixed type of two or more thereof. It is more preferred that the zeolitic material comprised in the second coating has a framework type CHA or AEI, more preferably CHA.

It is preferred that the zeolitic material comprised in the second coating comprises copper, wherein the amount of copper comprised in the zeolitic material, calculated as CuO, is more preferably in the range of 1 to 10 weight-%, more preferably in the range of from 2 to 8 weight %, more preferably in the range of from 3 to 6 weight-% based on the total weight of the zeolitic material. It is more preferred that the amount of iron comprised in the zeolitic material of the second coating, calculated as $Fe_2O_3$, is in the range of from 0 to 0.01 weight-%, more preferably in the range of from 0 to 0.001 weight-%, more preferably in the range of from 0 to 0.0001 weight-%, based on the total weight of the zeolitic material.

It is preferred that from 95 to 100 weight-%, more preferably from 98 to 100 weight-%, more preferably from 99 to 100 weight-% of the framework structure of the zeolitic material of the second coating consist to Si, Al, O, and optionally one or more of H and P, wherein in the framework structure, the molar ratio of Si to Al, calculated as $SiO_2:Al_2O_3$, is more preferably in the range of from 2:1 to 50:1, more preferably in the range of from 4:1 to 40:1, more preferably in the range of from 10:1 to 40:1, more preferably in the range of from 15:1 to 40:1, more preferably in the range of from 15:1 to 25:1 or more preferably from 30:1 to 40:1.

It is preferred that the second coating further comprises a metal oxide binder, wherein the metal oxide binder more preferably comprises one or more of zirconia, alumina, titania, silica, and a mixed oxide comprising two or more of Zr, Al, Ti and Si, more preferably one or more of alumina and zirconia, more preferably zirconia. It is more preferred that the second coating more preferably comprises the metal oxide binder at an amount in the range of from 0.1 to 7 weight-%, more preferably in the range of from 2 to 6 weight-%, based on the weight of the zeolitic material of the second coating.

It is preferred that from 95 to 100 weight-%, more preferably from 98 to 100 weight-%, more preferably from 99 to 100 weight-%, of the second coating consist of the first platinum group metal component supported on a non-zeolitic first oxidic material, one or more of the vanadium oxide and the zeolitic material comprising one or more of copper and iron, and optionally a metal oxide binder as defined in the foregoing.

It is preferred that the second coating comprises the zeolitic material at a loading in the range of from 1 to 2.5 g/in$^3$.

It is preferred that the second coating comprises the first platinum group metal component at a loading in the range of from 1 to 10 g/ft$^3$.

It is preferred that the second coating comprises the non-zeolitic first oxidic material at a loading in the range of from 0.1 to 1 g/in$^3$.

It is preferred that the catalyst comprises the second coating at a loading in the range of from 1 to 3 g/in$^3$.

As to the third coating, it is preferred that it has the composition of the third coating of the catalyst of the present invention according to I. as defined in the foregoing.

As to the third coating, it is preferred that the second platinum group metal component comprised in said coating is one or more of platinum, palladium and rhodium, more preferably one or more of platinum and palladium, more preferably platinum.

It is preferred that the second oxidic material supporting the second platinum group metal component comprised in the third coating comprises, more preferably consists of, one or more of alumina, zirconia, titania, silica, ceria, and a mixed oxide comprising two or more of Al, Zr, Ti, Si and Ce, more preferably one or more of alumina, zirconia, titania and silica. It is more preferred that from 95 to 100 weight-%, more preferably from 98 to 100 weight-%, more preferably from 99 to 100 weight-% of the second oxidic material consist of alumina and optionally zirconia; wherein preferably from 60 to 100 weight-%, more preferably from 70 to 90 weight-%, more preferably from 75 to 85 weight-%, of the second oxidic material consist of alumina and wherein preferably from 0 to 40 weight-%, more preferably from 10 to 30 weight-%, more preferably from 15 to 25 weight-%, of the second oxidic material consist of zirconia. Alternatively, it is more preferred that from 95 to 100 weight-%, more preferably from 98 to 100 weight-%, more preferably from 99 to 100 weight-% of the second oxidic material consist of titania and optionally silica; wherein preferably from 60 to 100 weight-%, more preferably from 80 to 100 weight-%, more preferably from 85 to 95 weight-%, of the second oxidic material consists of titania and wherein preferably from 0 to 40 weight-%, more preferably from 0 to 20 weight-%, more preferably from 5 to 15 weight-%, of the second oxidic material consist of silica.

It is preferred that from 95 to 100 weight-%, more preferably from 98 to 100 weight-%, more preferably from 99 to 100 weight-% of the third coating consist of the second platinum group metal component supported on the second oxidic material.

It is preferred that the third coating comprises the second platinum group metal component at a loading in the range of from 5 to 30 g/ft$^3$, preferably in the range of from 10 to 20 g/ft$^3$.

It is preferred that the third coating comprises the second oxidic material at a loading in the range of from 0.1 to 4 g/in$^3$, preferably in the range of from 0.2 to 2 g/in$^3$, more preferably in the range of from 0.5 to 1 g/in$^3$.

The catalyst preferably comprises the third coating at a loading in the range of from 0.1 to 4 g/in$^3$, preferably in the range of from 0.2 to 2 g/in$^3$, more preferably in the range of from 0.5 to 1 g/in$^3$.

As to the flow through substrate, it is preferred that it is the flow-though substrate of the catalyst according to I. as defined in the foregoing.

It is preferred that the catalyst consists of the flow through substrate, the first coating, the second coating and the third coating.

The present invention is illustrated by the following first set of embodiments and combinations of embodiments resulting from the dependencies and back-references as indicated. This set of embodiments may be combined with the second set of embodiments below as indicated in the following. In particular, it is noted that in each instance where a range of embodiments is mentioned, for example in the context of a term such as "The catalyst of any one of embodiments 1 to 4", every embodiment in this range is meant to be explicitly disclosed for the skilled person, i.e. the wording of this term is to be understood by the skilled person as being synonymous to "The catalyst of any one of embodiments 1, 2, 3 and 4". Further, it is explicitly noted that the following set of embodiments is not the set of claims determining the extent of protection, but represents a suitably structured part of the description directed to general and preferred aspects of the present invention.

1. A catalyst for the oxidation of NO, for the oxidation of ammonia, for the oxidation of HC and for the selective catalytic reduction of NOx, comprising
   (i) a flow through substrate comprising an inlet end, an outlet end, a substrate axial length extending from the inlet end to the outlet end and a plurality of passages defined by internal walls of the flow through substrate extending therethrough;
   (ii) a first coating comprising one or more of a vanadium oxide and a zeolitic material comprising one or more of copper and iron;
   (iii) a second coating comprising a first platinum group metal component supported on a non-zeolitic first oxidic material and further comprising one or more of a vanadium oxide and a zeolitic material comprising one or more of copper and iron;
   (iv) optionally a third coating comprising a second platinum group metal component supported on a second oxidic material;
   wherein the third coating is disposed on the surface of the internal walls and under the second coating over z % of the axial length of the substrate from the outlet end to the inlet end, with z being in the range of from 0 to 100;
   wherein the second coating extends over y % of the axial length of the substrate from the inlet end to the outlet end and is disposed either on the surface of the internal walls, or on the surface of the internal walls and the third coating, or on the third coating, with y being in the range of from 95 to 100;
wherein the first coating extends over x % of the axial length of the substrate from the inlet end to the outlet end and is disposed on the second coating, with x being in the range of from 20 to y.

2. The catalyst of embodiment 1, wherein y is in the range of from 95 to 100, preferably in the range of from 98 to 100, more preferably in the range of from 99 to 100, and wherein x is y.

3. The catalyst of embodiment 1, wherein y is in the range of from 95 to 100, preferably in the range of from 98 to 100, more preferably in the range of from 99 to 100, and wherein x is in the range of from 20 to 60, preferably in the range of from 40 to 60, more preferably in the range of from 45 to 55, more preferably in the range of from 48 to 52.

4. The catalyst of any one of embodiments 1 to 3, wherein z is in the range of from 0 to 65, preferably in the range of from 0 to 60, more preferably in the range of from 0 to 55, or wherein z is in the range of from 80 to 100, preferably in the range of from 95 to 100, more preferably in the range of from 98 to 100.

5. The catalyst of any one of embodiments 1 to 4, wherein the first coating comprises a zeolitic material comprising one or more of copper and iron.

6. The catalyst of any one of embodiments 1 to 5, wherein the zeolitic material comprised in the first coating has a framework type selected from the group consisting of ABW, ACO, AEI, AEL, AEN, AET, AFG, AFI, AFN, AFO, AFR, AFS, AFT, AFV, AFX, AFY, AHT, ANA, APC, APD, AST, ASV, ATN, ATO, ATS, ATT, ATV, AVL, AWO, AWW, BCT, BEA, BEC, BIK, BOF, BOG, BOZ, BPH, BRE, BSV, CAN, CAS, CDO, CFI, CGF, CGS, CHA, -CHI, -CLO, CON, CSV, CZP, DAC, DDR, DFO, DFT, DOH, DON, EAB, EDI, EEI, EMT, EON, EPI, ERI, ESV, ETR, EUO, *-EWT, EZT, FAR, FAU, FER, FRA, GIS, GIU, GME, GON, GOO, HEU, IFO, IFR, -IFU, IFW, IFY, IHW, IMF, IRN, IRR, -IRY, ISV, ITE, ITG, ITH, *ITN, ITR, ITT, -ITV, ITW, IWR, IWS, IWV, IWW, JBW, JNT, JOZ, JRY, JSN, JSR, JST, JSW, KFI, LAU, LEV, LIO, -LIT, LOS, LOV, LTA, LTF, LTJ, LTL, LTN, MAR, MAZ, MEI, MEL, MEP, MER, MFI, MFS, MON, MOR, MOZ, *MRE, MSE, MSO, MTF, MTN, MTT, MTW, MW, MWF, MWW, NAB, NAT, NES, NON, NPO, NPT, NSI, OBW, OFF, OKO, OSI, OSO, OWE, -PAR, PAU, PCR, PHI, PON, POS, PSI, PUN, RHO, -RON, RRO, RSN, RTE, RTH, RUT, RWR, RWY, SAF, SAO, SAS, SAT, SAV, SBE, SBN, SBS, SBT, SEW, SFE, SFF, SFG, SFH, SFN, SFO, SFS, *SFV, SFW, SGT, SIV, SOD, SOF, SOS, SSF, *SSO, SSY, STF, STI, *STO, STT, STW, -SVR, SVV, SZR, TER, THO, TOL, TON, TSC, TUN, UEI, UFI, UOS, UOV, UOZ, USI, UTL, UWY, VET, VFI, VNI, VSV, WEI, -WEN, YUG, ZON, a mixture of two or more thereof, and a mixed type of two or more thereof, preferably selected from the group consisting of AEI, GME, CHA, MFI, BEA, FAU, MOR, a mixture of two or more thereof and a mixed type of two or more thereof, more preferably selected from the group consisting of AEI, GME, CHA, BEA, FAU, MOR, a mixture of two or more thereof and a mixed type of two or more thereof, more preferably selected from the group consisting of AEI, CHA, BEA, a mixture of two or more thereof and a mixed type of two or more thereof, wherein the zeolitic material comprised in the first coating has more preferably a framework type CHA or AEI, more preferably CHA.

7. The catalyst of any one of embodiments 1 to 6, wherein from 95 to 100 weight-%, preferably from 98 to 100 weight-%, more preferably from 99 to 100 weight-% of the framework structure of the zeolitic material consist to Si, Al, O, and optionally one or more of H and P, wherein in the framework structure, the molar ratio of Si to Al, calculated as molar $SiO_2:Al_2O_3$, is preferably in the range of from 2:1 to 50:1, more preferably in the range of from 4:1 to 40:1, more preferably in the range of from 10:1 to 40:1, more preferably in the range of from 15:1 to 40:1, more preferably in the range of from 15:1 to 25:1 or more preferably from 30:1 to 40:1.

8. The catalyst of any one of embodiments 1 to 7, wherein the zeolitic material comprised in the first coating comprises copper, wherein the amount of copper comprised in the zeolitic material, calculated as CuO, is preferably in the range of 1 to 10 weight-%, more preferably in the range of from 2 to 8 weight-%, more preferably in the range of from 3 to 6 weight-% based on the total weight of the zeolitic material, wherein the amount of iron, calculated as $Fe_2O_3$, comprised in the zeolitic material of the first coating, is preferably in the range of from 0 to 0.01 weight-%, more preferably in the range of from 0 to 0.001 weight-%, more preferably in the range of from 0 to 0.0001 weight-%, based on the total weight of the zeolitic material.

9. The catalyst of any one of embodiments 1 to 7, wherein the zeolitic material comprised in the first coating comprises iron, wherein the amount of iron comprised in the zeolitic material, calculated as $Fe_2O_3$, is preferably in the range of from 0.1 to 10.0 weight-%, more preferably in the range of from 1.0 to 7.0 weight-%, more preferably in the range of from 2.5 to 5.5 weight-%, based on the total weight of the zeolitic material, and wherein preferably from 95 to 100 weight-%, more preferably from 98 to 100 weight-%, more preferably from 99 to 100 weight-% of the framework structure of the zeolitic material consist to Si, Al, 0, and optionally one or more of H and P, wherein in the framework structure, the molar ratio of Si to Al, calculated as $SiO_2:Al_2O_3$, is preferably in the range of from 2:1 to 50:1, more preferably in the range of from 4:1 to 40:1, more preferably in the range of from 10:1 to 40:1, more preferably in the range of from 15:1 to 40:1, more preferably in the range of from 15:1 to 25:1 or more preferably from 30:1 to 40:1.

10. The catalyst of any one of embodiments 1 to 9, wherein in the catalyst, the first coating comprises the zeolitic material at a loading in the range of from 30.51 to 183.07 g/l (0.5 to 3 g/in$^3$), preferably in the range of from 45.77 to 122.05 g/l (0.75 to 2 g/in$^3$), more preferably in the range of from 48.82 to 97.64 g/l (0.8 to 1.6 g/in$^3$), more preferably in the range of from 48.82 to 67.13 g/l (0.8 to 1.1 g/in$^3$) or more preferably in the range of from 73.23 to 97.64 g/l (1.2 to 1.6 g/in$^3$).

11. The catalyst of any one of embodiments 5 to 10, wherein the zeolitic material comprised in the first coating, preferably which has a framework type CHA, has a mean crystallite size of at least 0.5 micrometer, preferably in the range of from 0.5 to 1.5 micrometers, more preferably in the range of from 0.6 to 1.0 micrometer, more preferably in the range of from 0.6 to 0.8 micrometer determined via scanning electron microscopy.

12. The catalyst of any one of embodiments 1 to 11, wherein the first coating further comprises a metal oxide binder, wherein the metal oxide binder preferably comprises one or more of zirconia, alumina, titania, silica, and a mixed oxide comprising two or more of Zr, Al, Ti, and Si, more preferably comprises one or more of alumina and zirconia, more preferably comprises zirconia, wherein in the catalyst, the first coating more preferably comprises the metal oxide binder at a loading in the range of from 0.61 to 12.20 g/l (0.01 to 0.2 g/in$^3$), more preferably in the range of from 1.22 to 9.15 g/l (0.02 to 0.15 g/in$^3$), more preferably in the range of from 3.66 to 7.32 g/l (0.06 to 0.12 g/in$^3$).
13. The catalyst of any one of embodiments 1 to 12, wherein from 95 to 100 weight-%, preferably from 98 to 100 weight-%, more preferably from 99 to 100 weight-% of the first coating consist of a zeolitic material comprising one or more of copper and iron, and preferably the metal oxide binder according to embodiment 12.
14. The catalyst of any one of embodiments 1 to 13, wherein the first coating comprises a vanadium oxide, wherein the vanadium oxide is preferably one or more of vanadium (V) oxide and a vanadium (IV) oxide, wherein the vanadium oxide optionally comprises one or more of tungsten, iron and antimony.
15. The catalyst of embodiment 14, wherein the vanadium oxide is supported on an oxidic material comprising one or more of titanium, silicon and zirconium, preferably comprising one or more of titanium and silicon, wherein more preferably, the oxidic material is one or more of titania and silica, more preferably titania, wherein the titania optionally comprises one or more of tungsten and silicon, preferably silicon.
16. The catalyst of embodiment 14 or 15, wherein in the catalyst, the first coating comprises the vanadium oxide, calculated as V$_2$O$_5$, at a loading in the range of from 30.51 to 244.09 g/l (0.5 to 4 g/in$^3$), preferably in the range of from 61.02 to 183.07 g/l (1 to 3 g/in$^3$), more preferably in the range of from 91.53 to 152.56 g/l (1.5 to 2.5 g/in$^3$).
17. The catalyst of embodiment 14 or 15, wherein from 95 to 100 weight-%, preferably from 98 to 100 weight-%, more preferably from 99 to 100 weight-% of the first coating consist of the vanadium oxide supported on the oxidic material.
18. The catalyst of any one of embodiments 1 to 17, wherein from 0 to 0.0001 weight-%, preferably from 0 to 0.00001 weight-% of the first coating consist of palladium, preferably of palladium, platinum and rhodium, more preferably of palladium, platinum, rhodium, osmium and iridium.
19. The catalyst of any one of embodiments 1 to 18, wherein the first platinum group metal component comprised in the second coating is one or more of platinum, palladium and rhodium, preferably one or more of platinum and palladium, wherein more preferably, the first platinum group metal component is platinum or the first platinum group metal component is palladium and platinum.
20. The catalyst of any one of embodiments 1 to 19, wherein the non-zeolitic first oxidic material on which the first platinum group metal component comprised in the second coating is supported comprises, preferably consists of, one or more of alumina, zirconia, titania, silica, ceria, and a mixed oxide comprising two or more of Al, Zr, Ti, Si, and Ce, preferably one or more of alumina, zirconia, titania and silica.
21. The catalyst of embodiment 20, wherein from 90 to 100 weight-%, preferably from 95 to 100 weight-%, more preferably from 99 to 100 weight-% of the non-zeolitic first oxidic material consist of alumina and optionally zirconia, wherein from 60 to 100 weight-%, preferably from 70 to 90 weight-%, more preferably from 75 to 85 weight-% of the non-zeolitic first oxidic material consist of alumina and from 0 to 40 weight-%, preferably 10 to 30 weight-%, more preferably from 15 to 25 weight-% of the non-zeolitic first oxidic material consist of zirconia.
22. The catalyst of embodiment 20, wherein from 90 to 100 weight-%, preferably from 95 to 100 weight-%, more preferably from 99 to 100 weight-% of the non-zeolitic first oxidic material consist of titania and optionally silica, wherein from 60 to 100 weight-%, preferably from 80 to 100 weight-%, more preferably from 85 to 95 weight-%, of the non-zeolitic first oxidic material consists of titania and from 0 to 40 weight-%, preferably 0 to 20 weight-%, more preferably 5 to 15 weight-% of the non-zeolitic first oxidic material consist of silica.
23. The catalyst of any one of embodiments 1 to 22, wherein the second coating comprises a zeolitic material comprising one or more of copper and iron.
24. The catalyst of any one of embodiments 1 to 23, wherein the zeolitic material comprised in the second coating has a framework type selected from the group consisting of ABW, ACO, AEI, AEL, AEN, AET, AFG, AFI, AFN, AFO, AFR, AFS, AFT, AFV, AFX, AFY, AHT, ANA, APC, APD, AST, ASV, ATN, ATO, ATS, ATT, ATV, AVL, AWO, AWW, BCT, BEA, BEC, BIK, BOF, BOG, BOZ, BPH, BRE, BSV, CAN, CAS, CDO, CFI, CGF, CGS, CHA, -CHI, -CLO, CON, CSV, CZP, DAC, DDR, DFO, DFT, DOH, DON, EAB, EDI, EEI, EMT, EON, EPI, ERI, ESV, ETR, EUO, *-EWT, EZT, FAR, FAU, FER, FRA, GIS, GIU, GME, GON, GOO, HEU, IFO, IFR, -IFU, IFW, IFY, IHW, IMF, IRN, IRR, -IRY, ISV, ITE, ITG, ITH, *-ITN, ITR, ITT, -ITV, ITW, IWR, IWS, IWV, IWW, JBW, JNT, JOZ, JRY, JSN, JSR, JST, JSW, KFI, LAU, LEV, LIO, -LIT, LOS, LOV, LTA, LTF, LTJ, LTL, LTN, MAR, MAZ, MEI, MEL, MEP, MER, MFI, MFS, MON, MOR, MOZ, *MRE, MSE, MSO, MTF, MTN, MTT, MTW, MW, MWF, MWW, NAB, NAT, NES, NON, NPO, NPT, NSI, OBW, OFF, OKO, OSI, OSO, OWE, -PAR, PAU, PCR, PHI, PON, POS, PSI, PUN, RHO, -RON, RRO, RSN, RTE, RTH, RUT, RWR, RWY, SAF, SAO, SAS, SAT, SAV, SBE, SBN, SBS, SBT, SEW, SFE, SFF, SFG, SFH, SFN, SFO, SFS, *SFV, SFW, SGT, SIV, SOD, SOF, SOS, SSF, *-SSO, SSY, STF, STI, *STO, STT, STW, -SVR, SW, SZR, TER, THO, TOL, TON, TSC, TUN, UEI, UFI, UOS, UOV, UOZ, USI, UTL, UWY, VET, VFI, VNI, VSV, WEI, -WEN, YUG, ZON, a mixture of two or more thereof, and a mixed type of two or more thereof, preferably selected from the group consisting of AEI, GME, CHA, MFI, BEA, FAU, MOR, a mixture of two or more thereof and a mixed type of two or more thereof, more preferably selected from the group consisting of AEI, GME, CHA, BEA, FAU, MOR, a mixture of two or more thereof and a mixed type of two or more thereof, more preferably selected from the group consisting of AEI, CHA, BEA, a mixture of two or more thereof and a mixed type of two or more thereof, wherein the zeolitic material comprised in the second coating has more preferably a framework type CHA or AEI, more preferably CHA.
25. The catalyst of any one of embodiments 1 to 24, wherein the zeolitic material comprised in the second coating comprises copper, wherein the amount of copper comprised in the zeolitic material, calculated as CuO, is preferably in the range of 1 to 10 weight-%, more preferably in the range of from 2 to 8 weight-%, more preferably in the range of from 3 to 6 weight-% based on the total weight of the zeolitic material.

26. The catalyst of embodiment 25, wherein the amount of iron comprised in the zeolitic material of the second coating, calculated as $Fe_2O_3$, is in the range of from 0 to 0.01 weight-%, preferably in the range of from 0 to 0.001 weight-%, more preferably in the range of from 0 to 0.0001 weight-%, based on the total weight of the zeolitic material.

27. The catalyst of any one of embodiments 1 to 26, wherein from 95 to 100 weight-%, preferably from 98 to 100 weight-%, more preferably from 99 to 100 weight-% of the framework structure of the zeolitic material of the second coating consist to Si, Al, O, and optionally one or more of H and P, wherein in the framework structure, the molar ratio of Si to Al, calculated as $SiO_2:Al_2O_3$, is preferably in the range of from 2:1 to 50:1, more preferably in the range of from 4:1 to 40:1, more preferably in the range of from 10:1 to 40:1, more preferably in the range of from 15:1 to 40:1, more preferably in the range of from 15:1 to 25:1 or more preferably from 30:1 to 40:1.

28. The catalyst of any one of embodiments 1 to 27, wherein the zeolitic material comprised in the second coating comprises iron, wherein the amount of iron comprised in the zeolitic material, calculated as $Fe_2O_3$, is preferably in the range of from 0.1 to 10.0 weight-%, more preferably in the range of from 1.0 to 7.0 weight-%, more preferably in the range of from 2.5 to 5.5 weight-%, based on the total weight of the zeolitic material, and wherein preferably from 95 to 100 weight-%, more preferably from 98 to 100 weight-%, more preferably from 99 to 100 weight-% of the framework structure of the zeolitic material consist to Si, Al, O, and optionally one or more of H and P, wherein in the framework structure, the molar ratio of Si to Al, calculated as $SiO_2:Al_2O_3$, is preferably in the range of from 2:1 to 50:1, more preferably in the range of from 4:1 to 40:1, more preferably in the range of from 10:1 to 40:1, more preferably in the range of from 15:1 to 40:1, more preferably in the range of from 15:1 to 25:1 or more preferably from 30:1 to 40:1.

29. The catalyst of any one of embodiments 1 to 28, wherein in the catalyst, the second coating comprises the zeolitic material at a loading in the range of from 45.77 to 305.12 g/l (0.75 to 5 g/in$^3$), preferably in the range of from 61.02 to 183.07 g/l (1 to 3 g/in$^3$), more preferably in the range of from 97.64 to 158.66 g/l (1.6 to 2.6 g/in$^3$).

30. The catalyst of any one of embodiments 1 to 29, wherein the zeolitic material comprised in the second coating, preferably which has a framework type CHA, has a mean crystallite size of at least 0.5 micrometer, preferably in the range of from 0.5 to 1.5 micrometers, more preferably in the range of from 0.6 to 1.0 micrometer, more preferably in the range of from 0.6 to 0.8 micrometer determined via scanning electron microscopy.

31. The catalyst of any one of embodiments 1 to 30, wherein the second coating further comprises a metal oxide binder, wherein the metal oxide binder preferably comprises one or more of zirconia, alumina, titania, silica, and a mixed oxide comprising two or more of Zr, Al, Ti and Si, more preferably one or more of alumina and zirconia, more preferably zirconia, wherein in the catalyst, the second coating more preferably comprises the metal oxide binder at a loading in the range of from 1.22 to 12.20 g/l (0.02 to 0.2 g/in$^3$), more preferably in the range of from 3.05 to 9.15 g/l (0.05 to 0.15 g/in$^3$), more preferably in the range of from 4.88 to 7.32 g/l (0.08 to 0.12 g/in$^3$).

32. The catalyst of any one of embodiments 1 to 31, wherein from 90 to 100 weight-%, preferably from 95 to 100 weight-%, more preferably from 98 to 100 weight-% of the second coating consist of the first platinum group metal component supported on the non-zeolitic first oxidic material and the zeolitic material comprising one or more of copper and iron, and preferably a metal oxide binder according to embodiment 31.

33. The catalyst of any one of embodiments 1 to 31, wherein the second coating comprises a vanadium oxide, wherein the vanadium oxide is preferably one or more of vanadium (V) oxide and a vanadium (IV) oxide, wherein the vanadium oxide optionally comprises one or more of tungsten, iron and antimony.

34. The catalyst of embodiment 33, wherein the vanadium oxide is supported on an oxidic material comprising one or more of titanium, silicon and zirconium, preferably an oxidic material comprising one or more of titanium and silicon, more preferably titania and silica, more preferably on titania, wherein titania optionally contains one or more of tungsten and silicon, preferably silicon.

35. The catalyst of embodiment 34, wherein from 90 to 100 weight-%, preferably from 95 to 100 weight-%, more preferably from 98 to 100 weight-%, more preferably from 99 to 100 weight-%, of the second coating consist of the first platinum group metal component supported on the non-zeolitic first oxidic material and vanadium oxide supported on the oxidic material.

36. The catalyst of any one of embodiments 33 to 35, wherein in the catalyst, the second coating comprises the vanadium oxide, calculated as $V_2O_5$, at a loading in the range of from 30.51 to 244.09 g/l (0.5 to 4 g/in$^3$), preferably in the range of from 61.02 to 183.07 g/l (1 to 3 g/in$^3$), more preferably in the range of from 91.53 to 152.56 g/l (1.5 to 2.5 g/in$^3$).

37. The catalyst of any one of embodiments 1 to 36, wherein in the catalyst, the second coating and the optional third coating together have a platinum group metal component loading, calculated as elemental platinum group metal, in the range of from 0.035 to 1.41 g/l (1 to 40 g/ft$^3$), preferably in the range of from 0.071 to 0.53 g/l (2 to 15 g/ft$^3$), preferably in the range of from 0.11 to 0.35 g/l (3 to 10 g/ft$^3$), more preferably in the range of from 0.16 to 0.32 g/l (4.5 to 9.0 g/ft$^3$), more preferably in the range of from 0.26 to 0.30 g/l (7.5 to 8.5 g/ft$^3$).

38. The catalyst of any one of embodiments 1 to 37, wherein the catalyst has a loading of the first non-zeolitic oxidic material together with the optional second oxidic material in the range of from 6.10 to 183.07 g/l (0.1 to 3 g/in$^3$), preferably in the range of from 12.20 to 122.05 g/l (0.2 to 2 g/in$^3$), more preferably in the range of from 24.41 to 91.53 g/l (0.4 to 1.5 g/in$^3$), more preferably in the range of from 36.61 to 73.23 g/l (0.6 to 1.2 g/in$^3$).

39. The catalyst of any of embodiments 1 to 38, wherein the catalyst consists of the flow through substrate, the first coating and the second coating, wherein the first coating is disposed on the second coating and the second coating is disposed on the surface of the internal walls.

40. The catalyst of any one of embodiments 1 to 39, wherein the second coating comprises, preferably consists of,
    (A) an inlet coating comprising a platinum group metal component supported on a non-zeolitic oxidic material and further comprises one or more of a vanadium oxide and a zeolitic material comprising one or more of copper and iron; and
    (B) an outlet coating comprising a platinum group metal component supported on a non-zeolitic oxidic material and further comprises one or more of a vanadium oxide and a zeolitic material comprising one or more of copper and iron;

wherein the inlet coating extends over y1% of the axial length of the substrate from the inlet end to the outlet end and is disposed either on the surface of the internal walls, or on the surface of the internal walls and the third coating, or on the third coating;

wherein the outlet coating extends over y2% of the axial length of the substrate from the outlet end to the inlet end and is disposed either on the surface of the internal walls, or on the surface of the internal walls and the third coating, or on the third coating;

wherein y1 is in the range of from 45 to 55, preferably in the range of from 48 to 50, and y2 is in the range of from 45 to 55, preferably in the range of from 48 to 50;

wherein the inlet coating comprises the platinum group metal component at a loading (I1) and the outlet coating comprises the platinum group metal component at a loading (I2), wherein the ratio of (I1):(I2) is in the range of from 0.2:1 to 0.75:1, preferably in the range of from 0.3:1 to 0.6:1, more preferably in the range of from 0.4:1 to 0.5:1;

wherein the first platinum group metal component comprises, preferably consists of, the platinum group metal component of the inlet coating and the platinum group metal component of the outlet coating;

wherein the non-zeolitic first oxidic material comprises, preferably consists of, the non-zeolitic oxidic material of the inlet coating and the non-zeolitic oxidic material of the outlet coating.

41. The catalyst of embodiment 40, wherein the platinum group metal component comprised in the inlet coating of the second coating is one or more of platinum, palladium and rhodium, preferably one or more of platinum and palladium, more preferably platinum, or palladium and platinum.

42. The catalyst of embodiment 40 or 41, wherein the non-zeolitic oxidic material supporting the platinum group metal component comprised in the inlet coating comprises, preferably consists of, one or more of alumina, zirconia, titania, silica, ceria, and a mixed oxide comprising two or more of Al, Zr, Ti, Si, and Ce, preferably one or more of alumina, zirconia, titania and silica.

43. The catalyst of embodiment 42, wherein from 90 to 100 weight-%, preferably from 95 to 100 weight-%, more preferably from 99 to 100 weight-% of the non-zeolitic oxidic material consist of alumina and optionally zirconia, wherein 60 to 100 weight-%, preferably from 70 to 90 weight-%, more preferably from 75 to 85 weight-%, of the non-zeolitic oxidic material consist of alumina and from 0 to 40 weight-%, preferably 10 to 30 weight-%, more preferably from 15 to 25 weight-% of the non-zeolitic oxidic material consist of zirconia.

44. The catalyst of embodiment 42, wherein from 90 to 100 weight-%, preferably from 95 to 100 weight-%, more preferably from 99 to 100 weight-% of the non-zeolitic oxidic material consist of titania and optionally silica, wherein 60 to 100 weight-%, preferably from 80 to 100 weight-%, more preferably from 85 to 95 weight-%, of the non-zeolitic oxidic material consists of titania and from 0 to 40 weight-%, preferably 0 to 20 weight-%, more preferably 5 to 15 weight-% of the non-zeolitic oxidic material consist of silica.

45. The catalyst of any one of embodiments 40 to 44, wherein the inlet coating of the second coating comprises a zeolitic material comprising one or more of copper and iron.

46. The catalyst of any one of embodiments 40 to 45, wherein the zeolitic material comprised in the inlet coating of the second coating has a framework type selected from the group consisting of ABW, ACO, AEI, AEL, AEN, AET, AFG, AFI, AFN, AFO, AFR, AFS, AFT, AFV, AFX, AFY, AHT, ANA, APC, APD, AST, ASV, ATN, ATO, ATS, ATT, ATV, AVL, AWO, AWW, BCT, BEA, BEC, BIK, BOF, BOG, BOZ, BPH, BRE, BSV, CAN, CAS, CDO, CFI, CGF, CGS, CHA, -CHI, -CLO, CON, CSV, CZP, DAC, DDR, DFO, DFT, DOH, DON, EAB, EDI, EEI, EMT, EON, EPI, ERI, ESV, ETR, EUO, *-EWT, EZT, FAR, FAU, FER, FRA, GIS, GIU, GME, GON, GOO, HEU, IFO, IFR, -IFU, IFW, IFY, IHW, IMF, IRN, IRR, -IRY, ISV, ITE, ITG, ITH, *-ITN, ITR, ITT, -ITV, ITW, IWR, IWS, IWV, IWW, JBW, JNT, JOZ, JRY, JSN, JSR, JST, JSW, KFI, LAU, LEV, LIO, -LIT, LOS, LOV, LTA, LTF, LTJ, LTL, LTN, MAR, MAZ, MEI, MEL, MEP, MER, MFI, MFS, MON, MOR, MOZ, *MRE, MSE, MSO, MTF, MTN, MTT, MTW, MW, MWF, MWW, NAB, NAT, NES, NON, NPO, NPT, NSI, OBW, OFF, OKO, OSI, OSO, OWE, -PAR, PAU, PCR, PHI, PON, POS, PSI, PUN, RHO, -RON, RRO, RSN, RTE, RTH, RUT, RWR, RWY, SAF, SAO, SAS, SAT, SAV, SBE, SBN, SBS, SBT, SEW, SFE, SFF, SFG, SFH, SFN, SFO, SFS, *SFV, SFW, SGT, SIV, SOD, SOF, SOS, SSF, *-SSO, SSY, STF, STI, *STO, STT, STW, -SVR, SVV, SZR, TER, THO, TOL, TON, TSC, TUN, UEI, UFI, UOS, UOV, UOZ, USI, UTL, UWY, VET, VFI, VNI, VSV, WEI, -WEN, YUG, ZON, a mixture of two or more thereof, and a mixed type of two or more thereof, preferably selected from the group consisting of AEI, GME, CHA, MFI, BEA, FAU, MOR, a mixture of two or more thereof and a mixed type of two or more thereof, more preferably selected from the group consisting of AEI, GME, CHA, BEA, FAU, MOR, a mixture of two or more thereof and a mixed type of two or more thereof, more preferably selected from the group consisting of AEI, CHA, BEA, a mixture of two or more thereof and a mixed type of two or more thereof, wherein the zeolitic material comprised in the inlet coating has more preferably a framework type CHA or AEI, more preferably CHA.

47. The catalyst of any one of embodiments 40 to 46, wherein the zeolitic material comprised in the inlet coating of the second coating comprises copper, wherein the amount of copper comprised in the zeolitic material, calculated as CuO, is preferably in the range of 1 to 10 weight-%, more preferably in the range of from 2 to 8 weight-%, more preferably in the range of from 3 to 6 weight-% based on the total weight of the zeolitic material.

48. The catalyst of embodiment 47, wherein the amount of iron comprised in the zeolitic material of the inlet coating, calculated as $Fe_2O_3$, is in the range of from 0 to 0.01 weight-%, preferably in the range of from 0 to 0.001 weight-%, more preferably in the range of from 0 to 0.0001 weight-%, based on the total weight of the zeolitic material.

49. The catalyst of any one of embodiments 40 to 48, wherein from 95 to 100 weight-%, preferably from 98 to 100 weight-%, more preferably from 99 to 100 weight-% of the framework structure of the zeolitic material of the inlet coating consist to Si, Al, O, and optionally one or more of H and P, wherein in the framework structure, the molar ratio of Si to Al, calculated as $SiO_2:Al_2O_3$, is preferably in the range of from 2:1 to 50:1, more preferably in the range of from 4:1 to 40:1, more preferably in the range of from 10:1 to 40:1, more preferably in the range of from 15:1 to 40:1, more preferably in the range of from 15:1 to 25:1 or more preferably from 30:1 to 40:1.

50. The catalyst of any one of embodiments 40 to 49, wherein the zeolitic material comprised in the inlet coating of the second coating comprises iron, wherein the amount of iron comprised in the zeolitic material, calculated as $Fe_2O_3$, is preferably in the range of from 0.1 to 10.0 weight-%, more preferably in the range of from 1.0 to 7.0 weight-%, more preferably in the range of from 2.5 to 5.5 weight-%, based on the total weight of the zeolitic material, and wherein preferably from 95 to 100 weight-%, more preferably from 98 to 100 weight %, more preferably from 99 to 100 weight-% of the framework structure of the zeolitic material consist to Si, Al, O, and optionally one or more of H and P, wherein in the framework structure, the molar ratio of Si to Al, calculated as $SiO_2:Al_2O_3$, is preferably in the range of from 2:1 to 50:1, more preferably in the range of from 4:1 to 40:1, more preferably in the range of from 10:1 to 40:1, more preferably in the range of from 15:1 to 40:1, more preferably in the range of from 15:1 to 25:1 or more preferably from 30:1 to 40:1.

51. The catalyst of any one of embodiments 40 to 50, wherein in the catalyst, the inlet coating of the second coating comprises the zeolitic material at a loading in the range of from 45.77 to 305.12 g/l (0.75 to 5 g/in$^3$), preferably in the range of from 61.02 to 183.07 g/l (1 to 3 g/in$^3$), more preferably in the range of from 97.64 to 158.66 g/l (1.6 to 2.6 g/in$^3$).

52. The catalyst of any one of embodiments 46 to 51, wherein the zeolitic material comprised in the inlet coating of the second coating, preferably which has a framework type CHA, has a mean crystallite size of at least 0.5 micrometer, preferably in the range of from 0.5 to 1.5 micrometers, more preferably in the range of from 0.6 to 1.0 micrometer, more preferably in the range of from 0.6 to 0.8 micrometer determined via scanning electron microscopy.

53. The catalyst of any one of embodiments 40 to 52, wherein the inlet coating of the second coating further comprises a metal oxide binder, wherein the metal oxide binder preferably comprises one or more of zirconia, alumina, titania, silica, and a mixed oxide comprising two or more of Zr, Al, Ti, and Si, more preferably one or more of alumina and zirconia, more preferably zirconia, wherein in the catalyst, the inlet coating of the second coating more preferably comprises the metal oxide binder at a loading in the range of from 1.22 to 12.20 g/l (0.02 to 0.2 g/in$^3$), preferably in the range of from 3.05 to 9.15 g/l (0.05 to 0.15 g/in$^3$), more preferably in the range of from 4.88 to 7.32 g/l (0.08 to 0.12 g/in$^3$).

54. The catalyst of any one of embodiments 40 to 53, wherein from 90 to 100 weight-%, preferably from 95 to 100 weight-%, more preferably from 98 to 100 weight-% of the inlet coating of the second coating consist of the platinum group metal component supported on the non-zeolitic oxidic material and a zeolitic material comprising one or more of copper and iron, and preferably the metal oxide binder according to embodiment 53.

55. The catalyst of any one of embodiments 40 to 54, wherein the inlet coating of the second coating comprises a vanadium oxide, wherein the vanadium oxide is preferably one or more of vanadium (V) oxide and a vanadium (IV) oxide, wherein the vanadium oxide optionally contains tungsten, iron and antimony.

56. The catalyst of embodiment 55, wherein the vanadium oxide is supported on an oxidic material comprising one or more of titanium, silicon and zirconium, preferably an oxidic material comprising one or more of titanium and silicon, more preferably titania and silica, more preferably on titania, wherein titania optionally contains one or more of tungsten and silicon, preferably silicon.

57. The catalyst of embodiment 55 or 56, wherein from 90 to 100 weight-%, preferably from 95 to 100 weight-%, more preferably from 98 to 100 weight-%, more preferably from 99 to 100 weight-%, of the inlet coating of the second coating consist of the platinum group metal component supported on the non-zeolitic oxidic material and the vanadium oxide.

58. The catalyst of any one of embodiments 55 to 57, wherein in the catalyst, the inlet coating of the second coating comprises the vanadium oxide, calculated as $V_2O_5$, at a loading in the range of from 30.51 to 305.12 g/l (0.5 to 5 g/in$^3$), preferably in the range of from 61.02 to 244.09 g/l (1 to 4 g/in$^3$), more preferably in the range of from 122.05 to 213.58 g/l (2 to 3.5 g/in$^3$).

59. The catalyst of any one of embodiments 40 to 58, wherein in the catalyst, the inlet coating comprises the platinum group metal component, calculated as elemental platinum group metal, at a loading in the range of from 0.035 to 0.28 g/l (1 to 8 g/ft$^3$), preferably in the range of from 0.11 to 0.25 g/l (3 to 7 g/ft$^3$), more preferably in the range of from 0.14 to 0.21 g/l (4 to 6 g/ft$^3$).

60. The catalyst of any one of embodiments 40 to 59, wherein the platinum group metal component comprised in the outlet coating of the second coating is one or more of platinum, palladium and rhodium, preferably one or more of platinum and palladium, more preferably platinum or more preferably palladium and platinum.

61. The catalyst of any one of embodiments 40 to 60, wherein the non-zeolitic oxidic material supporting the platinum group metal component comprised in the outlet coating of the second coating comprises, preferably consists of, one or more of alumina, zirconia, titania, silica, ceria, and a mixed oxide comprising one or more of Ai, Zr, Ti, Si and Ce, preferably one or more of alumina, zirconia, titania and silica.

62. The catalyst of embodiment 61, wherein from 90 to 100 weight-%, preferably from 95 to 100 weight-%, more preferably from 99 to 100 weight-% of the non-zeolitic oxidic material consist of alumina and optionally zirconia, wherein 60 to 100 weight-%, preferably from 70 to 90 weight-%, more preferably from 75 to 85 weight-%, of the non-zeolitic oxidic material consist of alumina and from 0 to 40 weight-%, preferably 10 to 30 weight-%, more preferably from 15 to 25 weight-% of the non-zeolitic oxidic material consist of zirconia.

63. The catalyst of embodiment 61, wherein from 90 to 100 weight-%, preferably from 95 to 100 weight-%, more preferably from 99 to 100 weight-% of the non-zeolitic oxidic material consist of titania and optionally silica, wherein 60 to 100 weight-%, preferably from 80 to 100 weight-%, more preferably from 85 to 95 weight-%, of the non-zeolitic oxidic material consists of titania and from 0 to 40 weight-%, preferably 0 to 20 weight-%, more preferably 5 to 15 weight-% of the non-zeolitic oxidic material consist of silica.

64. The catalyst of any one of embodiments 40 to 63, wherein the outlet coating of the second coating comprises a zeolitic material comprising one or more of copper and iron.

65. The catalyst of any one of embodiments 40 to 64, wherein the zeolitic material comprised in the outlet coating of the second coating has a framework type selected from the group consisting of ABW, ACO, AEI, AEL, AEN, AET, AFG, AFI, AFN, AFO, AFR, AFS, AFT, AFV, AFX, AFY, AHT, ANA, APC, APD, AST, ASV, ATN, ATO, ATS, ATT, ATV, AVL, AWO, AWW, BCT, BEA, BEC, BIK, BOF, BOG, BOZ, BPH, BRE, BSV, CAN, CAS, CDO, CFI, CGF, CGS, CHA, -CHI, -CLO, CON, CSV, CZP, DAC, DDR, DFO, DFT, DOH, DON, EAB, EDI, EEI, EMT, EON, EPI, ERI, ESV, ETR, EUO, *-EWT, EZT, FAR, FAU, FER, FRA, GIS, GIU, GME, GON, GOO, HEU, IFO, IFR, -IFU, IFW, IFY, IHW, IMF, IRN, IRR, -IRY, ISV, ITE, ITG, ITH, *-ITN, ITR, ITT, -ITV, ITW, IWR, IWS, IWV, IWW, JBW, JNT, JOZ, JRY, JSN, JSR, JST, JSW, KFI, LAU, LEV, LIO, -LIT, LOS, LOV, LTA, LTF, LTJ, LTL, LTN, MAR, MAZ, MEI, MEL, MEP, MER, MFI, MFS, MON, MOR, MOZ, *MRE, MSE, MSO, MTF, MTN, MTT, MTW, MW, MWF, MWW, NAB, NAT, NES, NON, NPO, NPT, NSI, OBW, OFF, OKO, OSI, OSO, OWE, -PAR, PAU, PCR, PHI, PON, POS, PSI, PUN, RHO, -RON, RRO, RSN, RTE, RTH, RUT, RWR, RWY, SAF, SAO, SAS, SAT, SAV, SBE, SBN, SBS, SBT, SEW, SFE, SFF, SFG, SFH, SFN, SFO, SFS, *SFV, SFW, SGT, SIV, SOD, SOF, SOS, SSF, *-SSO, SSY, STF, STI, *STO, STT, STW, -SVR, SVV, SZR, TER, THO, TOL, TON, TSC, TUN, UEI, UFI, UOS, UOV, UOZ, USI, UTL, UWY, VET, VFI, VNI, VSV, WEI, -WEN, YUG, ZON, a mixture of two or more thereof, and a mixed type of two or more thereof, preferably selected from the group consisting of AEI, GME, CHA, MFI, BEA, FAU, MOR, a mixture of two or more thereof and a mixed type of two or more thereof, more preferably selected from the group consisting of AEI, GME, CHA, BEA, FAU, MOR, a mixture of two or more thereof and a mixed type of two or more thereof, more preferably selected from the group consisting of AEI, CHA, BEA, a mixture of two or more thereof and a mixed type of two or more thereof, wherein the zeolitic material comprised in the outlet coating has more preferably a framework type CHA or AEI, more preferably CHA.

66. The catalyst of any one of embodiments 40 to 65, wherein from 95 to 100 weight-%, preferably from 98 to 100 weight-%, more preferably from 99 to 100 weight-% of the framework structure of the zeolitic material of the outlet coating consist to Si, Al, O, and optionally one or more of H and P, wherein in the framework structure, the molar ratio of Si to Al, calculated as $SiO_2:Al_2O_3$, is preferably in the range of from 2:1 to 50:1, more preferably in the range of from 4:1 to 40:1, more preferably in the range of from 10:1 to 40:1, more preferably in the range of from 15:1 to 40:1, more preferably in the range of from 15:1 to 25:1 or more preferably from 30:1 to 40:1.

67. The catalyst of any one of embodiments 40 to 66, wherein the zeolitic material comprised in the outlet coating of the second coating comprises copper, wherein the amount of copper comprised in the zeolitic material, calculated as CuO, is preferably in the range of 1 to 10 weight-%, more preferably in the range of from 2 to 8 weight-%, more preferably in the range of from 3 to 6 weight-% based on the total weight of the zeolitic material.

68. The catalyst of embodiment 67, wherein the amount of iron comprised in the zeolitic material of the outlet coating is in the range of from 0 to 0.01 weight-%, preferably in the range of from 0 to 0.001 weight-%, more preferably in the range of from 0 to 0.0001 weight-%, based on the total weight of the zeolitic material.

69. The catalyst of any one of embodiments 40 to 67, wherein the zeolitic material comprised in the outlet coating of the second coating comprises iron, wherein the amount of iron comprised in the zeolitic material, calculated as $Fe_2O_3$, is preferably in the range of from 0.1 to 10.0 weight-%, more preferably in the range of from 1.0 to 7.0 weight-%, more preferably in the range of from 2.5 to 5.5 weight-%, based on the total weight of the zeolitic material, and wherein preferably from 95 to 100 weight-%, more preferably from 98 to 100 weight-%, more preferably from 99 to 100 weight-% of the framework structure of the zeolitic material consist to Si, Al, O, and optionally one or more of H and P, wherein in the framework structure, the molar ratio of Si to Al, calculated as $SiO_2:Al_2O_3$, is preferably in the range of from 2:1 to 50:1, more preferably in the range of from 4:1 to 40:1, more preferably in the range of from 10:1 to 40:1, more preferably in the range of from 15:1 to 40:1, more preferably in the range of from 15:1 to 25:1 or more preferably from 30:1 to 40:1.

70. The catalyst of any one of embodiments 40 to 69, wherein in the catalyst, the outlet coating of the second coating comprises the zeolitic material at a loading in the range of from 45.77 to 305.12 g/l (0.75 to 5 g/in$^3$), preferably in the range of from 61.02 to 183.07 g/l (1 to 3 g/in$^3$), more preferably in the range of from 97.64 to 158.66 g/l (1.6 to 2.6 g/in$^3$).

71. The catalyst of any one of embodiments 65 to 70, wherein the zeolitic material comprised in the outlet coating of the second coating, preferably which has a framework type CHA, has a mean crystallite size of at least 0.5 micrometer, preferably in the range of from 0.5 to 1.5 micrometers, more preferably in the range of from 0.6 to 1.0 micrometer, more preferably in the range of from 0.6 to 0.8 micrometer determined via scanning electron microscopy.

72. The catalyst of any one of embodiments 40 to 71, wherein the outlet coating of the second coating further comprises a metal oxide binder, wherein the metal oxide binder preferably comprises one or more of zirconia, alumina, titania, silica, and a mixed oxide comprising two or more of Zr, Al, Ti and Si, more preferably one or more of alumina and zirconia, more preferably zirconia, wherein in the catalyst, the outlet coating of the second coating more preferably comprises the metal oxide binder at a loading in the range of 1.22 to 12.20 g/l (0.02 to 0.2 g/in$^3$), more preferably in the range of from 3.05 to 9.15 g/l (0.05 to 0.15 g/in$^3$), more preferably in the range of from 4.88 to 7.32 g/l (0.08 to 0.12 g/in$^3$).

73. The catalyst of any one of embodiments 40 to 72, wherein from 90 to 100 weight-%, preferably from 95 to 100 weight-%, more preferably from 98 to 100 weight-% of the outlet coating of the second coating consist of the platinum group metal component supported on the non-zeolitic oxidic material and a zeolitic material comprising one or more of copper and iron, and preferably the metal oxide binder according to embodiment 72.

74. The catalyst of any one of embodiments 40 to 73, wherein the outlet coating of the second coating comprises a vanadium oxide, wherein the vanadium oxide is preferably one or more of vanadium (V) oxide and a vanadium (IV) oxide, wherein the vanadium oxide optionally contains one or more of tungsten, iron and antimony.
75. The catalyst of embodiment 74, wherein the vanadium oxide is supported on an oxidic material comprising one or more of titanium, silicon and zirconium, preferably an oxidic material comprising one or more of titanium and silicon, more preferably titania and silica, more preferably on titania, wherein titania optionally contains one or more of tungsten and silicon, preferably silicon.
76. The catalyst of any one of embodiments 40 to 75, wherein from 90 to 100 weight-%, preferably from 95 to 100 weight-%, more preferably from 98 to 100 weight-%, more preferably from 99 to 100 weight-%, of the outlet coating of the second coating consist of the platinum group metal component supported on the non-zeolitic oxidic material and a vanadium oxide, wherein the vanadium oxide is preferably one or more of vanadium (V) oxide and a vanadium (IV) oxide, wherein the vanadium oxide optionally contains tungsten, iron and antimony.
77. The catalyst of any one of embodiments 40 to 76, wherein in the catalyst, the outlet coating of the second coating comprises the vanadium oxide, calculated as $V_2O_5$, at a loading in the range of from 30.51 to 305.12 g/l (0.5 to 5 g/in$^3$), preferably in the range of from 61.02 to 244.09 g/l (1 to 4 g/in$^3$), more preferably in the range of from 122.05 to 213.58 g/l (2 to 3.5 g/in$^3$).
78. The catalyst of any one of embodiments 40 to 77, wherein in the catalyst, the outlet coating comprises the platinum group metal component, calculated as elemental platinum group metal, at a loading in the range of from 0.07 to 1.41 g/l (2 to 40 g/ft$^3$), preferably in the range of from 0.11 to 0.71 g/l (3 to 20 g/ft$^3$), more preferably in the range of from 0.21 to 0.53 g/l (6 to 15 g/ft$^3$), more preferably in the range of from 0.32 to 0.42 g/l (9 to 12 g/ft$^3$).
79. The catalyst of any one of embodiments 1 to 39, wherein the catalyst comprises, preferably consists of, the flow-through substrate, the first coating, the second coating and the third coating,
wherein z is in the range of from 20 to 65, preferably in the range of from 30 to 60, more preferably in the range of from 40 to 55; or
wherein z is in the range of from 80 to 100, preferably in the range of from 95 to 100, more preferably in the range of from 98 to 100.
80. The catalyst of embodiment 79, wherein the second platinum group metal component comprised in the third coating is one or more of platinum, palladium and rhodium, preferably one or more of platinum and palladium, more preferably platinum.
81. The catalyst of embodiment 79 or 80, wherein the second oxidic material supporting the second platinum group metal component comprised in the third coating comprises, preferably consists of, one or more of alumina, zirconia, titania, silica, ceria, and a mixed oxide comprising two or more of Al, Zr, Ti, Si and Ce, preferably one or more of alumina, zirconia, titania and silica.
82. The catalyst of embodiment 81, wherein from 90 to 100 weight-%, preferably from 95 to 100 weight-%, more preferably from 99 to 100 weight-% of the second oxidic material consist of alumina and optionally zirconia; wherein from 60 to 100 weight-%, preferably from 70 to 90 weight-%, more preferably from 75 to 85 weight-%, of the second oxidic material consist of alumina and wherein from 0 to 40 weight-%, preferably from 10 to 30 weight-%, more preferably from 15 to 25 weight-%, of the second oxidic material consist of zirconia.
83. The catalyst of embodiment 81, wherein from 90 to 100 weight-%, preferably from 95 to 100 weight-%, more preferably from 99 to 100 weight-% of the second oxidic material consist of titania and optionally silica; wherein from 60 to 100 weight-%, preferably from 80 to 100 weight-%, more preferably from 85 to 95 weight-%, of the second oxidic material consists of titania and wherein from 0 to 40 weight-%, preferably from 0 to 20 weight-%, more preferably from 5 to 15 weight-%, of the second oxidic material consist of silica.
84. The catalyst of any one of embodiments 79 to 83, wherein from 90 to 100 weight-%, preferably from 95 to 100 weight-%, more preferably from 99 to 100 weight-% of the third coating consist of the second platinum group metal component supported on the second oxidic material.
85. The catalyst of any one of embodiments 79 to 84, wherein in the catalyst, the second coating comprises the first platinum group metal component, calculated as elemental platinum group metal, at a loading in the range of from 0.018 to 0.21 g/l (0.5 to 6 g/ft$^3$), preferably in the range of from 0.026 to 0.14 g/l (0.75 to 4 g/ft$^3$), more preferably in the range of from 0.035 to 0.123 g/l (1 to 3.5 g/ft$^3$), more preferably in the range of from 0.035 to 0.07 g/l (1 to 2 g/ft$^3$), or more preferably in the range of from 0.088 to 0.123 g/l (2.5 to 3.5 g/ft$^3$).
86. The catalyst of any one of embodiments 79 to 85, wherein in the catalyst, the third coating comprises the second platinum group metal component, calculated as elemental platinum group metal, at a loading in the range of from 0.18 to 0.71 g/l (5 to 20 g/ft$^3$), preferably in the range of from 0.28 to 0.53 g/l (8 to 15 g/ft$^3$), more preferably in the range of from 0.32 to 0.49 g/l (9 to 14 g/ft$^3$), more preferably in the range of from 0.32 to 0.39 g/l (9 to 11 g/ft$^3$), or more preferably in the range of from 0.42 to 0.49 g/l (12 to 14 g/ft$^3$).
87. The catalyst of any one of embodiments 79 to 86, wherein in the catalyst, the second coating comprises the non-zeolitic first oxidic material supporting the first platinum group metal component at a loading in the range of from 3.05 to 91.54 g/l (0.05 to 1.5 g/in$^3$), preferably in the range of from 6.10 to 61.02 g/l (0.1 to 1.0 g/in$^3$), more preferably in the range of from 12.20 to 36.61 g/l (0.2 to 0.6 g/in$^3$).
88. The catalyst of any one of embodiments 79 to 87, wherein in the catalyst, the third coating comprises the second oxidic material supporting the second platinum group metal component at a loading in the range of from 3.05 to 91.54 g/l (0.05 to 1.5 g/in$^3$), preferably in the range of from 6.10 to 61.02 g/l (0.1 to 1.0 g/in$^3$), more preferably in the range of from 12.20 to 36.61 g/l (0.2 to 0.6 g/in$^3$), more preferably in the range of from 24.41 to 36.61 g/l (0.4 to 0.6 g/in$^3$).
89. The catalyst of any one of embodiments 79 to 88, wherein from 0 to 0.001 weight-%, preferably from 0 to 0.0001 weight-%, more preferably from 0.00001 weight-% of the third coating consist of a zeolitic material, wherein more preferably, the third coating is free of a zeolitic material.
90. The catalyst of embodiment 89, wherein the zeolitic material comprises one or more of copper and iron.
91. The catalyst of any one of embodiments 79 to 90, wherein from 0 to 0.001 weight-%, preferably from 0 to 0.0001 weight-%, more preferably from 0.00001 weight-% of the third coating consist of one or more vanadium oxides, wherein more preferably, the third coating is free of vanadium oxides.
92. The catalyst of any one of embodiments 79 to 91, wherein the third coating comprises, preferably consists of, a diesel oxidation catalyst component.
93. The catalyst of any one of embodiments 1 to 92, wherein the second coating comprises, preferably consists of, one or more nitrogen oxide (NOx) reduction components and one or more ammonia oxidation (AMOx) components.
94. The catalyst of any one of embodiments 1 to 93, wherein the first coating comprises, preferably consists of, a nitrogen oxide (NOx) reduction component.
95. The catalyst of any one of embodiments 1 to 94, wherein the flow-through substrate of the catalyst comprises a ceramic or metallic substance.
96. The catalyst of any one of embodiments 1 to 95, wherein the flow-through substrate of the catalyst comprises, preferably consists of, a ceramic substance, wherein the ceramic substance preferably comprises, more preferably consists of, one or more of an alumina, a silica, a silicate, an aluminosilicate, preferably a cordierite or a mullite, an aluminotitanate, a silicon carbide, a zirconia, a magnesia, preferably a spinel, and a titania, more preferably one or more of a silicon carbide and a cordierite, more preferably a cordierite.
97. The catalyst of any one of embodiments 1 to 95, wherein the flow-through substrate of the catalyst comprises, preferably consists of a metallic substance, wherein the metallic substance preferably comprises, more preferably consists of, oxygen and one or more of iron, chromium, and aluminum.
98. An exhaust gas treatment system for treating an exhaust gas stream exiting a diesel engine, said exhaust gas treatment system having an upstream end for introducing said exhaust gas stream into said exhaust gas treatment system, wherein said exhaust gas treatment system comprises the catalyst according to any one of embodiments 1 to 97 and one or more of a diesel oxidation catalyst, a selective catalytic reduction catalyst, and a particulate filter.
99. The exhaust gas treatment system of embodiment 98, comprising a diesel oxidation catalyst comprising a coating disposed on a substrate, a selective catalytic reduction catalyst comprising a coating disposed on a substrate and the catalyst according to any one of embodiments 1 to 97, wherein the diesel oxidation catalyst is located downstream of the upstream end of the exhaust gas treatment system, wherein the selective catalytic reduction catalyst is located downstream of the diesel oxidation catalyst, wherein the catalyst according to any one of embodiments 1 to 97 is located downstream of the selective catalytic reduction catalyst.
100. The exhaust gas treatment system of embodiment 98, comprising a selective catalytic reduction catalyst comprising a coating disposed on a substrate and the catalyst according to any one of embodiments 1 to 97, wherein the selective catalytic reduction catalyst is located downstream of the upstream end of the exhaust gas treatment system and wherein the catalyst according to any one of embodiments 1 to 97 is located downstream of the selective catalytic reduction catalyst.
101. The exhaust gas treatment system of embodiment 99 or 100, further comprising a filter, preferably a particulate filter, more preferably a catalyzed particulate filter, wherein said filter is located downstream of the catalyst according to any one of embodiments 1 to 97.
102. The exhaust gas treatment system of embodiment 98 or 99, wherein the diesel oxidation catalyst comprises a platinum group metal supported on an oxidic material.
103. The exhaust gas treatment system of any one of embodiments 98 to 102, wherein the selective catalytic reduction catalyst comprises one or more of a vanadium oxide and a zeolitic material comprising one or more of copper and iron.
104. The exhaust gas treatment system of embodiment 98, comprising the catalyst according to any one of embodiments 1 to 97 and a filter, preferably a particulate filter, more preferably a catalyzed particulate filter, wherein the catalyst according to any one of embodiments 1 to 97 is located downstream of the upstream end of the exhaust gas treatment system, wherein the filter is located downstream of the catalyst according to any one of embodiments 1 to 97, optionally the exhaust gas treatment system comprises a diesel oxidation catalyst which is located downstream of the catalyst according to any one of embodiments 1 to 97 and upstream of the filter.
105. The exhaust gas treatment system of any one of embodiments 98 to 104, further comprising an injector for injecting a fluid into the exhaust gas stream exiting the diesel engine, said injector being located upstream of the diesel oxidation catalyst in embodiment 99, or of the selective catalytic reduction catalyst in embodiment 100, or of the catalyst in embodiment 104, and downstream of the upstream end of the exhaust gas treatment system, wherein the fluid is preferably an aqueous urea solution.
106. A method for preparing a catalyst for the oxidation of NO, for the oxidation of ammonia, for the oxidation of HC and for the selective catalytic reduction of NOx, preferably the catalyst according to any one of embodiments 1 to 97, comprising
(a) providing an uncoated flow-through substrate, the substrate comprising an inlet end, an outlet end, a substrate axial length extending from the inlet end to the outlet end and a plurality of passages defined by internal walls of the substrate extending therethrough;
(b) optionally providing a slurry comprising a second platinum group metal component and a second oxidic material, disposing said slurry on the surface of the internal walls of the substrate, over z % of the substrate axial length from the outlet end to the inlet end, with z being in the range of from 0 to 100, calcining the slurry disposed on the substrate, obtaining a third coating disposed on the substrate;
(c) providing one or more slurries comprising a first platinum group metal component, a non-zeolitic first oxidic material and water and one or more of a vanadium oxide and a zeolitic material comprising one or more of copper and iron, and a solvent, disposing said one or more slurries either on the surface of the internal walls, or on the surface of the internal walls and the third coating, or on the third coating, over y % of the substrate axial length, with y being in the range of from 95 to 100, calcining the one or more slurries disposed on the substrate, obtaining a second coating disposed on the substrate;
(d) providing a slurry comprising one or more of a vanadium oxide and a zeolitic material comprising one or more of copper and iron, and a solvent, disposing said slurry over x % of the substrate axial length on the second coating from the inlet end to the outlet end, with x being in the range of from 20 to y, calcining the slurry disposed on the substrate, obtaining the catalyst for the oxidation of NO, for the oxidation of ammonia, for the oxidation of HC and for the selective catalytic reduction of NOx.

107. The method of embodiment 106, wherein (c) comprises
   (c.1) forming a slurry with an aqueous mixture of a first platinum group metal precursor, preferably of a platinum precursor, with a non-zeolitic first oxidic material, and a mixture of zirconyl acetate with a zeolitic material, preferably having a framework type CHA, and comprising one or more of copper and iron or a solution of vanadium oxalate, preferably adding an oxidic material, more preferably with a dispersant;
   (c.2) disposing the slurry obtained in (c.1) either on the surface of the internal walls, or on the surface of the internal walls and the third coating, or on the third coating, over y % of the substrate axial length from the inlet end to the outlet end;
   (c.3) optionally, drying the slurry disposed on the substrate obtained in (c.2), obtaining a dried slurry-treated substrate;
   (c.4) calcining the slurry disposed on the substrate obtained in (c.2), or the dried slurry-treated substrate obtained in (c.3), in a gas atmosphere, preferably having a temperature in the range of from 400 to 800° C., more preferably in the range of from 450 to 700° C.

108. The method of embodiment 106, wherein (c) comprises
   (c.1') forming two slurries by mixing an aqueous mixture of a first platinum group metal precursor, preferably of a platinum precursor, with a non-zeolitic first oxidic material, and a mixture of zirconyl acetate with a zeolitic material, preferably having a framework type CHA, and comprising one or more of copper and iron or a solution of vanadium oxalate, preferably adding an oxidic material, more preferably with a dispersant, obtaining a first slurry with a platinum group metal component loading (I1) and a second slurry with a platinum group metal component loading (I2);
   (c.2') disposing the first slurry obtained in (c.1') either on the surface of the internal walls, or on the surface of the internal walls and the third coating, or on the third coating, over y1% of the substrate axial length from the inlet end to the outlet end, with y1 being in the range of from 48 to 50;
   (c.3') disposing the second slurry obtained in (c.1') either on the surface of the internal walls, or on the surface of the internal walls and the third coating, or on the third coating, over y2% of the substrate axial length from the outlet end to the inlet end, with y2 being is in the range of from 48 to 50;
   (c.4') optionally, drying the slurries disposed on the substrate obtained in (c.2') and (c.3'), obtaining a dried slurry-treated substrate;
   (c.5') calcining the slurries disposed on the substrate obtained in (c.2') and (c.3'), or the dried slurry-treated substrate obtained in (c.4'), in a gas atmosphere, preferably having a temperature in the range of from 400 to 800° C., more preferably in the range of from 450 to 700° C.

109. The method of embodiment 107 or 108, wherein, according to (c.3) and (c.4'), drying is performed in gas atmosphere having a temperature in the range of from 90 to 200° C., preferably in the range of from 100 to 190° C.

110. The method of any one of embodiments 107 to 109, wherein, according to (c.3) and (c.4'), drying is performed in gas atmosphere having a temperature in the range of from 110 to 180° C.

111. The method of embodiment 109 or 110, wherein the gas atmosphere comprises, preferably is, one or more of air, lean air, and oxygen, more preferably air.

112. The method of any one of embodiments 107 to 111, wherein, according to (c.4) and (c.5'), calcining is performed in gas atmosphere having a temperature in the range of from 550 to 650° C.

113. The method of any one of embodiments 107, 108 and 112, wherein the gas atmosphere comprises, preferably is, one or more of air, lean air, and oxygen, more preferably air.

114. The method of any one of embodiments 106 to 113, wherein (d) comprises
   (d.1) forming a slurry by mixing a zirconyl acetate mixture with a zeolitic material, preferably having a framework type CHA, and comprising one or more of copper and iron or with solution of vanadium oxalate, preferably adding an oxidic material, more preferably with a dispersant;
   (d.2) disposing said slurry over x % of the substrate axial length on the second coating from the inlet end to the outlet end, with x being y, or with x being in the range of from 20 to 60, preferably in the range of from 40 to 60, more preferably in the range of from 45 to 55, more preferably in the range of from 48 to 52;
   (d.3) optionally drying the slurry disposed on the substrate obtained in (d.2), obtaining a dried slurry-treated substrate;
   (d.4) calcining the slurry disposed on the substrate obtained in (d.2), or the dried slurry-treated substrate obtained in (d.3), in a gas atmosphere, preferably having a temperature in the range of from 300 to 600° C., more preferably in the range of from 350 to 550° C.

115. The method of embodiment 114, wherein according to (d.3), drying is performed in gas atmosphere having a temperature in the range of from 90 to 200° C., preferably in the range of from 100 to 190° C.

116. The method of embodiment 114 or 115, according to (d.3), drying is performed in gas atmosphere having a temperature in the range of from 110 to 180° C.

117. The method of embodiment 115 or 116, wherein the gas atmosphere comprises, preferably is, one or more of air, lean air, and oxygen, more preferably air.

118. The method of any one of embodiments 114 to 117, wherein according to (d.4), calcining is performed in gas atmosphere having a temperature in the range of from 400 to 500° C.

119. The method of embodiment 114 or 118, wherein the gas atmosphere comprises, preferably is, one or more of air, lean air, and oxygen, more preferably air.

120. The method of any one of embodiments 106 to 119, wherein (b) comprises
   (b.1) forming a slurry with an aqueous mixture of a second platinum group metal precursor, preferably of a platinum precursor, with a second oxidic material;
   (b.2) disposing the slurry obtained in (b.1) on the surface of the internal walls of the substrate, over z % of the substrate axial length from the outlet end to the inlet end;
   (b.3) optionally, drying the slurry disposed on the substrate obtained in (b.2), obtaining a dried slurry-treated substrate;
   (b.4) calcining the slurry disposed on the substrate obtained in (b.2), or the dried slurry-treated substrate obtained in (b.3), in a gas atmosphere, preferably having a temperature in the range of from 400 to 800° C., more preferably in the range of from 450 to 700° C., wherein the gas atmosphere preferably comprises, more preferably is, one or more of air, lean air, and oxygen, more preferably air
wherein z is in the range of from 20 to 65, preferably in the range of from 30 to 60, more preferably in the range of from 40 to 55; or
wherein z is in the range of from 80 to 100, preferably in the range of from 95 to 100, more preferably in the range of from 98 to 100.
121. The method of embodiment 120, wherein, according to (b.3), drying is performed in gas atmosphere having a temperature in the range of from 90 to 200° C., preferably in the range of from 100 to 190° C.
122. The method of embodiment 120 or 121, according to (b.3), drying is performed in gas atmosphere having a temperature in the range of from 110 to 180° C.
123. The method of embodiment 121 or 122, wherein the gas atmosphere comprises, preferably is, one or more of air, lean air, and oxygen, more preferably air.
124. The method of any one of embodiments 120 to 123, wherein, according to (b.4), calcining is performed in gas atmosphere having a temperature in the range of from 550 to 650° C., wherein the gas atmosphere preferably comprises, more preferably is, one or more of air, lean air, and oxygen, more preferably air.
125. The method of any one of embodiments 106 to 124, wherein y is in the range of from 98 to 100, preferably in the range of from 99 to 100.
126. The method of any one of embodiments 106 to 125, wherein disposing in one or more of (b), (c) and (d) is performed by wet impregnation or incipient wetness impregnation.
127. The method of any one of embodiments 106 to 126, consisting of (a), (c) and (d) or of (a), (b), (c) and (d).
128. A catalyst for the oxidation of NO, for the oxidation of ammonia, for the oxidation of HC and for the selective catalytic reduction of NOx, preferably the catalyst for the oxidation of NO, for the oxidation of ammonia, for the oxidation of HC and for the selective catalytic reduction of NOx of any one of embodiments 1 to 97, obtainable or obtained by the process according to any one of embodiments 106 to 127.
129. Use of the catalyst for the oxidation of NO, for the oxidation of ammonia, for the oxidation of HC and for the selective catalytic reduction of NOx according to any one of embodiments 1 to 97 or embodiment 128 for the simultaneous selective catalytic reduction of NOx, the oxidation of ammonia, the oxidation of nitrogen monoxide and the oxidation of hydrocarbon.
130. A method for the simultaneous selective catalytic reduction of NOx, the oxidation of ammonia, the oxidation of nitrogen monoxide and the oxidation of hydrocarbon, comprising
(1) providing a gas stream comprising one or more of NOx, ammonia, nitrogen monoxide and a hydrocarbon;
(2) contacting the gas stream provided in (1) with the catalyst for the oxidation of NO, for the oxidation of ammonia, for the oxidation of HC and for the selective catalytic reduction of NOx according to any on of embodiments 1 to 97.

The present invention is further illustrated by the following second set of embodiments and combinations of embodiments resulting from the dependencies and back-references as indicated. This set of embodiments may be combined with the first set of embodiments as indicated in the following. Further, it is explicitly noted that the following set of embodiments is not the set of claims determining the extent of protection, but represents a suitably structured part of the description directed to general and preferred aspects of the present invention.

1'. A catalyst for the oxidation of NO, for the oxidation of ammonia, for the oxidation of HC and for the selective catalytic reduction of NOx, comprising
(i) a flow through substrate comprising an inlet end, an outlet end, a substrate axial length extending from the inlet end to the outlet end and a plurality of passages defined by internal walls of the flow through substrate extending therethrough;
(ii) a first coating comprising one or more of a vanadium oxide and a zeolitic material comprising one or more of copper and iron;
(iii) a second coating comprising a first platinum group metal component supported on a non-zeolitic first oxidic material and further comprising one or more of a vanadium oxide and a zeolitic material comprising one or more of copper and iron;
(iv) a third coating comprising a second platinum group metal component supported on a second oxidic material;
wherein the third coating is disposed on the surface of the internal walls and under the second coating over z % of the axial length of the substrate from the outlet end to the inlet end, with z being in the range of from 10 to 80;
wherein the second coating extends over y % of the axial length of the substrate from the outlet end to the inlet end and is disposed on the third coating and on the surface of the internal walls, or on the third coating, with y being in the range of from 10 to 80;
wherein the first coating extends over x % of the axial length of the substrate from the inlet end to the outlet end and is disposed on the surface of the internal walls and on the second coating, with x being in the range of from 95 to 100.
2'. The catalyst of embodiment 1', wherein x is in the range of from 98 to 100, preferably in the range of from 99 to 100.
3'. The catalyst of embodiment 1', wherein the second coating is disposed on the third coating and on the surface of the internal walls of the substrate, wherein y preferably is in the range of from 30 to 70, more preferably in the range of from 40 to 60, more preferably in the range of from 45 to 55.
4'. The catalyst of any one of embodiments 1' to 3', wherein z is in the range of from 10 to 60, preferably in the range of from 15 to 40, more preferably in the range of from 20 to 30.
5'. The catalyst of any one of embodiments 1' to 4', wherein x is in the range of from 98 to 100, preferably in the range of from 99 to 100, wherein the second coating is disposed on the third coating and on the surface of the internal walls of the substrate, wherein y is in the range of from 30 to 70, more preferably in the range of from 40 to 60, more preferably in the range of from 45 to 55, and wherein z is in the range of from 10 to 60, preferably in the range of from 15 to 40, more preferably in the range of from 20 to 30.
6'. The catalyst of any one of embodiments 1' to 5', wherein the first coating has the chemical composition of the first coating in the first set of embodiments as defined in any one of embodiments 5 to 9, 11 to 15, 17, 18 and 94 of the first set of embodiments.
7'. The catalyst of any one of embodiments 1' to 6', wherein the first coating comprises the zeolitic material at a loading in the range of from 0.5 to 3.5 g/in$^3$, preferably in the range of from 2 to 3 g/in$^3$.

8'. The catalyst of any one of embodiments 1' to 7', comprising the first coating at a loading in the range of from 1 to 4 g/in$^3$, preferably in the range of from 2.5 to 3.5 g/in$^3$.

9'. The catalyst of any one of embodiments 1' to 8', wherein the second coating has the chemical composition of the second coating in the first set of embodiments as defined in any one of embodiments 19 to 28, 30 to 35 and 93 of the first set of embodiments.

10'. The catalyst of any one of embodiments 1' to 9', wherein the second coating comprises the zeolitic material at a loading in the range of from 1 to 2.5 g/in$^3$.

11'. The catalyst of any one of embodiments 1' to 10', wherein the second coating comprises the first platinum group metal component at a loading in the range of from 1 to 10 g/ft$^3$.

12'. The catalyst of any one of embodiments 1' to 11', wherein the second coating comprises the non-zeolitic first oxidic material at a loading in the range of from 0.1 to 1 g/in$^3$.

13'. The catalyst of any one of embodiments 1' to 12', comprising the second coating at a loading in the range of from 1 to 3 g/in$^3$.

14'. The catalyst of any one of embodiments 1' to 13', wherein the third coating has the composition of the third coating in the first set of embodiments as defined in any one of embodiments 80 to 84 and 89 to 92 of the first set of embodiments.

15'. The catalyst of any one of embodiments 1' to 14', wherein the third coating comprises the second platinum group metal component at a loading in the range of from 5 to 30 g/ft$^3$, preferably in the range of from 10 to 20 g/ft$^3$.

16'. The catalyst of any one of embodiments 1' to 15', wherein the third coating comprises the second oxidic material at a loading in the range of from 0.1 to 4 g/in$^3$, preferably in the range of from 0.2 to 2 g/in$^3$, more preferably in the range of from 0.5 to 1 g/in$^3$.

17'. The catalyst of any one of embodiments 1' to 16', comprising the third coating at a loading in the range of from 0.1 to 4 g/in$^3$, preferably in the range of from 0.2 to 2 g/in$^3$, more preferably in the range of from 0.5 to 1 g/in$^3$.

18'. The catalyst of any one of embodiments 1' to 17', wherein the flow through filter is the flow-though filter in the first set of embodiments as defined in any one of embodiments 95 to 97.

19'. The catalyst of any one of embodiments 1' to 18' consisting of the flow through substrate, the first coating, the second coating and the third coating.

In the context of the present invention, the term "the surface of the internal walls" is to be understood as the "naked" or "bare" or "blank" surface of the walls, i.e. the surface of the walls in an untreated state which consists—apart from any unavoidable impurities with which the surface may be contaminated—of the material of the walls.

Furthermore, preferred embodiments of the present invention are illustrated by FIGS. 1a, 1b and 1c. The present invention is further illustrated by the following Examples, Reference Examples, and Comparative Examples.

EXAMPLES

Reference Example 1: Determination of the Dv90 Values

The particle size distributions were determined by a static light scattering method using Sympatec HELOS equipment, wherein the optical concentration of the sample was in the range of from 5 to 10%.

Reference Example 2: Preparation of a Cu-CHA Zeolite

The zeolitic material having the framework structure type CHA comprising Cu and used in the examples herein was prepared according to the teaching of U.S. Pat. No. 8,293, 199 B2. Particular reference is made to Inventive Example 2 of U.S. Pat. No. 8,293,199 B2, column 15, lines 26 to 52.

Reference Example 3: Measurement of the BET Specific Surface Area

The BET specific surface area was determined according to DIN 66131 or DIN ISO 9277 using liquid nitrogen.

Reference Example 4: General Coating Method

In order to coat the flow-through substrate with one or more coatings, the flow-through substrate was suitably immersed vertically in a portion of a given slurry for a specific length of the substrate which was equal to the targeted length of the coating to be applied and vacuum was applied. In this manner, the slurry contacted the walls of the substrate. The sample was left in the slurry for a specific period of time, usually for 1-10 seconds. The substrate was then removed from the slurry, and excess slurry was removed from the substrate by allowing it to drain from the substrate, then by blowing with compressed air (against the direction of slurry penetration).

Reference Example 5: Preparation of a Cu-SCR Catalyst

An aqueous zirconyl-acetate solution was diluted in water (such that upon calcination this would lead to 3 weight % of ZrO$_2$ in water based on the original weight of the solution). The amount of zirconyl-acetate was calculated such that the loading of zirconia in the catalyst after calcination, calculated as ZrO$_2$, was 6.10 g/l (0.1 g/in$^3$). To this, a Cu-CHA zeolite prepared according to Reference Example 2 herein except that the zeolite was spray-dried, were added. The amount of Cu-CHA was calculated such that the loading of Cu-CHA in the catalyst after calcination was 170.87 g/l (2.8 g/in$^3$). The resulting slurry was then milled until the resulting Dv90 determined as described in Reference Example 1 herein was 10 micrometers.

The final slurry was then disposed over the full length of an uncoated honeycomb cordierite monolith substrate (diameter: 26.67 cm (10.5 inches)×length: 15.24 cm (6 inches) cylindrically shaped substrate with 400/(2.54)$^2$ cells per square centimeter and 0.1 millimeter (4 mil) wall thickness). Afterwards, the coated substrate was dried at 120° C. for 10 minutes and at 160° C. for 30 minutes and was then calcined at 450° C. for 30 minutes. The washcoat loading after calcination was 189.17 g/l (3.1 g/in$^3$).

Comparative Example 1: Preparation of a Catalyst not According to the Present Invention A mixture of a platinum precursor, a platinum complexed with monoethanolamine (MEA) with a solid content of 17 weight-%, and water was added dropwise into alumina ($Al_2O_3$ (about 80 weight-%) doped with about 20 weight-% of $ZrO_2$, having a BET specific area of about 200 $m^2/g$, a Dv90 of 125 micrometers and a total pore volume of 0.325 ml/g), corresponding to a final zirconia-alumina loading in the catalyst of 15.26 g/l (0.25 g/in$^3$), under constant stirring thereby performing an incipient wetness impregnation. The amount of liquids added was suitably calculated to fill the pore volume of the oxidic support. The final solid content after incipient wetness was of approximately 78 weight-%. The resulting mixture after incipient wetness impregnation was pre-calcined at 590° C. for 4 hours to remove any moisture and to fix the platinum onto the metal oxide support material giving a dry platinum content of 0.28 g/l (8 g/ft$^3$). Subsequently, the pre-calcined Pt impregnated alumina was made into a slurry. Firstly, tartaric acid (5 times the volume of the platinum solution used above) was added to water as was monoethanolamine (MEA) in a ratio of 1/10 of the volume of the platinum solution used above. Secondly, the Pt impregnated alumina was added to the solution and mixed thereby forming a Pt-containing slurry with a solid content of 40% by weight. The resulting slurry was milled until the resulting Dv90 determined as in Reference Example 1 was 10 micrometers.

Separately, a zirconyl-acetate mixture with a solid content of 30 weight-%, such that the final zirconia loading (calculated as $ZrO_2$) in the catalyst was 7.93 g/l (0.13 g/in$^3$), was added to water to create a mixture with a solid content of approximately 3 weight-%. To this, Cu-CHA zeolite (3.25 weight-% of Cu calculated as CuO and a $SiO_2:Al_2O_3$ molar ratio of 32) prepared according to Reference Example 2 and corresponding to a final Cu-CHA loading in the catalyst of 158.66 g/l (2.6 g/in$^3$), was added and mixed, forming a Cu-CHA slurry. The resulting slurry had a solid content of 38 weight-%. The particles in the resulting slurry had a Dv90 determined as in Reference Example 1 of 10 micrometers. The Pt-containing slurry was added to the Cu-CHA slurry and stirred, forming the final slurry. The final slurry was then disposed over the full length of an uncoated honeycomb cordierite monolith substrate using the coating method described in Reference Example 4 (diameter: 26.67 cm (10.5 inches)×length: 7.62 cm (3 inches) cylindrically shaped substrate with 400/(2.54)$^2$ cells per square centimeter and 0.1 millimeter (4 mil) wall thickness). Afterwards, the substrate was dried at 120° C. for 15 minutes, then at 160° C. for 30 minutes (to remove between 85 and 95% of moisture) and was then calcined at 590° C. for 30 minutes. The washcoat loading after calcination was 182.13 g/l (2.98 g/in$^3$+8 g/ft$^3$).

Example 1: Preparation of a Tetra-Functional Catalyst According to the Present Invention Second Coating (Bottom Coating)

A mixture of a platinum precursor, a platinum complexed with monoethanolamine (MEA) with a solid content of 17 weight-%, and water was added dropwise into titania ($TiO_2$ (90 weight-%) and 10 weight-% of $SiO_2$, having a BET specific surface are of 200 $m^2/g$ and a Dv90 of 20 micrometers), corresponding to a final silica-titania loading in the catalyst of 15.26 g/l (0.25 g/in$^3$), under constant stirring thereby performing an incipient wetness impregnation. The amount of liquids added was suitably calculated to fill the pore volume of the silica-titania support. The final solid content after incipient wetness was of approximately 70 weight-%. Subsequently, the Pt impregnated titania was made into a slurry. Firstly, tartaric acid (5 times the volume of the platinum solution used above) was added to water as was monoethanolamine (MEA) in a ratio of 1/10 of the volume of the platinum solution used above. Secondly, the Pt impregnated titania was added to the solution and mixed thereby forming a Pt-containing slurry with a solid content of 40% by weight. The resulting slurry was milled until the resulting Dv90 determined as in Reference Example 1 was 10 micrometers.

Separately, a zirconyl-acetate mixture with a solid content of 30 weight-%, such that the final zirconia loading (calculated as $ZrO_2$) in the catalyst was 6.1 g/l (0.1 g/in$^3$), was added to water to create a mixture with a solid content of approximately 3 weight-%. To this, Cu-CHA zeolite (5.1 weight-% of Cu calculated as CuO and a $SiO_2:Al_2O_3$ molar ratio of 19) was added and mixed (final CHA loading in the catalyst of 2.15 g/in$^3$). The particles in the resulting slurry had a Dv90 determined as in Reference Example 1 of 10 micrometers. The resulting slurry had a solid content of 38% by weight. The Pt-containing slurry was added to the Cu-CHA slurry and stirred, creating the final slurry. The final slurry was then disposed over the full length of an uncoated honeycomb cordierite monolith substrate using the coating method described in Reference Example 5 (diameter: 26.67 cm (10.5 inches)×length: 7.62 cm (3 inches) cylindrically shaped substrate with 400/(2.54)$^2$ cells per square centimeter and 0.1 millimeter (4 mil) wall thickness) to form a second coating. Afterwards, the substrate was dried at 120° C. for 15 minutes, then at 160° C. for 30 minutes (to remove between 85 and 95% of moisture) and was calcined at 590° C. for 30 minutes. The washcoat loading of the second coating after calcination was 152.84 g/l (2.5 g/in$^3$+8 g/ft$^3$), including a final platinum loading of 0.28 g/l.

First Coating (Top Coating)

A zirconyl-acetate mixture with a solid content of 30 weight-%, such that the final zirconia loading (calculated as $ZrO_2$) in the catalyst was 6.1 g/l (0.1 g/in$^3$), was added to water to create a mixture with a solid content of approximately 3 weight-%. To this, Cu-CHA zeolite (5.1 weight-% of Cu calculated as CuO and a $SiO_2:Al_2O_3$ molar ratio of 19) corresponding to a final Cu-CHA loading in the catalyst of 57.97 g/l (0.95 g/in$^3$), was added and mixed. The resulting slurry had a solid content of 38.5 weight-%. The resulting slurry was then disposed over the full length of the second coating using the coating method described in Reference Example 4. Afterwards, the substrate was dried at 120° C. for 15 minutes, then at 160° C. for 30 minutes (to remove between 85 and 95% of moisture) and was calcined at 450° C. for 30 minutes. The washcoat loading of the first coating after calcination 64.07 g/l (1.05 g/in$^3$).

Example 2: Preparation of a Tetra-Functional Catalyst According to the Present Invention Second Coating (Bottom Coating)
Inlet Coat A mixture of a platinum precursor, a platinum complexed with monoethanolamine (MEA) with a solid content of 17 weight-%, and water was added dropwise into alumina ($Al_2O_3$ (about 80 weight-%) doped with about 20 weight-% of $ZrO_2$, having a BET specific area of about 200 $m^2/g$, a Dv90 of 125 micrometers and a total pore volume of 0.425 ml/g), corresponding to a final zirconia-alumina loading in the catalyst of 15.26 g/l (0.25 g/in$^3$), under constant stirring thereby performing an incipient wetness impregnation. The amount of liquids added was suitably calculated to fill the pore volume of the alumina support. The final solid content after incipient wetness was approximately 78 weight-%. The resulting mixture was added to a solution of water with tartaric acid (5 times the volume of the platinum solution used above) and monoethanolamine in a ratio of 1/10 of the volume of the platinum solution used above, such that the final solid content of the resulting slurry after addition of Pt-impregnated support was 40 weight-%. Afterwards, the resulting slurry was milled until the Dv90 was 10 micrometers.

Separately, a zirconyl-acetate mixture with a solid content of 30% by weight, such that the final zirconia loading (calculated as ZrO$_2$) in the catalyst was 6.1 g/l (0.1 g/in$^3$), was added to water to create a mixture with a solid content of approximately 3 weight-%. To this, Cu-CHA zeolite (5.1 weight-% of Cu calculated as CuO and a SiO$_2$:Al$_2$O$_3$ molar ratio of 19) was added and mixed (final CHA loading in the catalyst of 131.20 g/l (2.15 g/in$^3$)). The resulting slurry had a solid content of 38 weight-%. The particles in the resulting slurry had a Dv90 determined as in Reference Example 1 of 10 micrometers. To this Cu-CHA slurry, the Pt-containing slurry was added forming a final slurry which was stirred. The final slurry was then disposed from the inlet side of an uncoated honeycomb cordierite monolith substrate toward the outlet side over less than half of the length of the substrate using the coating method described in Reference Example 4 (diameter: 26.67 cm (10.5 inches)×length: 7.62 cm (3 inches) cylindrically shaped substrate with 400/(2.54)$^2$ cells per square centimeter and 0.1 millimeter (4 mil) wall thickness). Afterwards, the coated substrate was dried at 120° C. for 15 minutes, then at 160° C. for 30 minutes to remove between 85 and 95% of moisture and was calcined at 590° C. for 30 minutes. The washcoat loading of the inlet coating after calcination was 152.74 g/l (2.5 g/in$^3$+5 g/ft$^3$), including a final platinum loading in the inlet coating of 0.18 g/l.

Outlet Coat

A mixture of a platinum precursor, a platinum complexed with monoethanolamine (MEA) with a solid content of 17 weight-%, and water was added dropwise into alumina (Al$_2$O$_3$ (about 80 weight-%) doped with about 20 weight-% of ZrO$_2$, having a BET specific area of about 200 m$^2$/g, a Dv90 of 125 micrometers and a total pore volume of 0.425 ml/g), corresponding to a final zirconia-alumina loading in the catalyst of 15.26 g/l (0.25 g/in$^3$) under constant stirring thereby performing an incipient wetness impregnation. The amount of liquids added was suitably calculated to fill the pore volume of the alumina support. The final solid content after incipient wetness was approximately 78 weight-%. The resulting mixture was added to a solution of water with tartaric acid (5 times the amount of platinum solution used above and monoethanolamine in a ratio of 1/10 of the amount of platinum solution used above, such that the final solid content of the resulting slurry after addition of Pt-impregnated support was 40 weight-%. Afterwards, the resulting slurry was milled until the Dv90 was 10 micrometers.

Separately, a zirconyl-acetate mixture with a solid content of 30% by weight, such that the final zirconia loading (calculated as ZrO$_2$) in the catalyst was 6.1 g/l (0.1 g/in$^3$), was added to water to create a mixture with a solid content of approximately 3 weight-%. To this, Cu-CHA zeolite (5.1 weight-% of Cu calculated as CuO and a SiO$_2$:Al$_2$O$_3$ molar ratio of 19) was added and mixed (a final CHA loading in the catalyst of 131.20 g/l (2.15 g/in$^3$)). The resulting slurry had a solid content of 38 weight-%. The particles in the resulting slurry had a Dv90 determined as in Reference Example 1 of 10 micrometers. To this Cu-CHA slurry, the Pt-containing slurry was added forming a final slurry which was stirred. The final slurry was then disposed from the outlet side of the honeycomb cordierite monolith substrate toward the inlet side over less than half of the length of the substrate such that there was a gap of 5 to 8 mm between the inlet coating and the outlet coating using the coating method described in Reference Example 4 (diameter: 26.67 cm (10.5 inches)×length: 7.62 cm (3 inches) cylindrically shaped substrate with 400/(2.54)$^2$ cells per square centimeter and 0.1 millimeter (4 mil) wall thickness). Afterwards, the coated substrate was dried at 120° C. for 15 minutes, then at 160° C. for 30 minutes to remove between 85 and 95% of moisture and was calcined at 590° C. for 30 minutes. The washcoat loading of the outlet coating after calcination was 152.95 g/l (2.5 g/in$^3$+11 g/ft$^3$), including a final platinum loading in the outlet coating of 0.39 g/l. The total platinum loading in the catalyst was of 0.28 g/l (8 g/ft$^3$).

First Coating (Top Coating)

The slurry of the first coating was prepared as the slurry of the first coating in Example 1. The resulting slurry was disposed over the second coating (inlet coating and outlet coating) over the full length of the substrate using the coating method described in Reference Example 4. Afterwards, the substrate was dried at 120° C. for 15 minutes, then at 160° C. for 30 minutes (to remove between 85 and 95% of moisture) and was calcined at 450° C. 30 minutes. The washcoat loading of the first coating after calcination was 64.07 g/l (1.05 g/in$^3$).

Example 3.1: Preparation of a Tetra-Functional Catalyst According to the Present Invention Third Coating (Outlet Bottom Coating)

An mixture of a platinum precursor, a platinum complexed with monoethanolamine (MEA) with a solid content of 17 weight-%, and water was added dropwise into titania (TiO$_2$ (90 weight-%) and 10 weight-% of SiO$_2$, having a BET specific surface are of 200 m$^2$/g and a Dv90 of 20 micrometers), corresponding to a final silica-titania loading in the catalyst of 30.51 g/l (0.5 g/in$^3$), under constant stirring thereby performing an incipient wetness impregnation. The amount of liquids added was suitably calculated to fill the pore volume of the titania support. The final solid content after incipient wetness was approximately 70 weight-%. The resulting mixture was added to a solution of water with tartaric acid (5 times the volume of the platinum solution used above) and monoethanolamine in a ratio of 1/10 of the volume of the platinum solution used above, such that the final solid content of the resulting slurry after addition of Pt-impregnated titania was 40 weight-%. Afterwards, the resulting slurry was milled until the Dv90 was 10 micrometers. The resulting slurry was then disposed from the outlet side of an uncoated honeycomb cordierite monolith substrate toward the inlet side over half of the length of the substrate using the coating method described in Reference Example 4 (diameter: 26.67 cm (10.5 inches)×length: 7.62 cm (3 inches) cylindrically shaped substrate with 400/(2.54)$^2$ cells per square centimeter and 0.1 millimeter (4 mil) wall thickness) to form the third coating. Afterwards, the coated substrate was dried at 120° C. for 15 minutes, then at 160° C. for 30 minutes to remove between 85 and 95% of moisture and was calcined at 590° C. for 30 minutes. The washcoat loading of the third coating in the catalyst after calcination was 30.86 g/l (0.50 g/in$^3$+10 g/ft$^3$), including a final platinum loading in the third coating of 0.35 g/l.

Second Coating (Middle Coating)

An mixture of a platinum precursor, a platinum complexed with monoethanolamine (MEA) with a solid content of 17 weight-%, and water was added dropwise into titania (TiO$_2$ (90 weight-%) and 10 weight-% of SiO$_2$, having a BET specific surface are of 200 m$^2$/g and a Dv90 of 20 micrometers), corresponding to a final silica-titania loading in the catalyst of 15.26 g/l (0.25 g/in$^3$) under constant stirring thereby performing an incipient wetness impregnation. The amount of liquids added was suitably calculated to fill the pore volume of the oxidic support. The final solid content after incipient wetness was approximately 70 weight-%. Subsequently, the pre-calcined Pt impregnated titania was made into a slurry. Firstly, tartaric acid (5 times the volume of the platinum solution used above) was added to water as was monoethanolamine (MEA) in a ratio of 1/10 of the volume of the platinum solution used above. Secondly, the Pt impregnated titania was added to the solution and mixed thereby forming a Pt-containing slurry with a solid content of 40% by weight. The resulting slurry was milled until the resulting Dv90 determined as in Reference Example 1 was 10 micrometers.

Separately, a zirconyl-acetate mixture with a solid content of 30% by weight, such that the final zirconia loading (calculated as ZrO$_2$) in the catalyst was 6.1 g/l (0.1 g/in$^3$), was added to water to create a mixture with a solid content of approximately 3 weight-%. To this, Cu-CHA zeolite (5.1 weight-% of Cu calculated as CuO and a SiO$_2$:Al$_2$O$_3$ molar ratio of 19) was added and mixed (final CHA loading in the catalyst of 131.20 g/l (2.15 g/in$^3$)). The resulting slurry had a solid content of 38% by weight. The particles in the resulting slurry had a Dv90 determined as in Reference Example 1 of 10 micrometers. To this Cu-CHA slurry, the Pt-containing slurry was added and stirred, creating the final slurry. The final slurry was then disposed over the full length of the honeycomb cordierite monolith substrate from the inlet side of the substrate towards the outlet side and covering the third coating using the coating method described in Reference Example 4 (diameter: 26.67 cm (10.5 inches)×length: 7.62 cm (3 inches) cylindrically shaped substrate with 400/(2.54)$^2$ cells per square centimeter and 0.1 millimeter (4 mil) wall thickness). Afterwards, the substrate was dried at 120° C. for 15 minutes, then at 160° C. for 30 minutes to remove between 85 and 95% of moisture and was calcined at 590° C. for 30 minutes. The washcoat loading of the second coating after calcination was 152.67 g/l (2.5 g/in$^3$+3 g/ft$^3$), including a final platinum loading of 0.11 g/l. The total platinum loading in the catalyst was of 0.28 g/l (8 g/ft$^3$).

First Coating (Top Coating)

The slurry of the first coating was prepared as in Example 1. The resulting slurry was then disposed over the full length of the first coating using the coating method described in Reference Example 4. Afterwards, the substrate was dried at 120° C. for 15 minutes, then at 160° C. for 30 minutes (to remove between 85 and 95% of moisture) and was calcined at 450° C. for 30 minutes. The washcoat loading of the first coating after calcination was 64.07 g/l (1.05 g/in$^3$).

Example 3.2: Preparation of a Tetra-Functional Catalyst According to the Present Invention Third Coating (Outlet Bottom Coating)

The slurry of the third coating was prepared and coated as in Example 3.1 except that the final platinum loading was 0.46 g/l (13 g/ft$^3$).

Second Coating (Middle Coating)

The slurry of the second coating was prepared and coated as in Example 3.1 except that the final platinum loading was 0.05 g/l (1.5 g/ft$^3$). The total platinum loading in the catalyst was of 0.28 g/l (8 g/ft$^3$).

First Coating (Top Coating)

The slurry of the first coating was prepared and coated as in Example 3.1.

Example 4: Use of the Catalysts of Examples 1 to 3.1 and Comparative Example 1—NH$_3$ Oxidation/N$_2$O Make For testing the fresh catalysts of Examples 1 to 3.1 and of Comparative Example 1, the NH3 oxidation and the N$_2$O make were measured at different temperatures at the entrance of the catalysts, namely at 250, 300 and 350° C. (space velocity: 100 000 hr$^{-1}$, 515 ppm of NH$_3$, 7% H$_2$O, 7% CO$_2$ and 8% O$_2$). The results are displayed in Table 1 below.

TABLE 1

Results of the tested fresh catalysts

| T (° C.) | Example 1 | | Example 2 | | Example 3.1 | | Comparative Example 1 | |
|---|---|---|---|---|---|---|---|---|
| | NH$_3$ ox. (%) | N$_2$O make (ppm) | NH$_3$ ox. (%) | N$_2$O make (ppm) | NH$_3$ ox. (%) | N$_2$O make (ppm) | NH$_3$ ox. (%) | N$_2$O make (ppm) |
| 250 | 76 | 21 | 45 | 12 | 65 | 19 | 78 | 28 |
| 300 | 97 | 19 | 96 | 21 | 94 | 14 | 100 | 53 |
| 350 | 98 | 11 | 97 | 10 | 97 | 7 | 100 | 33 |

As may be taken from Table 1, the catalysts of Examples 1 to 3.1 exhibit great ammonia oxidations of 94 to 98% at 300 and 350° C. but slightly lower than with the catalyst of Comparative Example 1. However, they produce less nitrous oxide (2.5 to 4.7 times less) compared to the nitrous oxide produced with the catalyst of Comparative Example 1. Therefore, the catalysts according to the present invention permits to obtain a great balance between the ammonia conversion and the nitrous oxide make under fresh conditions at high temperatures. This example demonstrates that the particular composition of the catalysts according to the present invention permits to obtain great ammonia oxidation while permitting to greatly reduce the nitrous oxide formation.

Example 5: Use of the Catalysts of Examples 1 to 3.1 and Comparative Example 1—DeNOx/N$_2$O Make For testing the fresh catalysts of Examples 1 to 3.1 and of Comparative Example 1, the NOx conversion and the N$_2$O make were measured at different temperatures at the entrance of the catalysts, namely at 175, 200, 225, 250 and 400° C. (space velocity: 60 000 hr$^{-1}$, 515 ppm of NO, NH$_3$ to NOx ratio of 1.1, 5% H$_2$O, 5% CO$_2$ and 10% O$_2$). The results are displayed in Table 2 below.

TABLE 2

Results of the tested fresh catalysts

| T (°C.) | Example 1 | | Example 2 | | Example 3.1 | | Comparative Example 1 | |
|---|---|---|---|---|---|---|---|---|
| | DeNOx (%) | $N_2O$ make (ppm) | DeNOx (%) | $N_2O$ make (ppm) | DeNOx (%) | $N_2O$ make (ppm) | DeNOx (%) | $N_2O$ make (ppm) |
| 175 | 64 | 10 | 59 | 8 | 61 | 7 | 45 | 15 |
| 200 | 89 | 25 | 86 | 20 | 85 | 17 | 81 | 64 |
| 225 | 96 | 71 | 97 | 45 | 96 | 50 | 95 | 181 |
| 250 | 94 | 71 | 95 | 52 | 93 | 64 | 81 | 202 |
| 400 | 92 | 7 | 91 | 6 | 87 | 7 | 48 | 24 |

As may be taken from Table 2, the catalysts of Examples 1 to 3.1 exhibits improved NOx conversion over a large temperature range, namely from 175 to 400° C. compared to the NOx conversion obtained with the catalyst of Comparative Example 1 comprising a single coating comprising a mixture of Pt/alumina and Cu-SCR. Further, the catalysts of the inventive examples also permits to reduce the nitrous oxide make. In particular, the catalyst of Example 1 exhibits a NOx conversion of 96% at 225° C. and a $N_2O$ make of 71 ppm, the catalyst of Example 2 exhibits a NOx conversion of 97% at 225° C. and a $N_2O$ make of 45 ppm and the catalyst of Example 3.1 exhibits a NOx conversion of 96% and a $N_2O$ make of 50 ppm.

In contrast thereto, the catalyst of Comparative Example 1 at the same temperature exhibits a NOx conversion of 95% and a $N_2O$ make of 181 ppm (2.5 to 4 times more than with an inventive catalyst).

Thus, this example demonstrates that the catalyst of the present invention permit, in addition to obtain a great balance between the ammonia conversion and the nitrous oxide make under fresh conditions at high temperatures (see Example 4), to obtain improved NOx conversion while permitting to significantly decreasing the nitrous make over a wide temperature range.

Example 6: Use of the Catalysts of Example 1 and 3.1 and of Comparative Example 1—$NO_2$/NOx The $NO_2$/NOx ratio was measured in the absence of ammonia obtained with the catalysts of Comparative Example 1 and Examples 1 and 3.1 at temperatures of from 200 to 450° C. (space velocity: 100 k/h). The results are depicted in FIG. 2. As may be taken from FIG. 2, the NO oxidation is almost unchanged when using the catalyst of Example 1 and the catalyst of Comparative Example 1.

Example 7: Use of the Catalysts of Examples 1 to 3.1 and Comparative Example 1—$NH_3$ Oxidation/$N_2O$ Make For testing the catalysts of Examples 1 and 3.1 and of Comparative Example 1 were aged at 550° C. for 100 hours. The $NH_3$ oxidation and the $N_2O$ make were measured at different temperatures at the entrance of the aged catalysts, namely at 300 and 350° C. (space velocity: 100 000 hr$^{-1}$, 515 ppm of $NH_3$, 7% $H_2O$, 7% $CO_2$ and 8% $O_2$). The results are displayed in Table 3 below.

TABLE 3

Results of the tested aged catalysts

| T (°C.) | Example 1 | | Example 3.1 | | Comparative Example 1 | |
|---|---|---|---|---|---|---|
| | $NH_3$ ox. (%) | $N_2O$ make (ppm) | $NH_3$ ox. (%) | $N_2O$ make (ppm) | $NH_3$ ox. (%) | $N_2O$ make (ppm) |
| 300 | 97 | 21 | 95 | 13 | 98 | 28 |
| 350 | 99 | 12 | 97 | 7 | 99 | 16 |

As may be taken from Table 3, the catalysts of Examples 1 and 3.1 permits to obtain a great balance between the ammonia oxidation and the nitrous oxide make. In particular, the catalyst of Example 1 exhibits a $NH_3$ oxidation of 99% at 350° C. and a $N_2O$ make of 12 ppm and the catalyst of Example 3.1 exhibits a $NH_3$ oxidation of 97% at 350° C. and a $N_2O$ make of only 7 ppm.

In contrast thereto, the catalyst of Comparative Example 1 exhibits a comparably $NH_3$ oxidation of 99% at the same temperature and a higher $N_2O$ make of 16 ppm.

Thus, this example demonstrates that even under aged conditions, the catalysts according to the present invention permits to obtain a great balance between the ammonia conversion and the nitrous oxide make, in particular at high temperatures. This also shows that the catalysts of the present invention are thermally stable.

Example 8: Use of the Catalysts of Example 3.1 and Comparative Example 1—DeNOx/$N_2O$ Make For testing the catalysts of Example 3.1 and of Comparative Example 1 were aged at 550° C. for 100 hours. The NOx conversion and the $N_2O$ make were measured at different temperatures at the entrance of the aged catalysts, namely at 200, 225, 250 and 400° C. (space velocity: 60 000 hr$^{-1}$, 515 ppm of NO, $NH_3$ to NOx ratio of 1.1, 5% $H_2O$, 5% $CO_2$ and 10% $O_2$). The results are displayed in Table 4 below.

TABLE 4

Results of the tested aged catalysts

| T° C. | Example 3.1 | | Comparative Example 1 | |
|---|---|---|---|---|
| | DeNOx (%) | $N_2O$ make (ppm) | DeNOx (%) | $N_2O$ make (ppm) |
| 200 | 88 | 23 | 85 | 30 |
| 225 | 96 | 53 | 95 | 76 |

TABLE 4-continued

Results of the tested aged catalysts

| T° C. | Example 3.1 | | Comparative Example 1 | |
|---|---|---|---|---|
| | DeNOx (%) | $N_2O$ make (ppm) | DeNOx (%) | $N_2O$ make (ppm) |
| 250 | 93 | 49 | 89 | 75 |
| 400 | 86 | 9 | 71 | 12 |

As may be taken from Table 4, the catalyst of Example 3.1 exhibits improved NOx conversion and reduced $N_2O$ make over a wide temperature range of 200 to 400° C. compared to the catalyst of Comparative Example 1. Thus, this example demonstrates that the catalysts of the present invention permits to obtain a great balance between the DeNOx and the nitrous oxide even under aged conditions. This also shows that the catalysts of the present invention are thermally stable.

Example 9: Preparation of a Catalyst According to the Present Invention

The catalyst of Example 9 was prepared as the catalyst of Example 1 except that the first coating was disposed over half of the length of the first coating from the inlet end towards the outlet end and the washcoat loading of the first coating after calcination was of 91.53 g/l (1.5 g/in$^3$), including a final Cu-CHA loading of 1.43 g/in$^3$ and a final zirconia loading of 0.07 g/in$^3$.

Example 10: Preparation of a Catalyst According to the Present Invention

The catalyst of Example 10 was prepared as the catalyst of Example 3.1 except that the first coating was disposed over half of the length of the first coating from the inlet end towards the outlet end and the washcoat loading of the first coating after calcination was of 91.54 g/l (1.5 g/in$^3$), including a final Cu-CHA loading of 1.43 g/in$^3$ and a final zirconia loading of 0.07 g/in$^3$.

Example 11: Use of the Catalysts of Example 1, 3.1, 9 and 10 and of Comparative Example 1—$NH_3$ Oxidation/$N_2O$ Make For testing the fresh catalysts of Examples 1, 3.1, 9 and 10 and of Comparative Example 1, the $NH_3$ oxidation and the $N_2O$ make were measured at different temperatures at the entrance of the catalysts, namely at 250, 300 and 350° C. (space velocity: 100 000 hr$^{-1}$, 515 ppm of $NH_3$, 7% $H_2O$, 7% $CO_2$ and 8% $O_2$). The results are displayed in FIGS. 3 and 4.

As may be taken from FIGS. 3 and 4, the catalysts of Examples 1, 3.1, 9 and 10 exhibit great ammonia oxidations of 94 to 98% at 300 and 350° C. but slightly lower than those obtained with the catalyst of Comparative Example 1. However, they produce less nitrous oxide compared to the nitrous oxide produced with the catalyst of Comparative Example 1. Therefore, the catalysts according to the present invention permits to obtain a great balance between the ammonia conversion and the nitrous oxide make under fresh conditions at high temperatures. This example demonstrates that the particular composition of the catalysts according to the present invention permits to obtain great ammonia oxidation while permitting to greatly reduce the nitrous oxide formation.

Example 12: Use of the Catalysts of Example 1, 3.1, 9 and 10 and of Comparative Example 1—DeNOx/$N_2O$ Make For testing the fresh catalysts of Examples 1, 3.1, 9 and 10 and of Comparative Example 1, the NOx conversion and the $N_2O$ make were measured at different temperatures at the entrance of the catalysts, namely at 175, 200, 225, 250 and 400° C. (space velocity: 60 000 hr$^{-1}$, 515 ppm of NO, $NH_3$ to NOx ratio of 1.1, 5% $H_2O$, 5% $CO_2$ and 10% $O_2$). The results are displayed in FIGS. 5 and 6.

As may be taken from FIGS. 5 and 6, the catalysts of Examples 3.1, 9 and 10 exhibit improved NOx conversion over a large temperature range, namely from 175 to 400° C. compared to the NOx conversion obtained with the catalyst of Comparative Example 1 comprising a single coating comprising a mixture of Pt/alumina and Cu-SCR. Further, the catalysts of the inventive examples also permits to reduce the nitrous oxide make. In particular, the catalyst of Example 1 exhibits a NOx conversion of 96% at 225° C. and a $N_2O$ make of 71 ppm, the catalyst of Example 9 (with a second coating disposed only over half of the substrate length on the inlet side) exhibits a NOx conversion of 94% at 225° C. and a $N_2O$ make of 43 ppm, the catalyst of Example 3.1 exhibits a NOx conversion of 96% and a $N_2O$ make of 50 ppm and the catalyst of Example 10 (with a second coating disposed only over half of the substrate length on the inlet side) exhibits a NOx conversion of 96% and a $N_2O$ make of 22 ppm. In contrast thereto, the catalyst of Comparative Example 1 at the same temperature exhibits a NOx conversion of 95% and a $N_2O$ make of 181 ppm. Thus, this example demonstrates that the catalysts of the present invention permit to obtain improved NOx conversion while permitting to significantly decreasing the nitrous make over a wide temperature range. Further, this example shows that the second coating of the catalysts of the present invention when covering only half of the first coating permits to reduce even more the nitrous oxide formation.

Example 13: Preparation of an Exhaust Gas Treatment System According to the Present Invention An exhaust gas treatment system according to the present invention was prepared by combining the catalyst of Reference Example 5 ("Cu-SCR catalyst") and the catalyst of Example 3.1 ("Multi-Functional Catalyst (MFC)"), wherein the catalyst of Example 3.1 was located downstream of the catalyst of Reference Example 5.

Example 14: Testing of the Exhaust Gas Treatment System of Example 13—DeNOx/$N_2O$ Make The testing was done on a 13L Euro VI engine under transient WHTC conditions, with average temperatures of around 250° C. (SCR$_{in}$) (exhaust mass between 200 and 2000 kg/hr, Ammonia to NOx ratio of 0 to 1, $H_2O$ between 1 and 10% $CO_2$ between 1 and 10% and $O_2$ between 6 and 20%) and E.O. NOx levels of around 10 g NOx/kWh. The DeNOx and the amount of $N_2O$ were measured at the outlet end of the MFC at different ANRs (Ammonia to NOx Ratios). The results were displayed in Table 1 below.

TABLE 1

| | DeNOx (MFCout) | NO$_2$/NOx (gr/gr) | N$_2$O make (gr cumulated) |
|---|---|---|---|
| ANR = 0 | — | 17% | — |
| ANR = 0.75 | 75% | 16% | 0.95 |
| ANR = 0.85 | 84% | 13% | 1.36 |
| ANR = 0.9 | 87% | 10% | 2.0 |
| ANR = 1 | 91% | 7% | 3.94 |

The upstream Cu-SCR increases DeNOx activity in the exhaust gas treatment system as it increases the amount of SCR material in the system. Thus, a DeNOx of 75 to 91% was observed at the outlet end of the MFC of the present invention while presenting low N$_2$O make.

BRIEF DESCRIPTION OF THE FIGURES

FIG. 1a: (top part of FIG. 1) shows a schematic depiction of a multifunctional catalyst according to the present invention. The multifunctional catalyst 1 according to the present invention is depicted on FIG. 1a, said catalyst comprises a flow-through substrate 2 comprising an inlet end 3, an outlet end 4, a substrate axial length extending from the inlet end to the outlet end and a plurality of passages defined by internal walls of the flow through substrate extending therethrough (not shown). Further, catalyst 1 comprises a second coating 5 which is disposed over the full length of the substrate 2 on the surface of the internal walls of the substrate and a first coating 6 which is disposed on the second coating 5 over the full length of the substrate 2. Alternatively, the first coating 6 can be disposed on the second coating over about half of the length of the substrate 2 from the inlet end to the outlet end of the substrate 2. This alternative is not represented on FIG. 1a.

FIG. 1b: (middle part of FIG. 1) shows a depiction of a multifunctional catalyst according to the present invention. The multifunctional catalyst 11 according to the present invention is depicted on FIG. 1b, said catalyst comprises a flow-through substrate 2 comprising an inlet end 3, an outlet end 4, a substrate axial length extending from the inlet end to the outlet end and a plurality of passages defined by internal walls of the flow through substrate extending therethrough (not shown). The catalyst 11 comprises a second coating comprising an inlet coating 15 a extending from the inlet end to the outlet end of the substrate 2 over half of the length of the substrate 2 and an outlet coating 15 b extending from the outlet end to the inlet end of the substrate 2 over the other half of the length of the substrate 2. Said second coating (15 a+15 b) is disposed on the surface of the internal walls of the substrate 2. Further, the catalyst 11 comprises a first coating 16 which is disposed on the second coating 5 over the full length of the substrate 2.

FIG. 1c: (bottom part of FIG. 1) shows a depiction of a multifunctional catalyst according to the present invention. The multifunctional catalyst 21 according to the present invention is depicted on FIG. 1c, said catalyst comprises a flow-through substrate 2 comprising an inlet end 3, an outlet end 4, a substrate axial length extending from the inlet end to the outlet end and a plurality of passages defined by internal walls of the flow through substrate extending therethrough (not shown). The catalyst 21 comprises a third coating 27 disposed on the surface of the internal walls of the substrate 2 and over about half of the length of the substrate 2 from the outlet end to the inlet end. Further, the catalyst 21 comprises a second coating 25 disposed on the surface of the internal walls of the substrate 2 and on the third coating, said coating extends over the full length of the substrate 2. Finally, the catalyst 21 further comprises a first coating 26 disposed on the second coating over the full length of the substrate 2. Alternatively, the first coating 26 can be disposed on the second coating over about half of the length of the substrate 2 from the inlet end to the outlet end of the substrate 2. This alternative is not represented on FIG. 1c.

CITED LITERATURE

Figure 1:
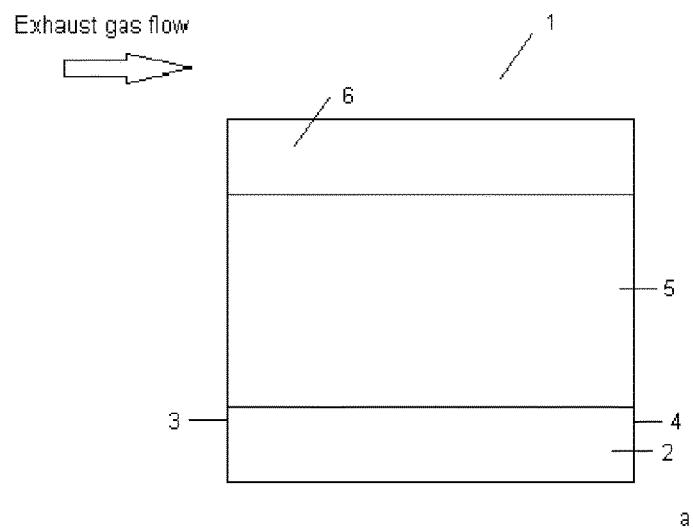
Figure 1:
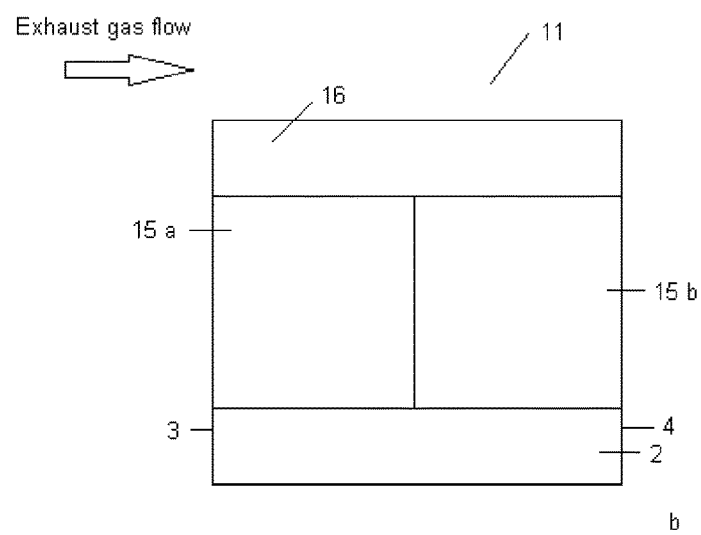
Figure 1:
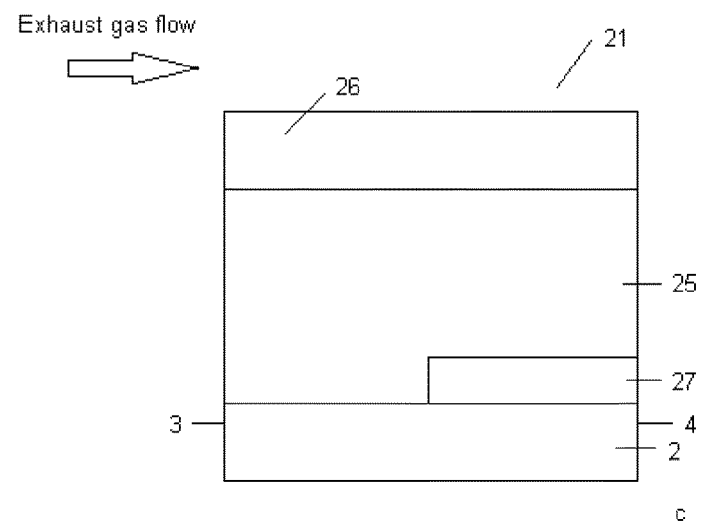
Figure 2:
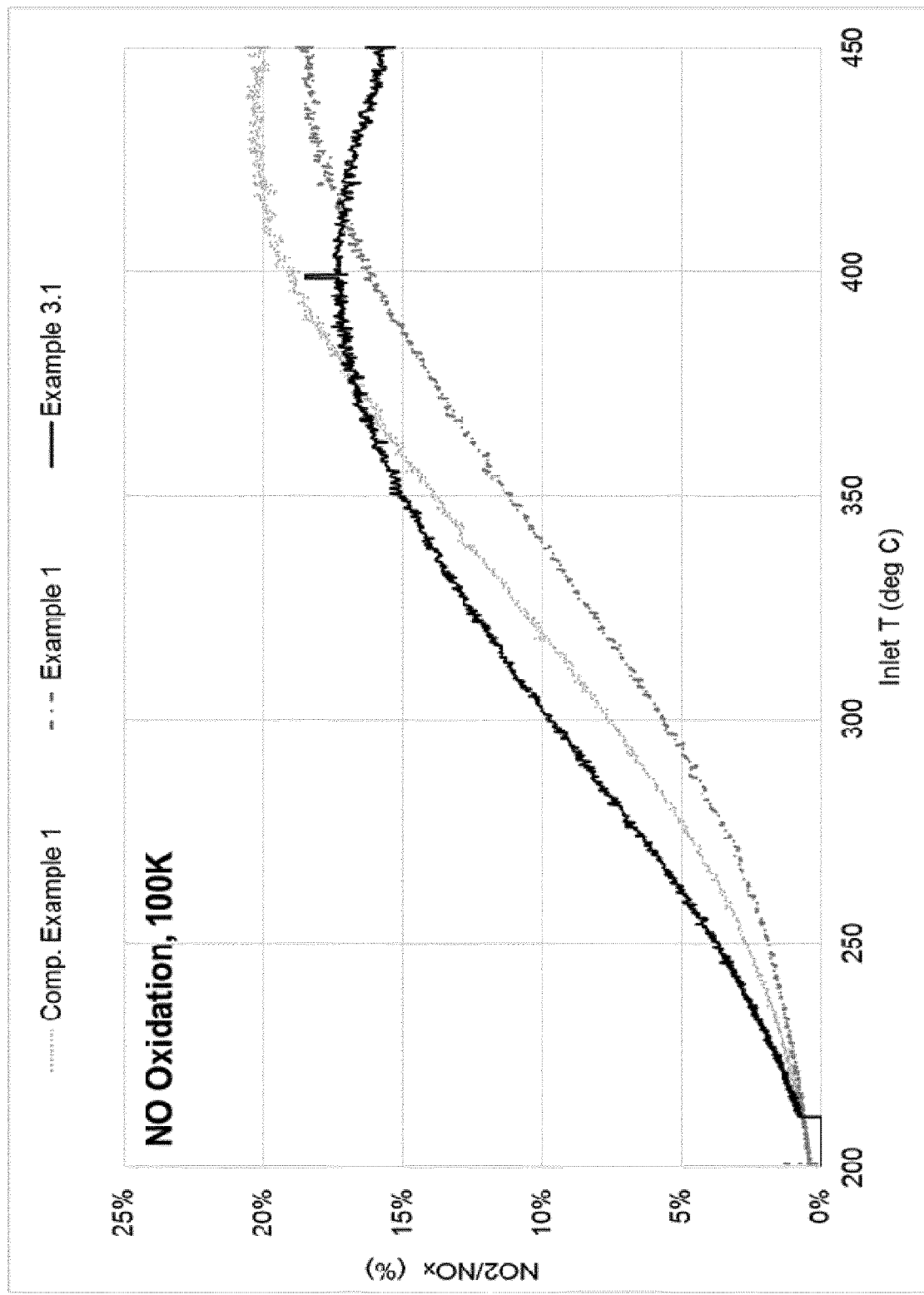
FIG. 2: shows the NO$_2$/NOx ratio in the absence of ammonia obtained with the catalysts of Comparative Example 1 and Examples 1 and 3 at temperatures of from 200 to 450° C.
Figure 3:
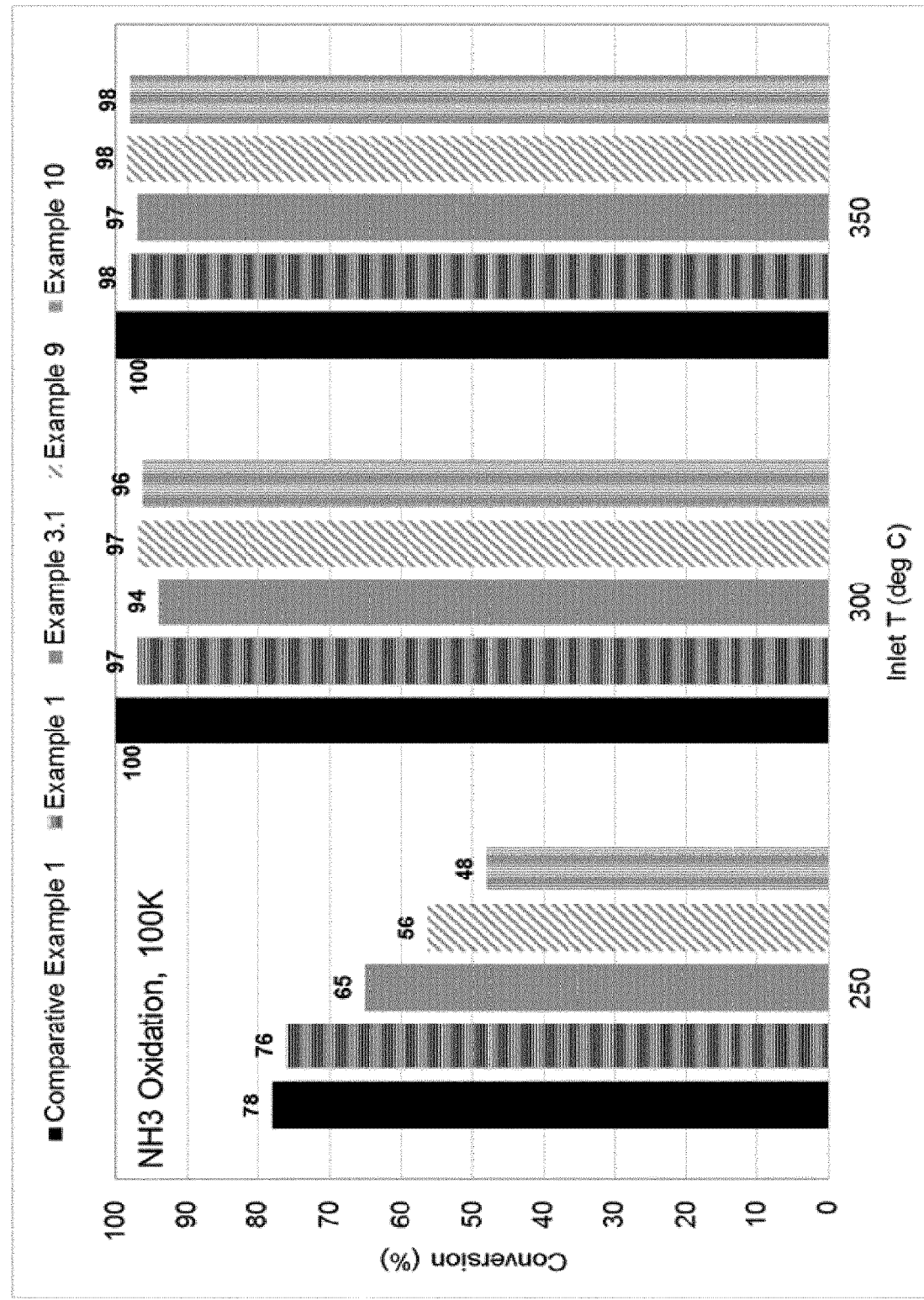
FIG. 3: shows the NH$_3$ oxidation in percentage obtained when using the fresh catalysts of Examples 1, 3.1, 9 and 10 and Comparative Example 1 at different temperatures, namely 250, 300 and 350° C. Conditions: space velocity: 100 000 hr$^{-1}$, 515 ppm of NH$_3$, 7% H$_2$O, 7% CO$_2$ and 8% O$_2$.
Figure 4:
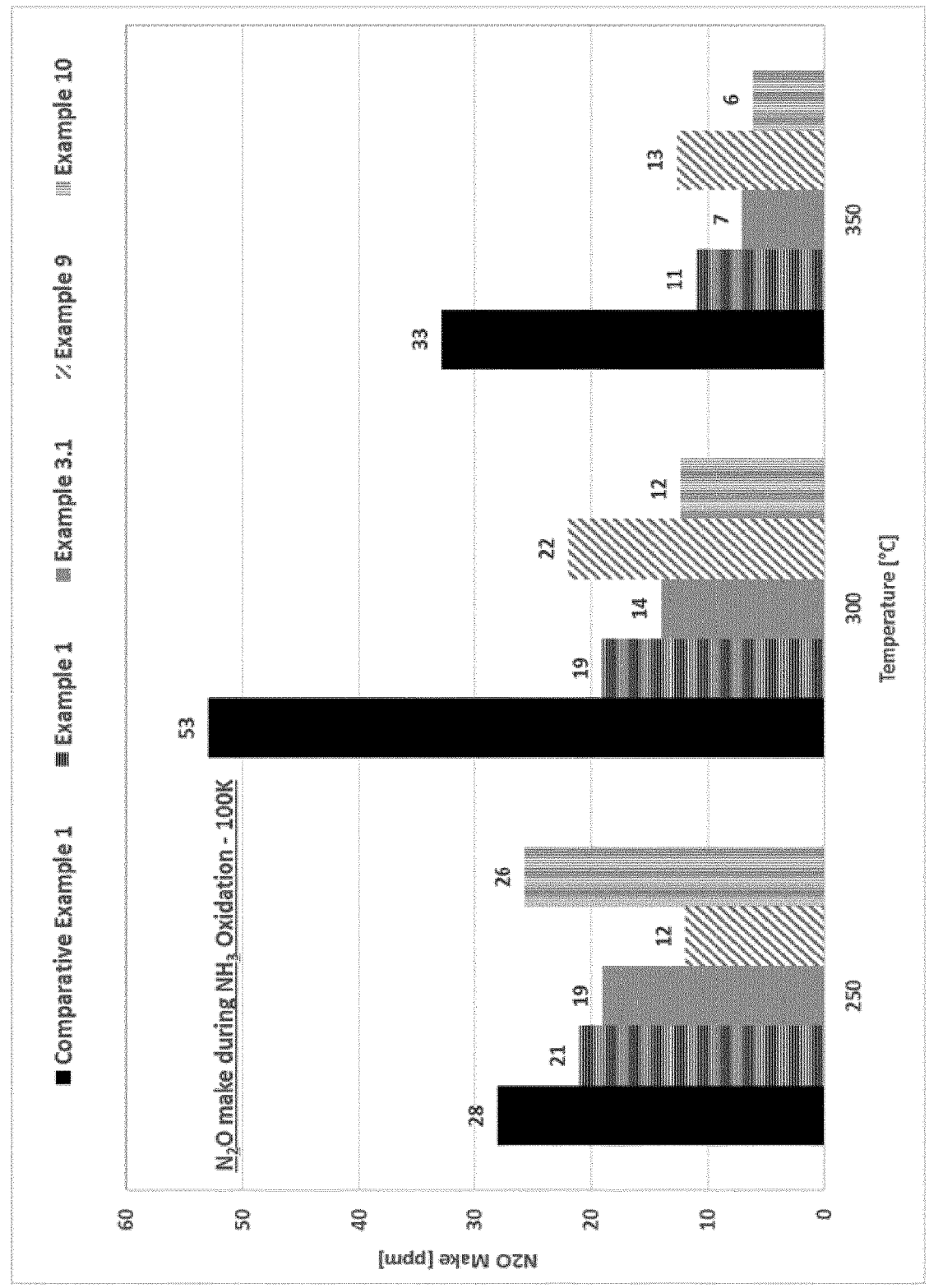
FIG. 4: shows the N$_2$O make in ppm obtained when using the fresh catalysts of Examples 1, 3.1, 9 and 10 and Comparative Example 1 at different temperatures, namely 250, 300 and 350° C. Conditions: space velocity: 100 000 hr$^{-1}$, 515 ppm of NH$_3$, 7% H$_2$O, 7% CO$_2$ and 8% O$_2$.
Figure 5:
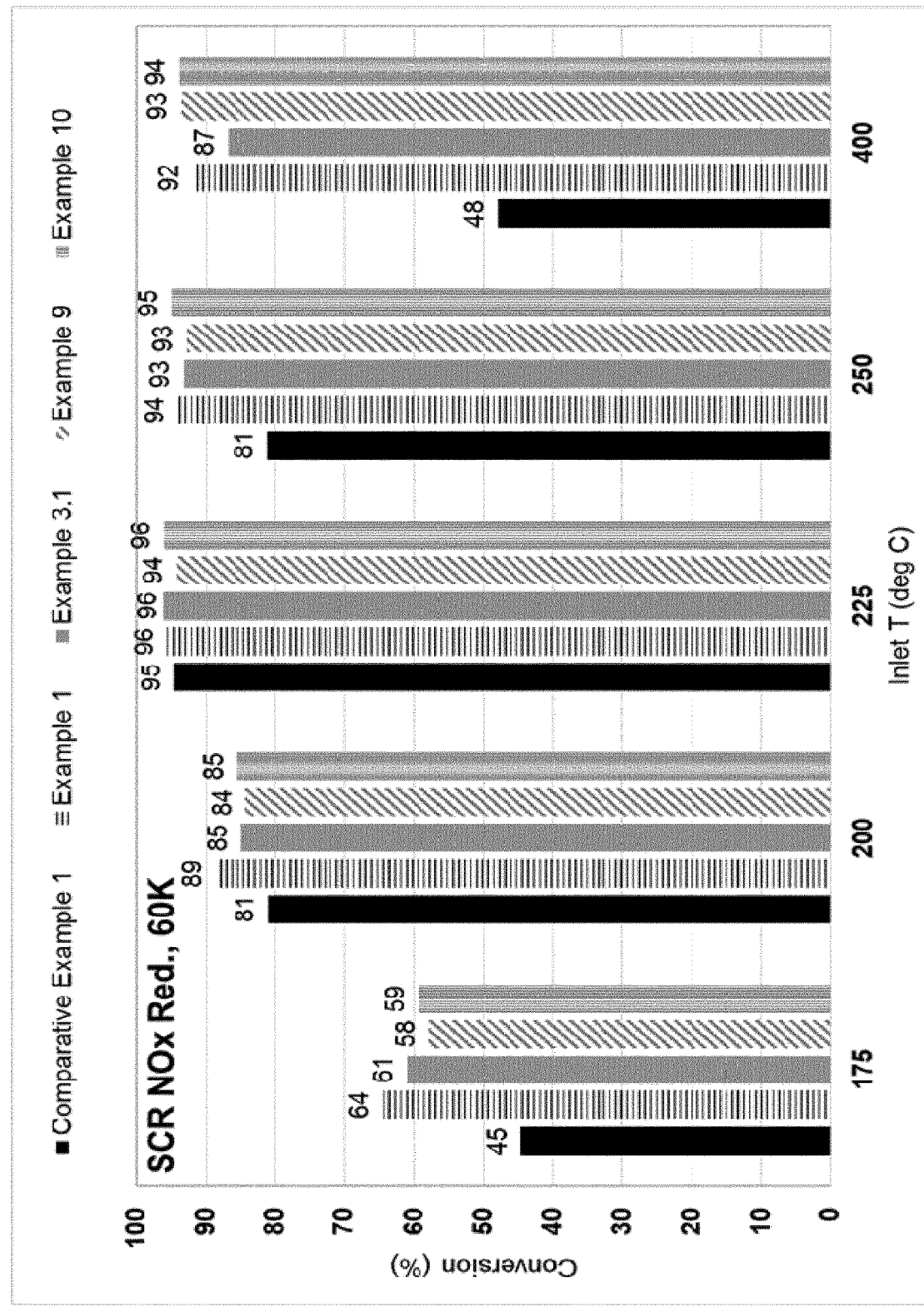
FIG. 5: shows the NOx conversion in percentage obtained when using the fresh catalysts of Examples 1, 3.1, 9 and 10 and Comparative Example 1 at different temperatures, namely 175, 200, 225, 250 and 400° C. Conditions: space velocity: 60 000 hr$^{-1}$, 515 ppm of NO, NH$_3$ to NOx ratio of 1.1, 5% H$_2$O, 5% CO$_2$ and 10% O$_2$.
Figure 6:
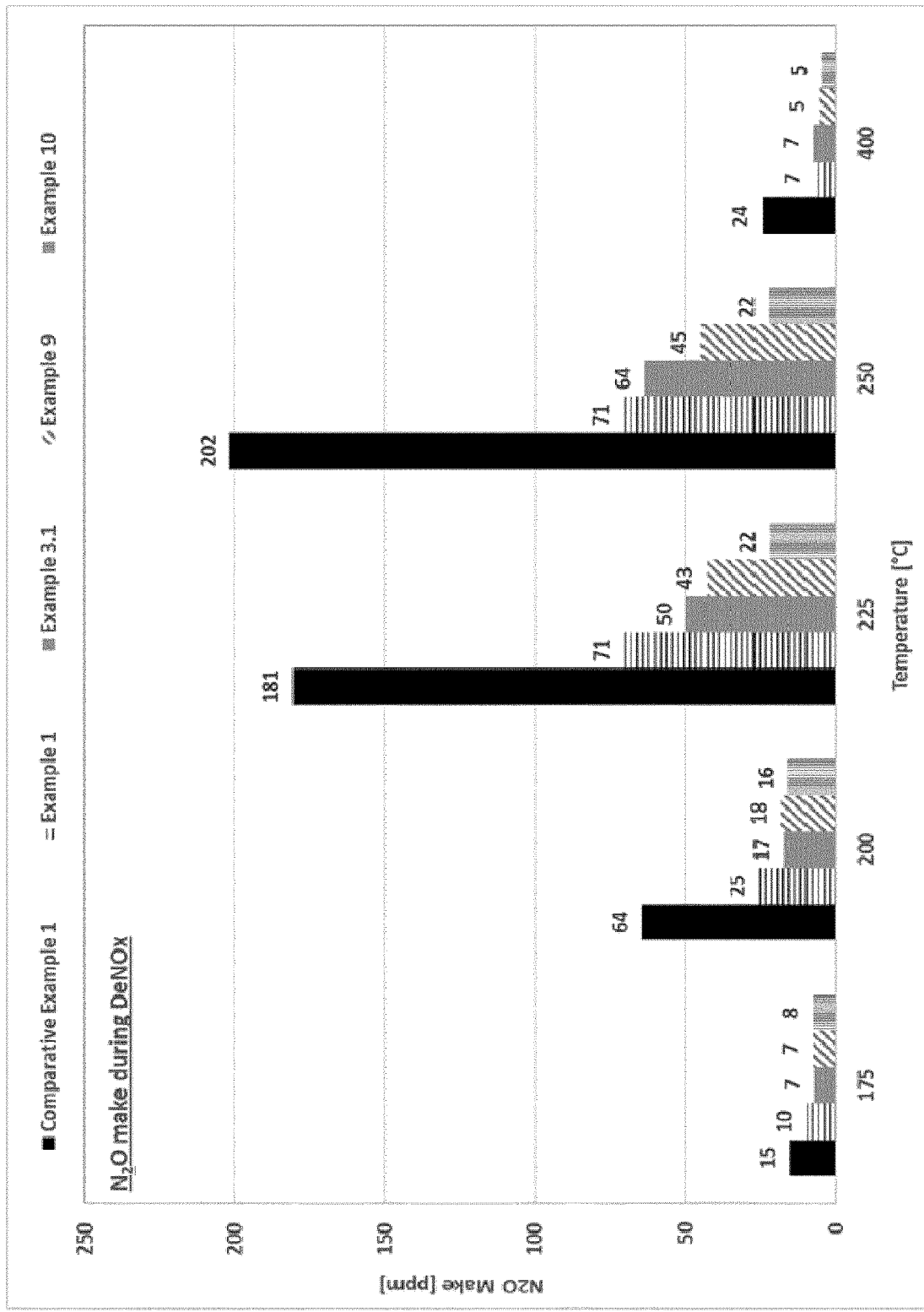
FIG. 6: shows the N$_2$O make in ppm obtained when using the fresh catalysts of Examples 1, 3.1, 9 and 10 and Comparative Example 1 at different temperatures, namely 175, 200, 225, 250 and 400° C. Conditions: space velocity: 60 000 hr$^{-1}$, 515 ppm of NO, NH$_3$ to NOx ratio of 1.1, 5% H$_2$O, 5% CO$_2$ and 10% O$_2$.
Figure 7:
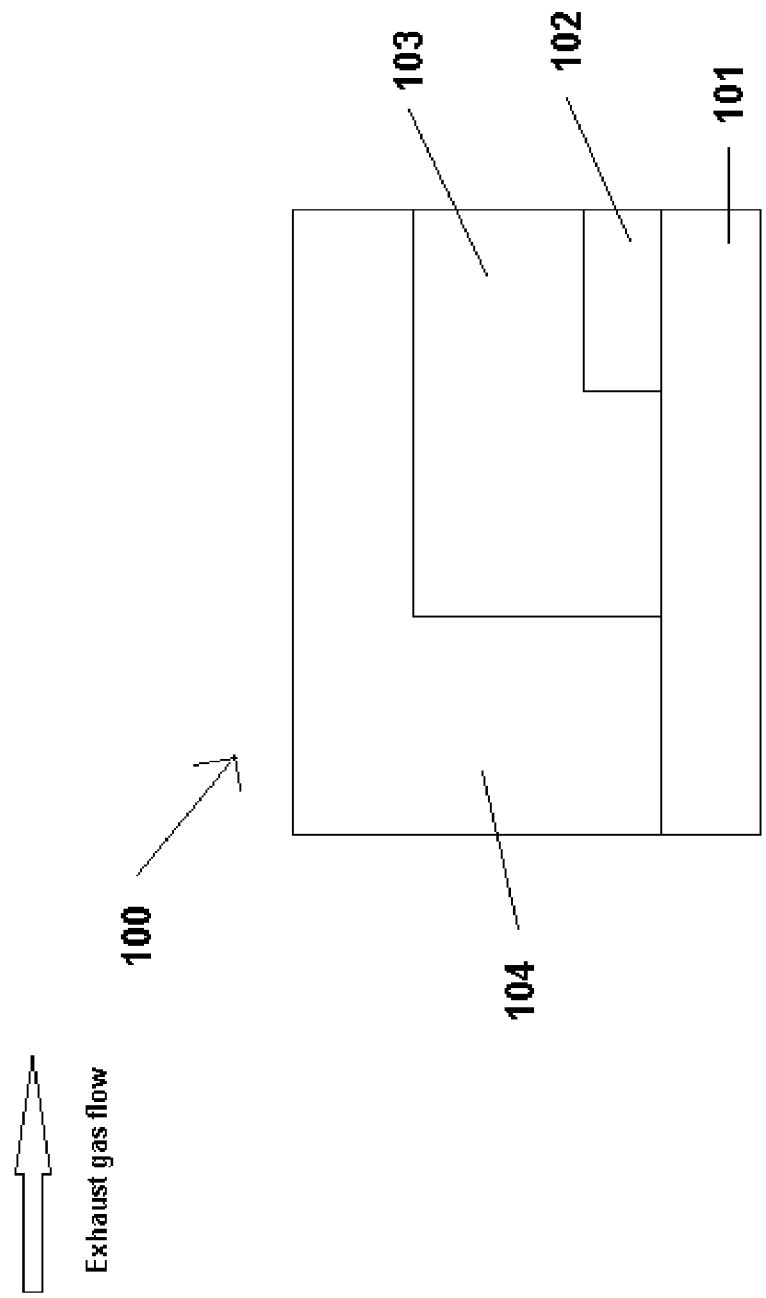
FIG. 7: shows a schematic depiction of a catalyst according to the present invention. In particular, the catalyst 100 comprises a substrate 101, such as a flow-through substrate, a coating 102, the third coating of the present invention according to II., a coating 103, the second coating of the present invention according to II., and a coating 104, the first coating of the present invention according to II. The compositions of these coating is as defined in the foregoing.

US 2015/0037233 A
WO 2015/189680 A
US 2016/0367973 A
US 2016/0367974 A

The invention claimed is:
1. A catalyst, comprising
  (i) a flow through substrate comprising an inlet end, an outlet end, a substrate axial length extending from the inlet end to the outlet end and a plurality of passages defined by internal walls of the flow through substrate extending therethrough;
  (ii) a first coating comprising one or more of a vanadium oxide and a zeolite material comprising one or more of copper and iron;
  (iii) a second coating comprising a physical mixture of a first platinum group metal component supported on a non-zeolite first oxide-containing material, one or more of a vanadium oxide and a zeolite material comprising one or more of copper and iron; and

(iv) a third coating comprising a second platinum group metal component supported on a second oxide-containing material;

wherein the third coating is disposed on the surface of the internal walls and under the second coating over z % of the axial length of the substrate from the outlet end to the inlet end, with z being in the range of from 20 to 100;

wherein the second coating extends over y % of the axial length of the substrate from the inlet end to the outlet end and is disposed on the surface of the internal walls and the third coating, or on the third coating, with y being in the range of from 95 to 100; and wherein the first coating extends over x % of the axial length of the substrate from the inlet end to the outlet end and is disposed on the second coating, with x being in the range of from 20 to y.

2. The catalyst of claim 1, wherein y ranges from 95 to 100.

3. The catalyst of claim 1, wherein z ranges from 0 to 65.

4. The catalyst of claim 1, wherein the zeolite material comprised in the first coating has a framework type chosen from AEI, GME, CHA, MFI, BEA, FAU, MOR, a mixture of two or more thereof, and a mixed type of two or more thereof.

5. The catalyst of claim 1, wherein the zeolite material comprised in the first coating comprises copper.

6. The catalyst of claim 1, wherein the first platinum group metal component comprised in the second coating is one or more of platinum, palladium and rhodium.

7. The catalyst of claim 1, wherein the zeolite material comprised in the second coating has a framework type chosen from AEI, GME, CHA, MFI, BEA, FAU, MOR, a mixture of two or more thereof, and a mixed type of two or more thereof.

8. The catalyst of claim 1, wherein the zeolite material comprised in the second coating comprises copper.

9. The catalyst of claim 1, wherein in the catalyst, the second coating and the third coating together have a platinum group metal component loading, calculated as elemental platinum group metal, ranging from 0.035 to 1.41 g/l (1 to 40 g/ft$^3$).

10. The catalyst of claim 1, wherein the second coating comprises (A) an upstream coating comprising a platinum group metal component supported on a non-zeolite oxide-containing material and further comprises one or more of a vanadium oxide and a zeolite material comprising one or more of copper and iron; and (B) a downstream coating comprising a platinum group metal component supported on a non-zeolite oxide-containing material and further comprises one or more of a vanadium oxide and a zeolite material comprising one or more of copper and iron;

wherein the upstream coating extends over $y_1$% of the axial length of the substrate from the inlet end to the outlet end and is disposed on the surface of the internal walls and the third coating, or on the third coating;

wherein the outlet coating extends over y2% of the axial length of the substrate from the outlet end to the inlet end and is disposed on the surface of the internal walls and the third coating, or on the third coating;

wherein $y_1$ ranges from 45 to 55 and $y_2$ ranges from 45 to 55;

wherein the upstream coating comprises the platinum group metal component at a first loading ($I_1$) and the outlet coating comprises the platinum group metal component at a loading ($I_2$), wherein the ratio of ($I_1$):($I_2$) ranges from 0.2:1 to 0.75:1;

wherein the first platinum group metal component comprises the platinum group metal component of the upstream coating and the platinum group metal component of the outlet coating; and wherein the non-zeolite first oxide-containing material comprises the non-zeolite oxidic material of the upstream coating and the non-zeolite oxide-containing material of the outlet coating.

11. The catalyst of claim 10, wherein the platinum group metal component comprised in the upstream coating of the second coating is one or more of platinum, palladium, and rhodium;

wherein the non-zeolite oxide-containing material supporting the platinum group metal component comprised in the upstream coating.

12. The catalyst of claim 10, wherein the zeolite material comprised in the upstream coating of the second coating has a framework type chosen from AEI, GME, CHA, MFI, BEA, FAU, MOR, a mixture of two or more thereof, and a mixed type of two or more thereof.

13. The catalyst of claim 10, wherein the zeolite material comprised in the upstream coating of the second coating comprises copper.

14. The catalyst of claim 10, wherein the platinum group metal component comprised in the outlet coating of the second coating is one or more of platinum, palladium and rhodium.

15. The catalyst of claim 10, wherein the zeolite material comprised in the outlet coating of the second coating has a framework type chosen from AEI, GME, CHA, MFI, BEA, FAU, MOR, a mixture of two or more thereof, and a mixed type of two or more thereof.

16. The catalyst of claim 10, wherein the zeolite material comprised in the outlet coating of the second coating comprises copper.

17. The catalyst of claim 1, wherein the catalyst comprises the flow-through substrate, the first coating, the second coating and the third coating, wherein z ranges from 20 to 65; or wherein z ranges from 80 to 100.

18. The catalyst of claim 17, wherein the second platinum group metal component comprised in the third coating is one or more of platinum, palladium and rhodium.

19. A method for preparing the catalyst claim 1, the method comprising:

(a) providing an uncoated flow-through substrate, the substrate comprising an inlet end, an outlet end, a substrate axial length extending from the inlet end to the outlet end and a plurality of passages defined by internal walls of the substrate extending therethrough;

(b) providing a slurry comprising a second platinum group metal component and a second oxide-containing material, disposing said slurry on the surface of the internal walls of the substrate, over z % of the substrate axial length from the outlet end to the inlet end, wherein z ranges from 20 to 100, calcining the slurry disposed on the substrate, obtaining a third coating disposed on the substrate;

(c) providing one or more slurries comprising a first platinum group metal component, a non-zeolite first oxide-containing material and water and one or more of a vanadium oxide and a zeolite material comprising one or more of copper and iron, and a solvent, disposing said one or more slurries on the surface of the internal walls and the third coating, or on the third coating, over y % of the substrate axial length, wherein y ranges from 95 to 100, calcining the one or more slurries disposed on the substrate, obtaining a second coating disposed on the substrate; and (d) providing a slurry comprising one or more of a vanadium oxide and a zeolite material comprising one or more of copper and iron, and a solvent, disposing said slurry over x % of the substrate axial length on the second coating from the inlet end to the outlet end, wherein x ranges from 20 to y, calcining the slurry disposed on the substrate, obtaining the catalyst for the oxidation of NO, for the oxidation of ammonia, for the oxidation of HC and for the selective catalytic reduction of NOx.

20. An exhaust gas treatment system comprising:
an upstream end for introducing exhaust gas stream into said exhaust gas treatment system, wherein said exhaust gas treatment system comprises the catalyst according to claim 1 and one or more of a diesel oxidation catalyst, a selective catalytic reduction catalyst, and a particulate filter.

21. A catalyst for oxidation of NO, for oxidation of ammonia, for oxidation of HC and for selective catalytic reduction of NOx, the catalyst comprising
(i) a flow through substrate comprising an inlet end, an outlet end, a substrate axial length extending from the inlet end to the outlet end and a plurality of passages defined by internal walls of the flow through substrate extending therethrough;
(ii) a first coating comprising one or more of a vanadium oxide and a zeolite material comprising one or more of copper and iron;
(iii) a second coating comprising a physical mixture of a first platinum group metal component supported on a non-zeolite first oxide-containing material and further comprising one or more of a vanadium oxide and a zeolite material comprising one or more of copper and iron; and
(iv) a third coating comprising a second platinum group metal component supported on a second oxide-containing material;
wherein the third coating is disposed on the surface of the internal walls and under the second coating over z % of the axial length of the substrate from the outlet end to the inlet end, wherein z ranges from 10 to 80;
wherein the second coating extends over y % of the axial length of the substrate from the outlet end to the inlet end and is disposed on the third coating and the surface of the internal walls, or on the third coating, wherein y ranges from 10 to 80; and
wherein the first coating extends over x % of the axial length of the substrate from the inlet end to the outlet end and is disposed on the surface of the internal walls and on the second coating, wherein x ranges from 95 to 100.

22. A catalyst, comprising
(i) a flow through substrate comprising an inlet end, an outlet end, a substrate axial length extending from the inlet end to the outlet end and a plurality of passages defined by internal walls of the flow through substrate extending therethrough;
(ii) a first coating comprising one or more of a vanadium oxide and a zeolite material comprising one or more of copper and iron;
(iii) a second coating comprising a physical mixture of a first platinum group metal component supported on a non-zeolite first oxide-containing oxidic material and one or more of a vanadium oxide and a zeolite material comprising one or more of copper and iron; and
(iv) optionally a third coating comprising a second platinum group metal component supported on a second oxidic material;
wherein, when present, the optional third coating is disposed on the surface of the internal walls and under the second coating over z % of the axial length of the substrate from the outlet end to the inlet end, with z being in the range of from 0 to 100;
wherein the second coating extends over y % of the axial length of the substrate from the inlet end to the outlet end and is disposed either on the surface of the internal walls, or, optionally, on the surface of the internal walls and the optional third coating, or, optionally, on the optional third coating, with y being in the range of from 95 to 100; and
wherein the first coating extends over x % of the axial length of the substrate from the inlet end to the outlet end and is disposed on the second coating, with x being in the range of from 20 to y.

* * * * *